(12) United States Patent
Sengoku

(10) Patent No.: US 9,710,424 B2
(45) Date of Patent: Jul. 18, 2017

(54) SYNCHRONIZATION METHOD FOR MULTI-SYMBOL WORDS

(71) Applicant: QUALCOMM Incorporated, San Diego, CA (US)

(72) Inventor: Shoichiro Sengoku, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 347 days.

(21) Appl. No.: 14/682,846

(22) Filed: Apr. 9, 2015

(65) Prior Publication Data
US 2015/0301980 A1    Oct. 22, 2015

Related U.S. Application Data

(60) Provisional application No. 61/982,466, filed on Apr. 22, 2014.

(51) Int. Cl.
*H04J 3/06* (2006.01)
*G06F 13/42* (2006.01)

(52) U.S. Cl.
CPC ...... *G06F 13/4295* (2013.01); *G06F 13/4282* (2013.01); *G06F 13/4291* (2013.01)

(58) Field of Classification Search
CPC ............. G06F 13/4295; G06F 13/4282; G06F 13/4291
See application file for complete search history.

(56) References Cited

U.S. PATENT DOCUMENTS

| 2003/0217213 A1 | 11/2003 | Imming et al. |
| 2013/0272177 A1 | 10/2013 | Wei et al. |
| 2014/0013017 A1* | 1/2014 | DeCesaris ............. G06F 13/385 710/105 |

OTHER PUBLICATIONS

International Search Report and Written Opinion—PCT/US2015/025464—ISA/EPO—Jul. 9, 2015.

* cited by examiner

*Primary Examiner* — Ernest Unelus
(74) *Attorney, Agent, or Firm* — Loza & Loza LLP

(57) ABSTRACT

System, methods and apparatus are described that offer improved performance of a camera control interface (CCIe) bus. A method of data communications includes transmitting a first synchronization code on a serial bus, establishing synchronization with a first device coupled to the serial bus in response to the first synchronization code, communicating with the first device over the serial bus in accordance with a first protocol, after establishing synchronization with the first device, transmitting a first unsynchronization code on the serial bus, where the unsynchronization code is configured to cause a loss of synchronization with the first device, transmitting a second synchronization code on the serial bus, establishing synchronization with a second device coupled to the serial bus in response to the second synchronization code, and communicating with the second device over the serial bus in accordance with a second protocol, after establishing synchronization with the second device.

30 Claims, 43 Drawing Sheets

CCIe Bit 19 Mapping

| Ternary | Bits[19:0] | Address | Write | Read | Bit[0] 19 18 17 16 15 14 13 12 11 10 9 8 7 6 5 4 3 |
|---|---|---|---|---|---|
| 2222 2222 2222 | 0x81BF0 | | | | 1 1 1 1 1 1 1 1 1 1 1 ? ? ? ? |
| 0x31 (49)↓ | | | See FIG. 24 | | |
| 2222 2222 1012₃ | 0x81BC0 | | | | |
| 2222 2222 101L₃ | 0x81BBF | | | | |
| 16-bits [ 0x40 (64) ↓ | | | | | |
| 2222 2221 1211₃ | 0x81B80 | Master handover | Reserved | Slave-to-slave request | 1 1 1 1 1 1 1 1 0 x x x x x x |
| 2222 2221 1210₃ | 0x81B7F | | | | |
| [7-bits] 0x80 (128) ↓ | | | | | |
| 2222 2220 0002₃ | 0x81B00 | Reserved | Reserved | Reserved | 1 1 1 1 1 1 1 0 x x x x x x x |
| 2222 2220 0001₃ | 0x81AFF | | | | |
| [8-bits] 0x100 (256)↓ | | | | | |
| 2222 2202 2122₃ | 0x81A00 | Reserved | Slave to slave grant | Slave to slave request | 1 1 1 1 1 1 0 x x x x x x x x |
| 2222 2202 2120₃ | 0x19FF | | | | |
| [9-bits] 0x200 (512)↓ | | | | | |
| 2222 2112 1122₃ | 0x81800 | CCIe register address | Reserved | Master bus request | 1 1 1 1 1 0 x x x x x x x x x |
| 2222 2112 1121₃ | 0x817FF | | | | |
| [10-bits] 0x800 (2048)↓ | | | | | |
| 2222 1121 0210₃ | 0x81000 | 8-bit CHK | 8-bit CHK | 8-bit CHK | 1 1 1 1 0 x x x x x x x x x x |
| 2222 1121 0202₃ | 0x80FFF | | | | |
| [10.5-bits] 0x1000 (4096)↓ | | | | | |
| 2222 2201 2001₃ | 0x80000 | | 19-bit data region | | |
| 0x80000 (524288) ↓ | | | | | |
| 2221 2201 2001₃ | 0x7FFFF | | | | 0 x x x x x x x x x x x x x x |
| 0000 0000 0000₃ | 0x00000 | | | | |

FIG. 23

*CCIe Bit 19 Mapping [Cont.]*

| Ternary | Bits[19:0] | Address | Write | Read | Bits[19:0] |||||||||||||||||
|---|---|---|---|---|---|---|---|---|---|---|---|---|---|---|---|---|---|---|---|---|
| | | | | | 19 | 18 | 17 | 16 | 15 | 14 | 13 | 12 | 11 | 10 | 9 | 8 | 7 | 6 | 5 | 4 | 3 | 2 | 1 | 0 |
| 2222 2222 2222 | 0x81BF0 | RSV- | | Prohibited | 1 | 1 | 1 | 1 | 1 | 1 | 1 | 1 | 1 | 1 | 1 | 1 | 0 | 0 | 0 | 0 | 0 | 0 | 0 | 0 |
| 2222 2222 2221 | 0x81BEF | | | | 1 | 1 | 1 | 1 | 1 | 1 | 1 | 1 | 1 | 1 | 1 | 0 | 1 | 1 | 1 | 1 | 1 | 1 | 1 | 1 |
| 0x2A (42) ↓ | | | | | | | | | | | | | | | | | | | | | | | | | |
| 2222 2222 1102 | 0x81BC6 | | | | | | | | | | | | | | | | | | | | | | | |
| 2222 2222 1101 | 0x81BC5 | Heartbeat ♥ /NC2 | Prohibited | | | | | | | | | | | | | | | | | | | | | |
| 2222 2222 1100 | 0x81BC4 | | | | | | | | | | | | | | | | | | | | | | | |
| 0x2A (42) ↓ | | | | | | | | | | | | | | | | | | | | | | | | | |
| 2222 2222 1000 | 0x81BBB | Reserved | Reserved | Reserved | | | | | | | | | | | | | | | | | | | | |
| 2222 2222 0222 | 0x81BBA | Reserved | Reserved | Reserved | | | | | | | | | | | | | | | | | | | | |
| 2222 2222 0221 | 0x81BB9 | Reserved | Reserved | Reserved | | | | | | | | | | | | | | | | | | | | |
| 2222 2222 0220 | 0x81BB8 | Reserved | Reserved | Reserved | | | | | | | | | | | | | | | | | | | | |
| 2222 2222 0212 | 0x81BB7 | Reserved | Reserved | Reserved | | | | | | | | | | | | | | | | | | | | |
| [8-bits] 0x81 ↓ | | | | | | | | | | | | | | | | | | | | | | | | | |
| 2222 2222 1000 | 0x81BB0 | Reserved | Prohibited | Prohibited | | | | | | | | | | | | | | | | | | | | |
| 2222 2222 0222 | 0x81BAF | | | | | | | | | | | | | | | | | | | | | | | |
| [4-bits] 0x10 (16) ↓ | | | | | | | | | | | | | | | | | | | | | | | | | |
| 2222 2222 0000 | 0x81BA0 | Prohibited | SID scan resp. | Prohibited | | | | | | | | | | | | | | | | | | | | |
| 2222 2221 2222 | 0x81B9F | | | | | | | | | | | | | | | | | | | | | | | |
| 0xA (10) ↓ | | | | | | | | | | | | | | | | | | | | | | | | | |
| 2222 2221 2102 | 0x81B95 | Reserved | Reserved | Reserved | | | | | | | | | | | | | | | | | | | | |
| 2222 2221 2101 | 0x81B94 | Reserved | Reserved | Reserved | | | | | | | | | | | | | | | | | | | | |
| 2222 2221 2100 | 0x81B93 | Reserved | Reserved | Reserved | | | | | | | | | | | | | | | | | | | | |
| [2-bits] 0x4 (4) ↓ | | | | | | | | | | | | | | | | | | | | | | | | | |
| 2222 2221 1211 | 0x81B90 | Reserved | Reserved | Reserved | | | | | | | | | | | | | | | | | | | | |

SYNCHRONIZATION METHOD FOR MULTI-SYMBOL WORDS

CROSS-REFERENCE TO RELATED APPLICATIONS

This application claims priority to and the benefit of Provisional Patent application No. 61/982,466 filed in the U.S. Patent Office on Apr. 22, 2014, the entire content of which is incorporated herein by reference.

BACKGROUND

Field

The present disclosure relates generally to an interface between a host processor and a peripheral device such as a camera and, more particularly, to improving data rates on a camera control communication interface bus.

Background

Manufacturers of mobile devices, such as cellular phones, may obtain components of the mobile devices from various sources, including different manufacturers. For example, an application processor in a cellular phone may be obtained from a first manufacturer, while the display for the cellular phone may be obtained from a second manufacturer. The application processor and a display or other device may be interconnected using a standards-based or proprietary physical interface. For example, a display may provide an interface that conforms to a Camera Serial Interface standard specified by the Mobile Industry Processor Interface (MIPI) Alliance.

In one example, MIPI standards define a camera control interface (CCI) that uses a two-wire, bi-directional, half duplex, serial interface configured as a bus connecting a master and one or more slaves. Conventional CCI is compatible with a protocol used in a variant of the Inter-Integrated Circuit (I2C) bus and is capable of handling multiple slaves on the bus, with a single master. The CCI bus may include Serial Clock (SCL) and Serial Data (SDA) signals. CCI devices and I2C devices can be deployed on the same bus such that two or more CCI devices may communicate using CCI protocols, while any communication involving an I2C bus uses I2C protocols. Later versions of CCI can provide higher throughputs using modified protocols to support faster signaling rates.

In one example a CCI extension (CCIe) bus may be used to provide higher data rates for devices that are compatible with CCIe bus operations. Such devices may be referred to as CCIe devices, and the CCIe devices can attain higher data rates when communicating with each other by encoding data as symbols transmitted on both the SCL line and the SDA line of a conventional CCI bus. CCIe devices and I2C devices may coexist on the same CCIe bus, such that in a first time interval, data may be transmitted using CCIe encoding and other data may be transmitted in a different time interval according to I2C signaling conventions.

There exists an ongoing need for providing optimized communications on serial interfaces configured as a bus connecting master and slave components within a mobile device.

SUMMARY

Embodiments disclosed herein provide systems, methods and apparatus that can improve the performance of a camera control interface using a CCIe bus.

In an aspect of the disclosure, a method of data communications includes transmitting a first synchronization (SYNC) code on a serial bus, establishing synchronization with a first device coupled to the serial bus in response to the first SYNC code, communicating with the first device over the serial bus in accordance with a first mode of operation associated with a first protocol, after establishing synchronization with the first device, transmitting a first unsynchronization (UNSYNC) code on the serial bus, where the UNSYNC code is configured to cause a loss of synchronization with the first device, transmitting a second SYNC code on the serial bus, establishing synchronization with a second device coupled to the serial bus in response to the second SYNC code, and communicating with the second device over the serial bus in accordance with a second mode of operation associated with the first protocol, after establishing synchronization with the second device.

In an aspect of the disclosure, an apparatus configured for data communications includes means for transmitting a first SYNC code on a serial bus, means for establishing synchronization with a first device coupled to the serial bus in response to the first SYNC code, means for communicating with the first device over the serial bus in accordance with a first mode of operation associated with a first protocol, after synchronization with the first device is established, means for transmitting an UNSYNC code on the serial bus, where the UNSYNC code is configured to cause a loss of synchronization with the first device, means for transmitting a second SYNC code on the serial bus, means for establishing synchronization with a second device coupled to the serial bus in response to the second SYNC code, and means for communicating with the second device over the serial bus in accordance with a second mode of operation associated with the first protocol, after establishing synchronization with the second device.

In an aspect of the disclosure, an apparatus includes a transceiver configured for communicating over a serial bus, and at least one processor. The at least one processor may be configured to provide a first SYNC code to the transceiver for transmission on the serial bus, communicate with a first device over the serial bus in accordance with a first mode of operation associated with a first protocol, after synchronization with the first device is established in response to the first SYNC code, provide an UNSYNC code to the transceiver for transmission on the serial bus, where the UNSYNC code is configured to cause a loss of synchronization with the first device, provide a second SYNC code to the transceiver for transmission on the serial bus, and communicate with a second device over the serial bus in accordance with a second mode of operation associated with the first protocol, after synchronization with the second device is established in response to the second SYNC code.

In an aspect of the disclosure, a computer-readable storage medium stores or maintains instructions and/or data. The storage medium may be transitory or non-transitory. The instructions may be executed by the processor and/or control the operation of a processing circuit. In some examples, the instructions, when executed by the processor cause the processor or processing circuit to provide a first SYNC code to a transceiver for transmission on a serial bus, communicate with a first device over a serial bus in accordance with a first mode of operation associated with a first protocol, after synchronization with the first device is established in response to the first SYNC code, provide an UNSYNC code to the transceiver for transmission on the serial bus, where the UNSYNC code is configured to cause a loss of synchronization with the first device, provide a second SYNC code to the transceiver for transmission on the serial bus, and communicate with a second device over the serial bus in accordance with a second mode of operation associated with the first protocol, after synchronization with the second device is established in response to the second SYNC code.

BRIEF DESCRIPTION OF THE DRAWINGS

FIGS. 23 and 24 provide a table illustrating one example of a mapping used in CCIe transmission system.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Figure 1:
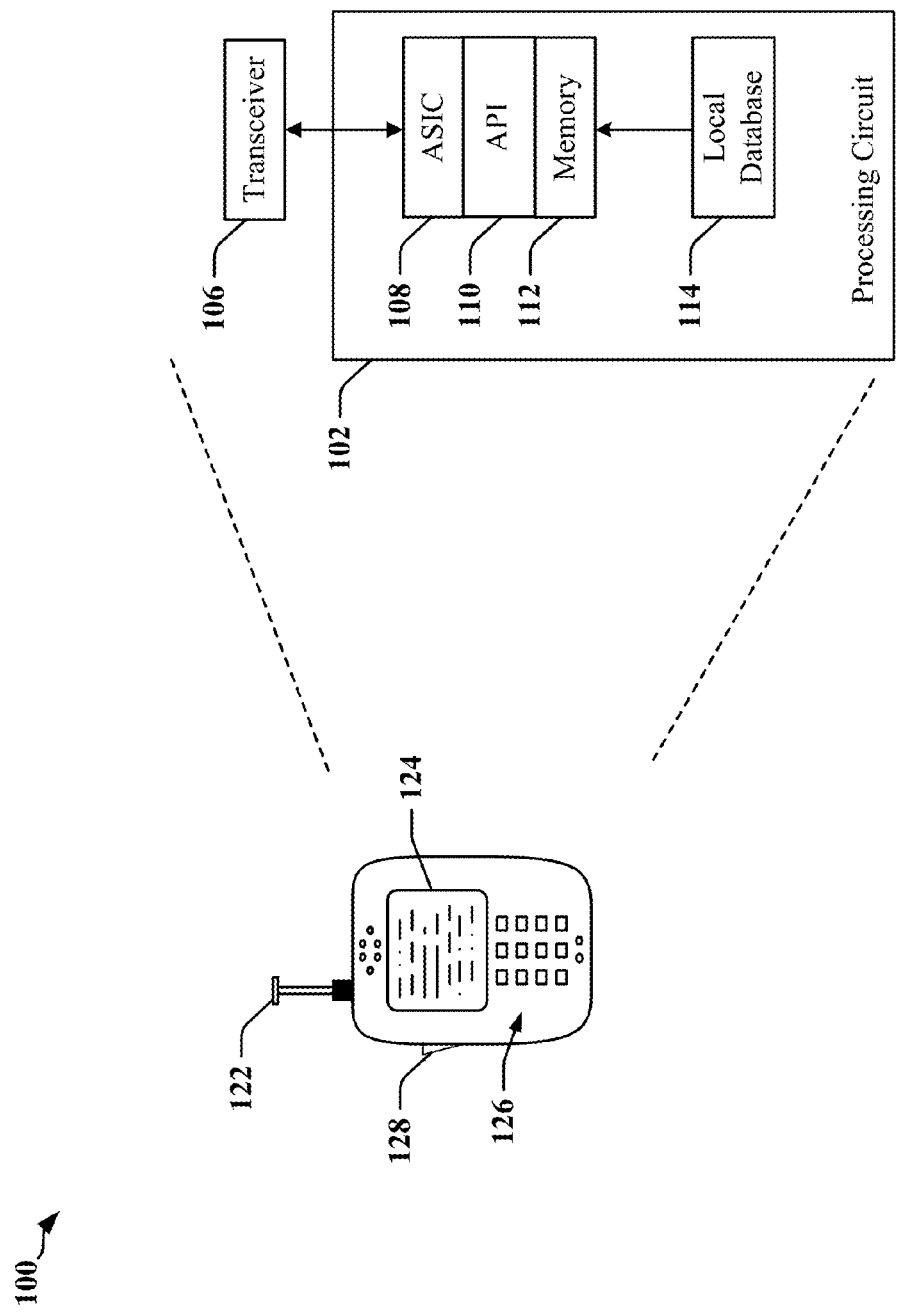
FIG. 1 depicts an apparatus employing a data link between integrated circuit (IC) devices that selectively operates according to one of plurality of available standards.

Certain aspects of the invention may be applicable to communications links deployed between electronic devices that may include subcomponents of an apparatus such as a telephone, a mobile computing device, an appliance, automobile electronics, avionics systems, etc. FIG. 1 depicts an apparatus that may employ a communication link between IC devices. In one example, the apparatus 100 may include a wireless communication device that communicates through an RF transceiver with a radio access network (RAN), a core access network, the Internet and/or another network. The apparatus 100 may include a communications transceiver 106 operably coupled to processing circuit 102. The processing circuit 102 may include one or more IC devices, such as an application-specific IC (ASIC) 108. The ASIC 108 may include one or more processing devices, logic circuits, and so on. The processing circuit 102 may include and/or be coupled to processor-readable storage such as a memory device 112 that may maintain instructions and data that may be executed by processing circuit 102. The processing circuit 102 may be controlled by one or more of an operating system and an application programming interface (API) 110 layer that supports and enables execution of software modules residing in storage media, such as the memory device 112 of the wireless device. The memory device 112 may include read-only memory (ROM) or random access memory (RAM), electrically erasable programmable ROM (EEPROM), flash cards, or any memory device that can be used in processing systems and computing platforms. The processing circuit 102 may include or access a local database 114 that can maintain operational parameters and other information used to configure and operate apparatus 100. The local database 114 may be implemented using one or more of a database module, flash memory, magnetic media, EEPROM, optical media, tape, soft or hard disk, or the like. The processing circuit may also be operably coupled to external devices such as antenna 122, display 124, operator controls, such as button 128 and keypad 126 among other components.

Figure 2:
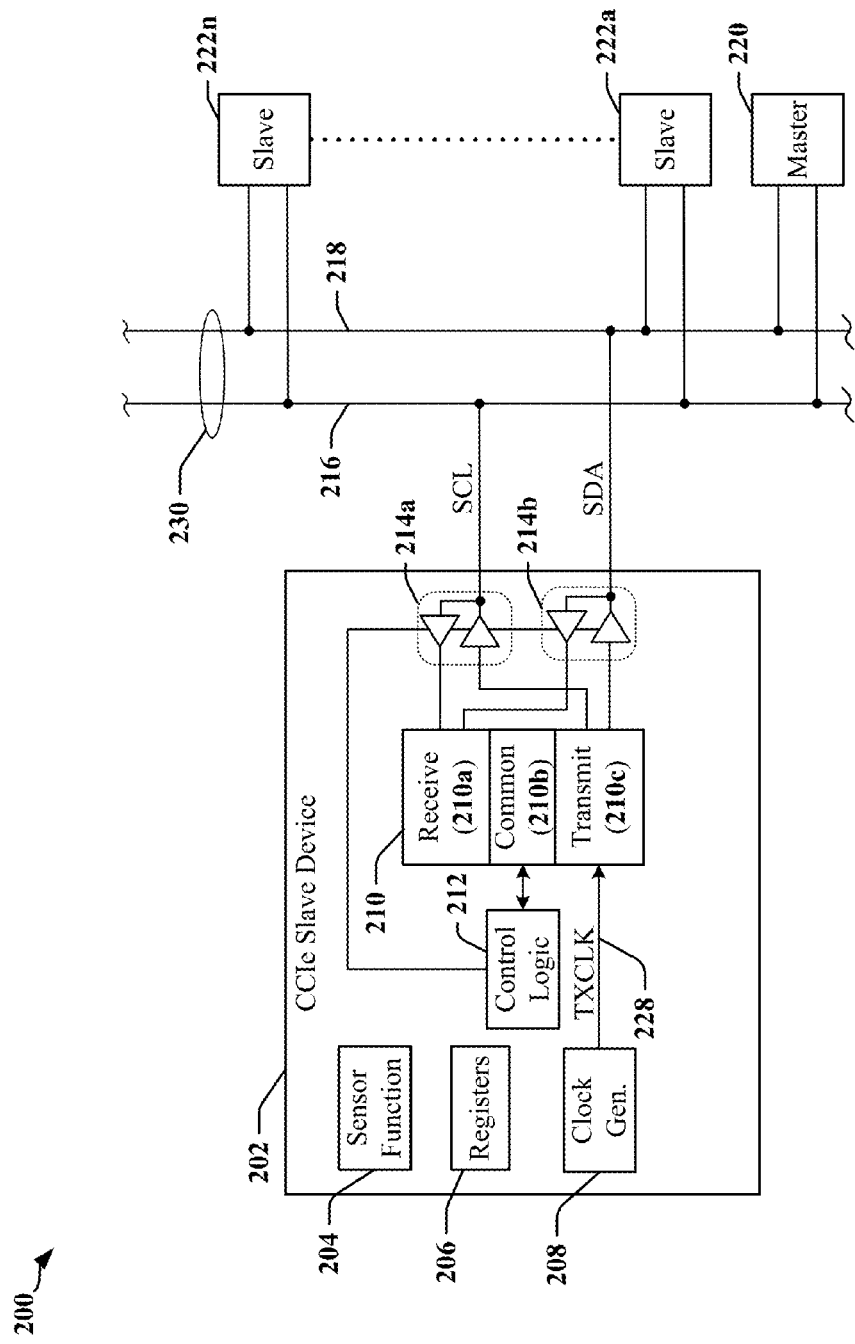
FIG. 2 illustrates a system architecture for an apparatus employing a data link between IC devices.

FIG. 2 is a block schematic illustrating certain aspects of an apparatus 200 connected to a communications bus, where the apparatus may be embodied in one or more of a wireless mobile device, a mobile telephone, a mobile computing system, a wireless telephone, a notebook computer, a tablet computing device, a media player, a gaming device, or the like. The apparatus 200 may include multiple devices 202, 220 and 222a-222n, which communicate using a CCIe bus 230. The CCIe bus 230 can extend the capabilities of a conventional CCI bus for devices that are configured for enhanced features supported by the CCIe bus 230. For example, the CCIe bus 230 may support a higher bit rate than a CCI bus. According to certain aspects disclosed herein, some versions of the CCIe bus may be configured or adapted to support bit rates of 16.7 Mbps or more, and some versions of the CCIe bus may be configured or adapted to support data rates of at least 23 megabits per second.

In the example illustrated in FIG. 2, an imaging device 202 is configured to operate as a slave device on the CCIe bus 230. The imaging device 202 may be adapted to provide a sensor control function 204 that manages an image sensor, for example. In addition, the imaging device 202 may include configuration registers 206 or other storage devices, control logic 212, a transceiver 210 and line drivers/receivers 214a and 214b. The control logic 212 may include a processing circuit such as a state machine, sequencer, signal processor or general-purpose processor. The transceiver 210 may include a receiver 210a, a transmitter 210c and common circuits 210b, including timing, logic and storage circuits and/or devices. In one example, the transmitter 210c encodes and transmits data based on timing provided by a clock generation circuit 208.

Figure 3:
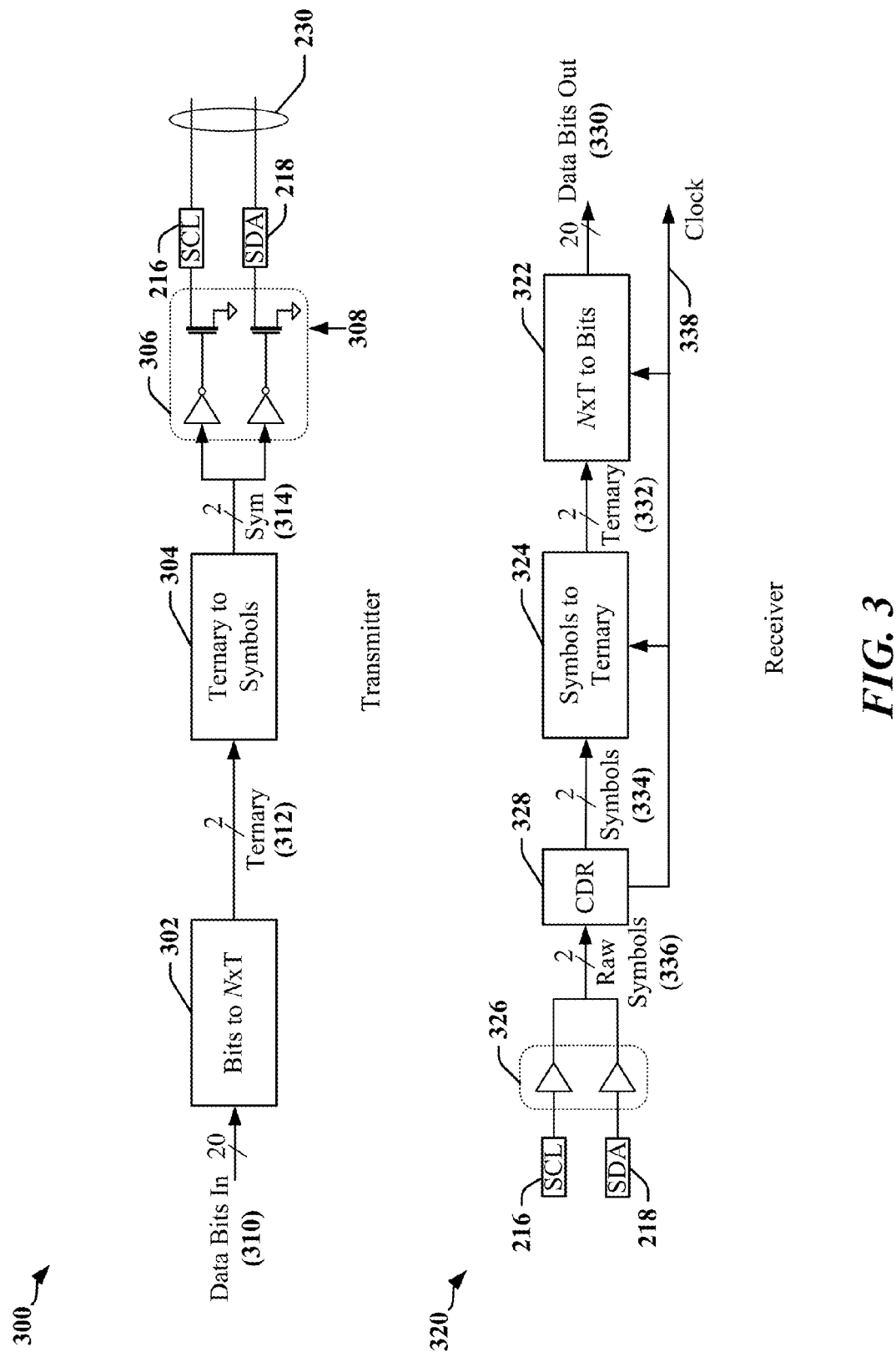
FIG. 3 illustrates certain aspects of a transmitter and a receiver according to certain aspects disclosed herein.

FIG. 3 is a block diagram illustrating an example of a transmitter 300 and a receiver 320 configured according to certain aspects disclosed herein. For CCIe operations, the transmitter 300 may transcode input data 310 into ternary (base-3) numbers which are encoded as symbols transmitted on the SCL signal 216 and SDA signal 218 signal wires. In the example depicted, each data element (also referred to as a data word) of the input data 310 may have 19 or 20 bits. A transcoder 302 may receive the input data 310 and produce a sequence of ternary numbers 312 for each data element. A ternary number 312 may be encoded in two bits and there may be 12 ternary numbers in each sequence of ternary numbers 312. An encoder 304 produces a stream of 2-bit symbols 314 that are transmitted through line drivers 306. In the example depicted, the line drivers 306 include open-drain output transistors 308. However, in other examples, the line drivers 306 may drive the SCL signal 216 and SDA signal 218 signal wires using push-pull drivers. The output stream of 2-bit symbols 314 generated by the encoder has a transition in the state of at least one of the SCL signal 216 and SDA signal 218 signal wires between consecutive symbols 314 by ensuring that no pair of consecutive symbols includes two identical symbols. The availability of a transition of state in at least one signal 216 and/or 218 permits a receiving circuit 320 to extract a receive clock 338 from the stream of data symbols 314.

In a CCIe system, the receiver 320 may include or cooperate with a clock and data recovery (CDR) circuit 328. The receiver 320 may include line interface circuits 326 that provide a stream of raw 2-bit symbols 336 to the CDR 328. The CDR 328 extracts a receive clock 338 from the raw symbols 336 and provides a stream of 2-bit symbols 334 and the receive clock 338 to other circuits 324 and 322 of the receiver 320. In some examples, the CDR 328 may produce multiple clocks 338. A decoder 324 may use the receive clock 338 to decode the stream of symbols 334 into sequences of 12 ternary numbers 332. The ternary numbers 332 may be encoded using two bits. A transcoder 322 may then convert each sequence of 12 ternary numbers 332 into 19-bit or 20-bit output data elements 330.

Figure 4:
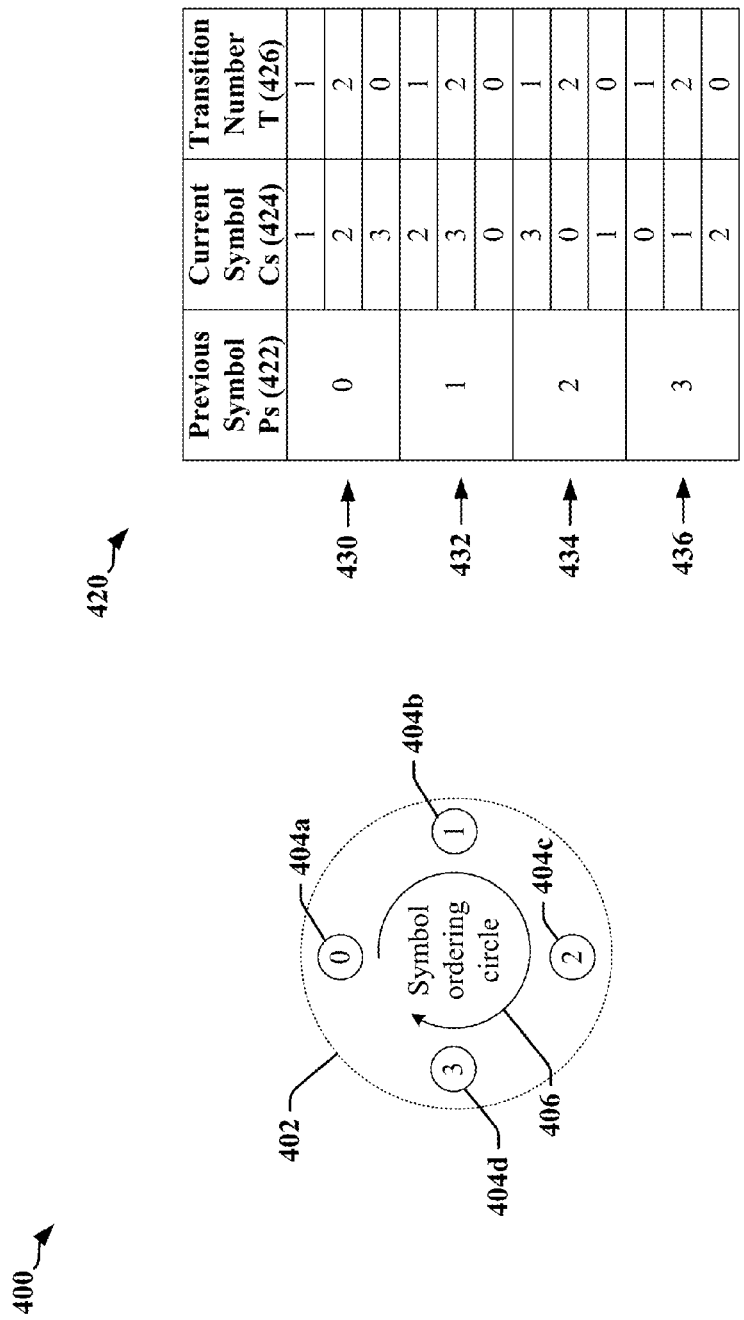
FIG. 4 illustrates an encoding scheme for transcoding data according to certain aspects disclosed herein.

FIG. 4 is a drawing illustrating an encoding scheme 400 that may be used by the encoder 304 to produce a sequence of symbols 314 with an embedded clock for transmission on the CCIe bus 230. The encoding scheme 400 may also be used by a decoder 324 to extract ternary transition numbers from symbols received from the CCIe bus 230. In the CCIe encoding scheme 400, the two wires of the CCIe bus 230 permit definition of 4 basic symbols S: {0, 1, 2, 3}. Any two consecutive symbols in the sequence of symbols 314, 334 have different states, and the symbol sequences 0,0, 1,1, 2,2 and 3,3 are invalid combinations of consecutive symbols. Accordingly, only 3 valid symbol transitions are available at each symbol boundary, where the symbol boundary is determined by the transmit clock and represents the point at which a first symbol (previous symbol Ps) 422 terminates and a second symbol (current symbol Cs) 424 begins.

According to certain aspects disclosed herein, the three available transitions are assigned a transition number 426 with a value "T" for each Ps symbol 422. T can be represented by a ternary number. In one example, the value of a transition number 426 is determined by assigning a symbol ordering circle 402 for the encoding scheme. The symbol ordering circle 402 allocates locations 404a-404d on the symbol ordering circle 402 for the four possible symbols, and a direction of rotation 406 between the locations 404a-404d. In the depicted example, the direction of rotation 406 is clockwise. The transition number 426 may represent the separation between the valid current symbols 424 and the immediately preceding symbol 422. Separation may be defined as the number of steps along the direction of rotation 406 on the symbol ordering circle 402 required to reach the current symbol Cs 424 from the previous symbol 422. The number of steps can be expressed as a single digit base-3 number. It will be appreciated that a three-step difference between symbols can be represented as a $0_{base-3}$. The table 420 in FIG. 4 summarizes an encoding scheme employing this approach.

At the transmitter 300, the table 420 may be used to lookup a current symbol 424 to be transmitted, given knowledge of the previously generated symbol 422 and an input ternary number, which is used as a transition number 426. At the receiver 320, the table 420 may be used as a lookup to determine a transition number 426 that represents the transition between the previously received symbol 422 and the currently received symbol 424. The transition number 426 may be output as a ternary number.

Figure 5:
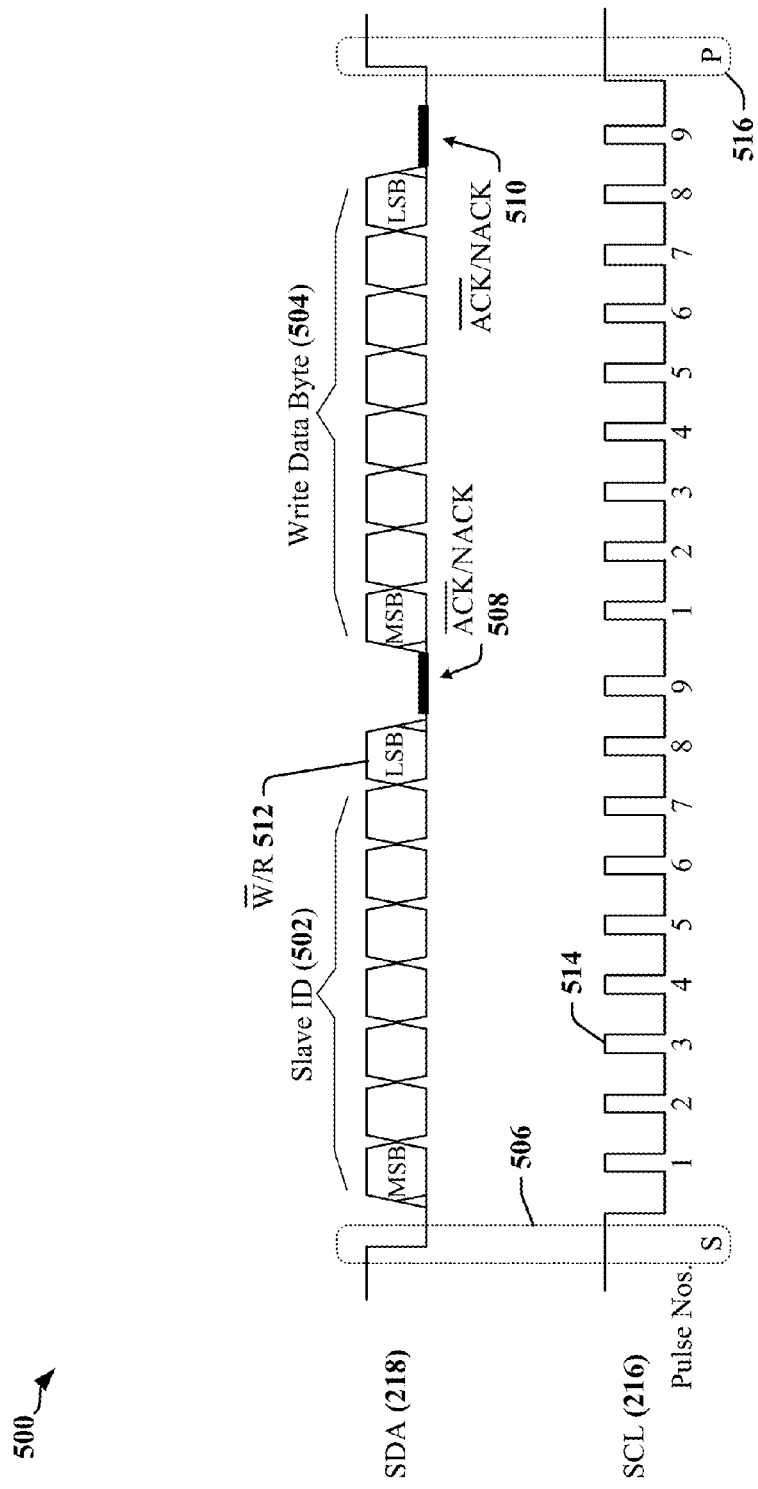
FIG. 5 illustrates a timing diagram of an I2C one byte write data operation.

FIG. 5 is a timing diagram 500 illustrating an I2C one byte write data operation. An I2C master node sends a 7-bit slave identifier (slave ID) 502 on the SDA signal 218 to indicate which slave node on the I2C bus the master node wishes to access, followed by a Read/Write bit 512 that indicates whether the operation is a read or a write operation, whereby the Read/Write bit 512 is at logic 0 to indicate a write operation and at logic 1 to indicate a read operation. Only the slave node whose ID matches with the 7-bit slave ID 502 can respond to the write (or other) operation. In order for an I2C slave node to detect its own slave ID 502, the master node transmits at least 8-bits on the SDA signal 218, together with 8 clock pulses on the SCL signal 216. This behavior may be exploited to transmit data in CCIe operating modes in order to prevent legacy I2C slave nodes from reacting to CCIe operations.

Figure 6:
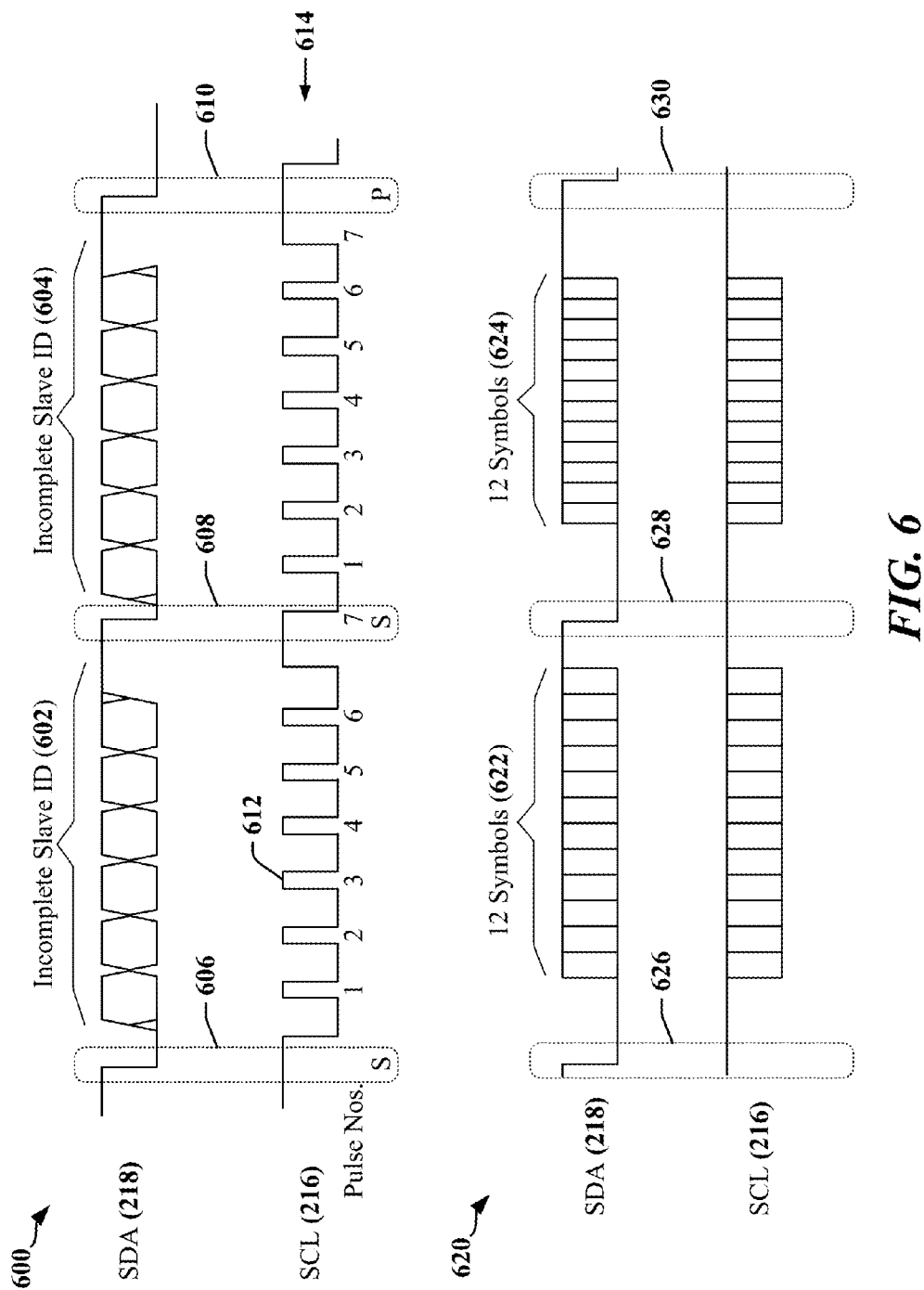
FIG. 6 illustrates the effect a START condition has on a legacy I2C slave node.

FIG. 6 illustrates one example 600 in which the effect of a START condition 606, 608 or 610 on a legacy I2C slave node, where the START condition 606, 608 or 610 is indicated by a high to low signaling state transition on the SDA signal 218 while the SCL signal 216 is in a high signaling state. In this example 600, certain START conditions 608 or 610 may be detected before a complete, 7-bit slave ID has been transmitted. The resultant incomplete slave ID 602, 604 is not recognized by any slave device. In operation, the effect of a master node issues a START condition 608, 610 after sending only 6 pulses 612 on the SCL signal 216 includes causing all legacy I2C slave nodes to reset their bus logic before the possibility of recognizing their respective I2C slave ID on the SDA signal 218 occurs. In other words, information in the 6-bit sequences 602, 604 on the SDA signal 218 sent between two START conditions 606, 608 and/or 610 are not decoded as a valid slave ID by any of the slave nodes. Consequently, legacy I2C slave nodes are not expected to respond to the incomplete slave IDs 602, 604.

FIG. 6 also includes an example 620 illustrating the use of the combination of the SCL signal 216 and the SDA signal 218 of an I2C bus for data transmission in a CCIe mode. A CCIe symbol may be transmitted at a time corresponding to each toggle of a clock signal 614 transmitted on the SCL signal 216 for an I2C transmission. The number of clock toggles transmitted between two START conditions 608, 610 may therefore define the number of symbols that may be transmitted for each CCIe transmission. Accordingly, 12 symbol transmissions 622, 624 may be provided in the 12 signaling states available during a 6-SCL pulse sequence that is equivalent to an incomplete slave ID 602, 604 transmission, without causing any slave nodes to detect the sequence as an I2C slave ID.

Transitions occurring on the SDA signal 216 coincident with a transition on the SCL signal 216 are inconsequential to legacy I2C devices which may interpret such transitions as a START condition. However, the legacy I2C device detects a later occurring valid START condition 628, 630 which resets the bus logic detection of the I2C slave node. Thus, the I2C slave nodes may detect some SDA transitions occurring during the CCIe transmissions 622, 624 as a STOP condition, but detection of such a STOP condition within the CCIe transmissions 622, 624 merely causes earlier termination of the incomplete SID 602, 604. Similarly, detection of a START condition during the CCIe transmissions 622, 624 merely performs a bus logic reset of the I2C function of the slave nodes.

Therefore, it is apparent that the legacy I2C slave nodes can be expected to ignore the 12 symbol CCIe transmissions 622, 624 during a 6-SCL pulse sequence as an incomplete I2C slave ID 602, 604. Additionally, during the 14 SCL toggles between START conditions 606, 608, and 610, twelve (12) symbols may be transmitted on the SCL signal 216 and/or the SDA signal 218.

The SCL signal 216 and/or the SDA signal 218 of an I2C bus may be utilized for data transmission in CCIe mode when clock signal has been embedded within symbol transitions. Consequently, the SDA signal 218 and SCL signal 216 can be used to transmit any arbitrary 12 symbols between two consecutive START conditions 626, 628 and/or 630, without affecting legacy I2C slave node functionality and without using a bridge device to segregate legacy I2C slave nodes from the CCIe-capable nodes. In I2C mode, a START condition is sent only by an I2C master, while a START condition is sent by whichever node is going to transmit a 12-symbol word in CCIe mode.

Under certain conditions, I2C devices may confuse or misinterpret certain CCIe symbol sequences in the transmissions 622, 624 as a valid I2C pulse, thereby causing unwanted and unpredictable changes to the I2C device state machine. For instance, the 12 CCIe symbols sent at a symbol period shorter than half of the maximum period ($t_{BIT}$) allowed by the I2C specification may cause an I2C device state machine to go into unknown state due to setup timing errors. Slowing down CCIe symbol rate to satisfy a minimum SCL period that is greater than min $t_{BIT}$ requirement can slow the CCIe bit rate from 14 Mbps to 2.4 Mbps. Consequently, the CCIe devices may be configured to operate over the I2C bus without causing conflicts or unwanted state changes on the I2C devices.

Figure 7:
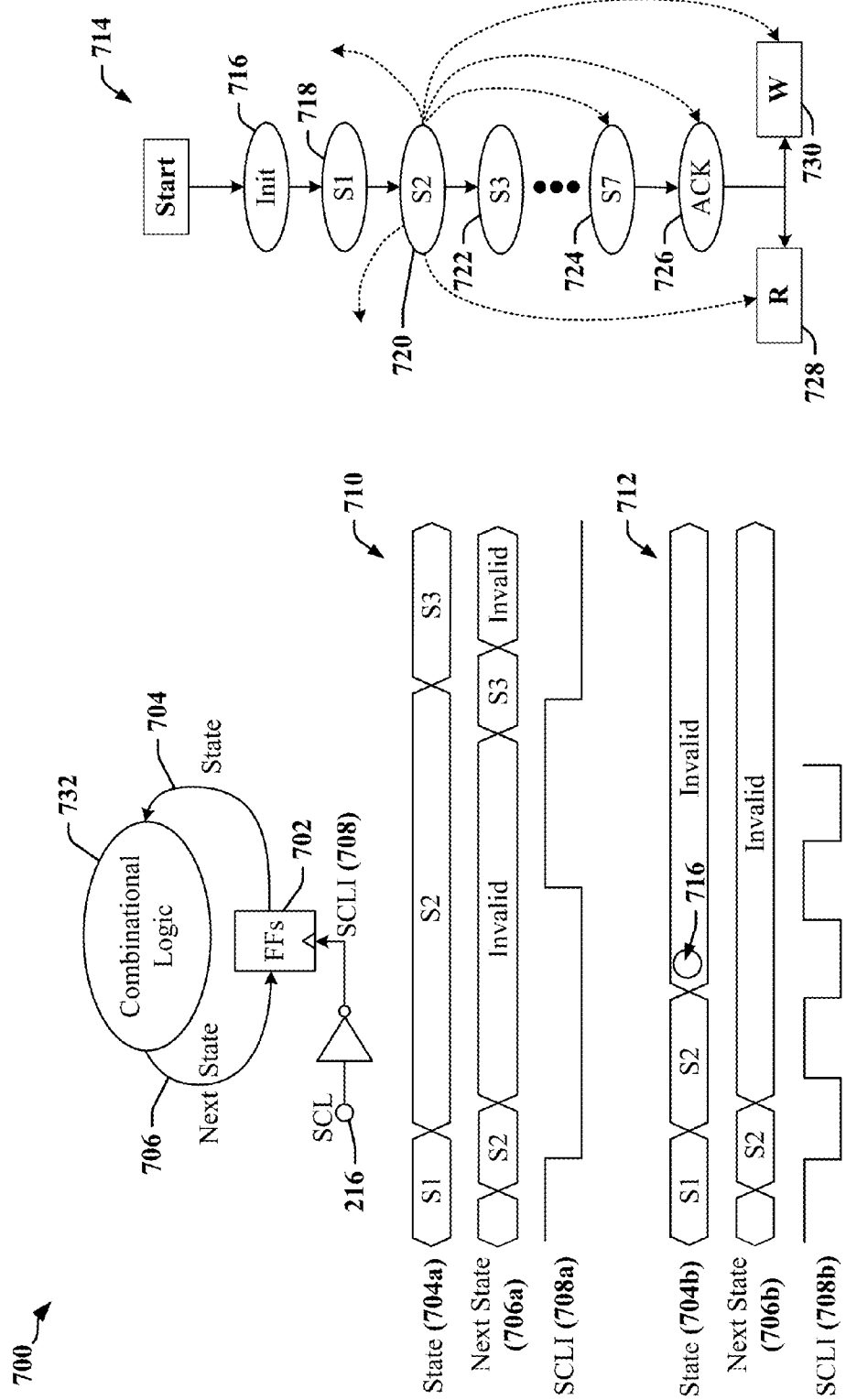
FIG. 7 illustrates a state machine for an I2C device.

FIG. 7 includes a block diagram illustrating a state machine 700 for an I2C device. In the I2C protocol, the state machine 700 is maintained to track I2C frame and/or word transmission and/or reception. The state machine 700 is triggered based on the SCL signal 216 of the bus and transitions through various states 702. A state machine transition diagram 714 illustrates the possible transitions in state 702 for one example of a state machine 700.

Two examples of timing diagrams 710, 712 illustrate differences in behavior of the state machine 700 as the frequency of occurrence of edges in signal on the SCL signal 216 increases. Thus, a first timing diagram 710 may relate to a slower CCIe symbol transmission period, while a second timing diagram 712 illustrates the transitions in state 702 of the state machine 700 that experiences unpredictable changes at higher frequencies. As a result of these unpredictable changes, an I2C device may initiate receiving or transmitting over the bus when it is not supposed to do so, or enter an indeterminate state in which the I2C device becomes non-responsive, ceases controlled operation, and/or ceases further function.

In one example, problems can occur when the flip-flops that maintain the state 702 of the state machine 700 sample output of the combinational logic 732 before the logic 732 has produced a final, stable result. In particular, sequential logic may transition between one or more unintended states because the combinational logic 732 cannot catch up with the shortest period between edges of the signal on the SCL signal 216, which may be 2 symbol periods for CCIe modes of communication. In other words, the period of symbol transmissions on the SCL line is shorter than a maximum allowable setup time of the state machine combinational logic 732, and the flip-flops that maintain the state 702. I2C devices may include an input filter that filters out symbol transmission periods that are less than 50 ns in duration. The filtered signals may be provided to the combinational logic 732 in an I2C device, such that symbol transmissions of 50 ns or less do not trigger a state change. However, symbol transmission periods larger than 50 ns pass through the input filter to the combinational logic 732, and those longer symbol transmissions may trigger a state change that may be out of sequence, thereby causing problems in the I2C devices. In the example, a shorter clock signal 706b may capture an invalid state value 716 causing an indeterminate branch at the incorrectly captured state 716.

Figure 8:
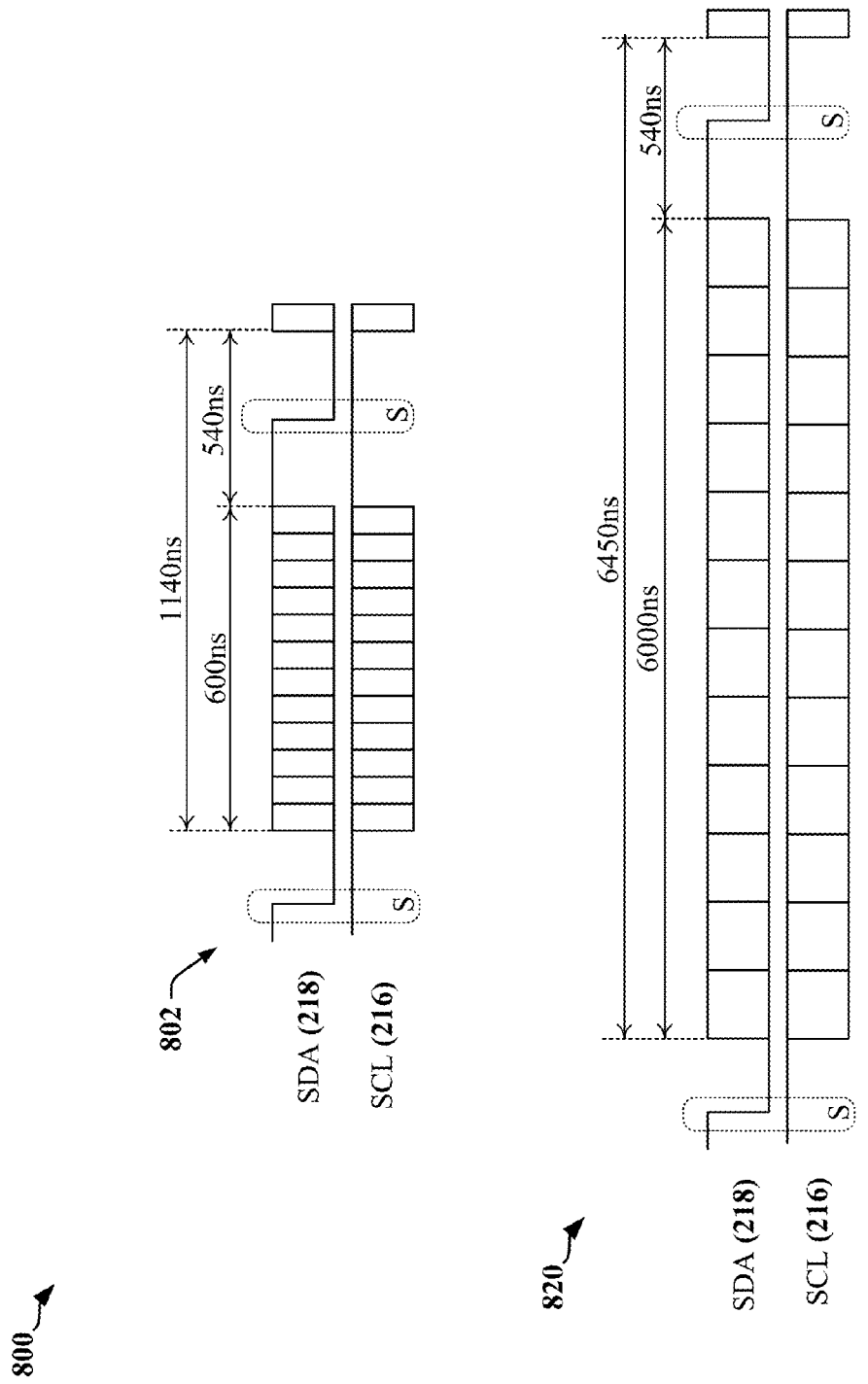
FIG. 8 illustrates a transmission method that prevents an I2C device from malfunctioning during CCIe transmission on a shared bus.

FIG. 8 illustrates an example of a transmission method that can prevent an I2C device state machine 700 from changing during CCIe transmission on the shared bus. In this approach, all CCIe symbol transmissions 802 (see also FIG. 6) are stretched from 50 ns to 500 ns. With a 500 ns symbol cycle, the shortest possible SCL period is 1000 ns (1 MHz) which meets Fast Mode plus (Fm+) setup ($f_{SCL}$) maximum requirements allowing I2C device designed for supporting Fm+ to avoid setup timing issues. However, stretching the symbol period from 50 ns to 500 ns has the undesirable effect of reducing throughput from 14.04 Mbps to 2.45 Mbps.

Figure 9:
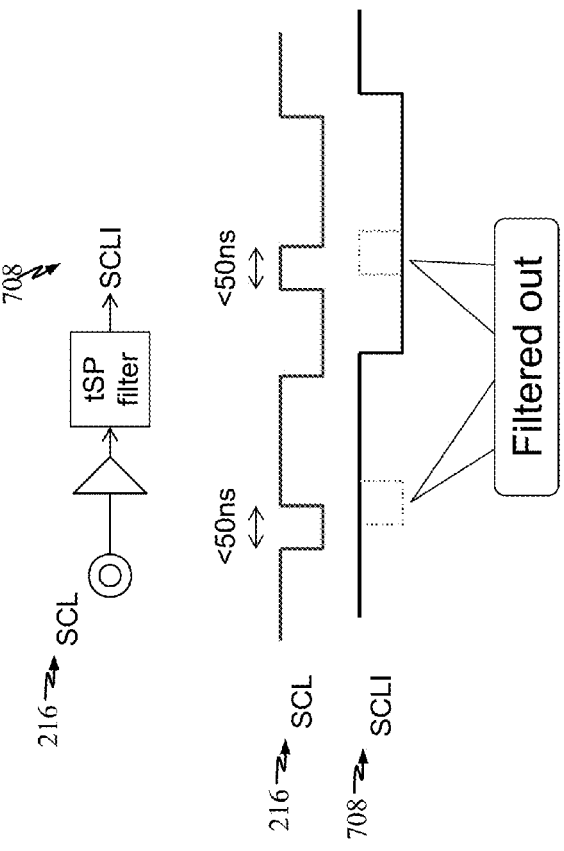
FIG. 9 illustrates filtering of pulses by input filters on the SDA line and SCL line.

FIG. 9 is a drawing 900 illustrating the filtering of pulses that have symbol periods of less than 50 ns by input filters on the SDA line and SCL line. It is a requirement of the I2C specification that symbols of 50 ns or less be filtered by devices that are compatible or compliant with I2C Fast mode (Fm) or Fm+ devices. Accordingly, in certain instances selective stretching may be applied such that only symbol transmissions that cause an effective period greater than or equal to 50 ns are stretched.

Figure 10:
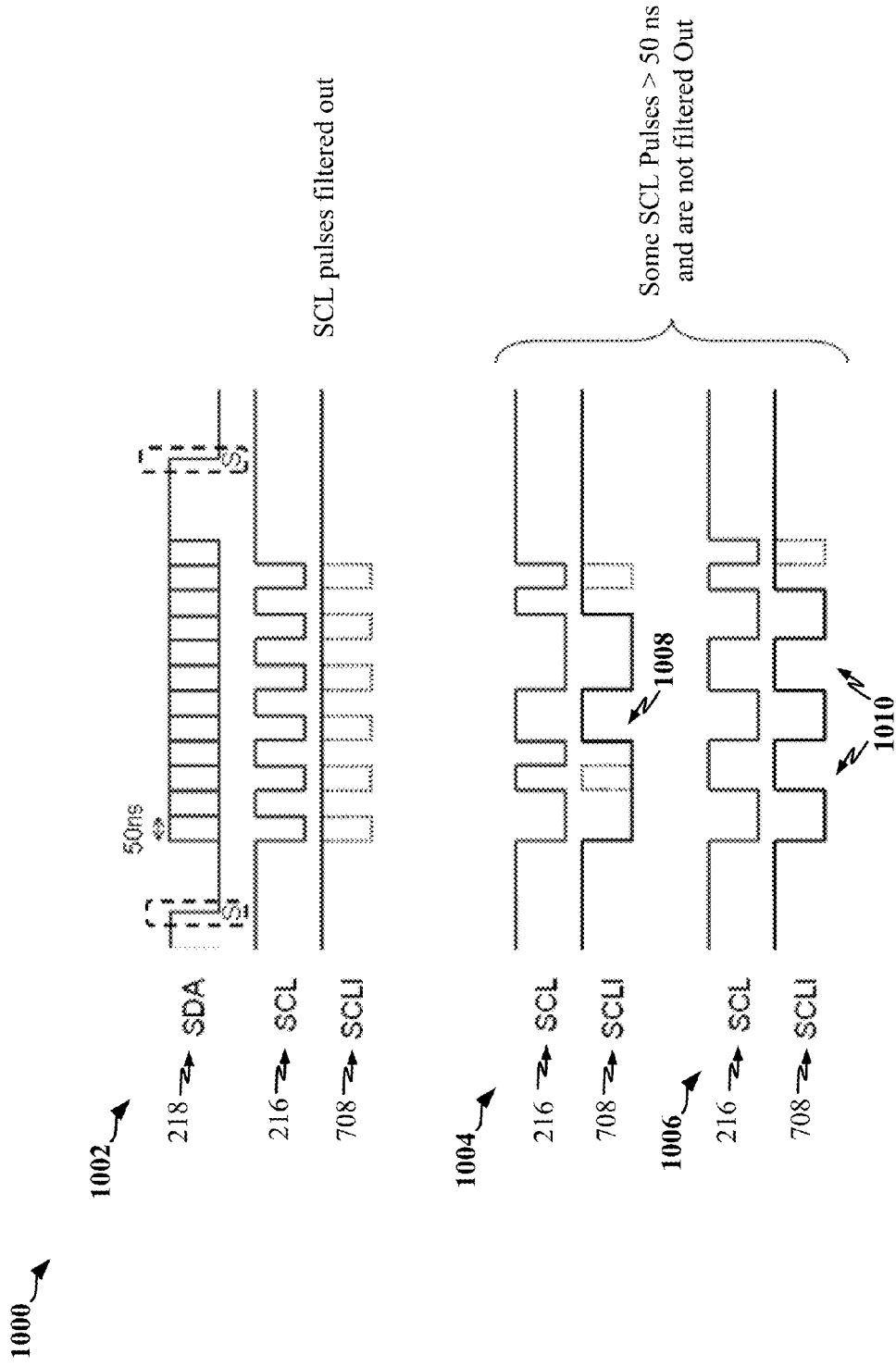
FIG. 10 illustrates filtering of symbols by the input filters of an I2C receiver.

FIG. 10 is a diagram 1000 illustrating an example in which some symbols may be filtered by the input filters of an I2C device receiver. In the first graph 1002, the SDA signal 218 and SCL signal 216 have symbol durations of 50 ns or less. That is, in this example, the symbols on the SCL signal 216 switch state (e.g., low-high or high-low) every period. The symbols on the SCL signal 216 are filtered out by the input filter of the I2C device receiver so that the SCLI line 708 has no transitions (i.e., no clock signal reaches the combinational logic 704).

In the second graph 1004, some of the symbols on the SCL signal 216 do not change state every period, so some appear as pulses 1008 having a period greater than 50 ns. Consequently, these pulses 1008 on the SCLI line 708 are not filtered out by the input filter of the I2C device receiver. These pulses 1008 then reach the combinational logic and may cause unwanted state changes.

In the third graph 1006, many more pulses reach the SCLI line 708, causing unwanted state changes to the I2C devices.

Figure 11:
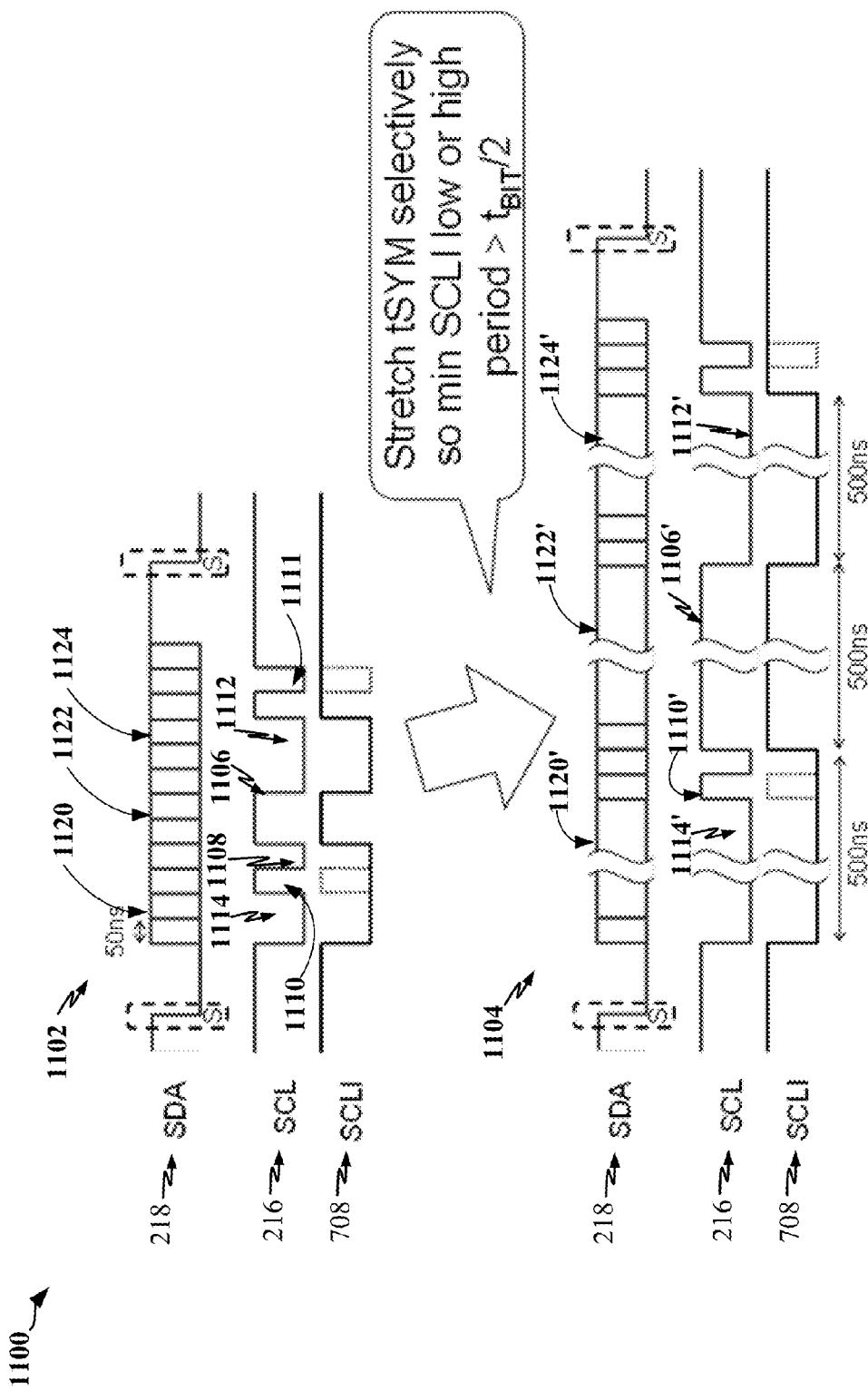
FIG. 11 illustrates stretching of symbols transmitted on a CCIe device.

FIG. 11 illustrates an example in which some symbols transmitted in CCIe mode on the SCL signal 216 may be selectively stretched so that unwanted state changes do not occur on the I2C device. A first graph 1102 illustrates some pulses that may be filtered by the input filter of the I2C device receiver while some symbol slots may require stretching. For example, a first pulse 1110 and a second pulse 1111, each within a single symbol slot, may be filtered (see SLCI line 706). A first symbol slot 1120, (having a first symbol pulse 1114), a second symbol slot 1122 (having a second symbol pulse 1106), and a third symbol slot 1124 (having a third symbol pulse 1112) may be stretched. For instance, since a low-to-high transition occurs between the first symbol pulse 1114 and the next symbol slot, a condition occurs in which unwanted state changes in I2C devices may be caused. Consequently, the corresponding symbol slot 1120 may require stretching. Similar conditions are present after the second symbol pulse 1106 and third symbol pulse 1112.

In a second graph 1104, the stretched symbol slots 1120', 1122' and 1124' are illustrated so that period between state changes is at least 500 ns, thereby preventing changes to the I2C device states. Note that, in order to perform such stretching, the transmitting CCIe device may look ahead to at least the next symbol pulse to ascertain whether a change of state is occurring.

Figure 12:
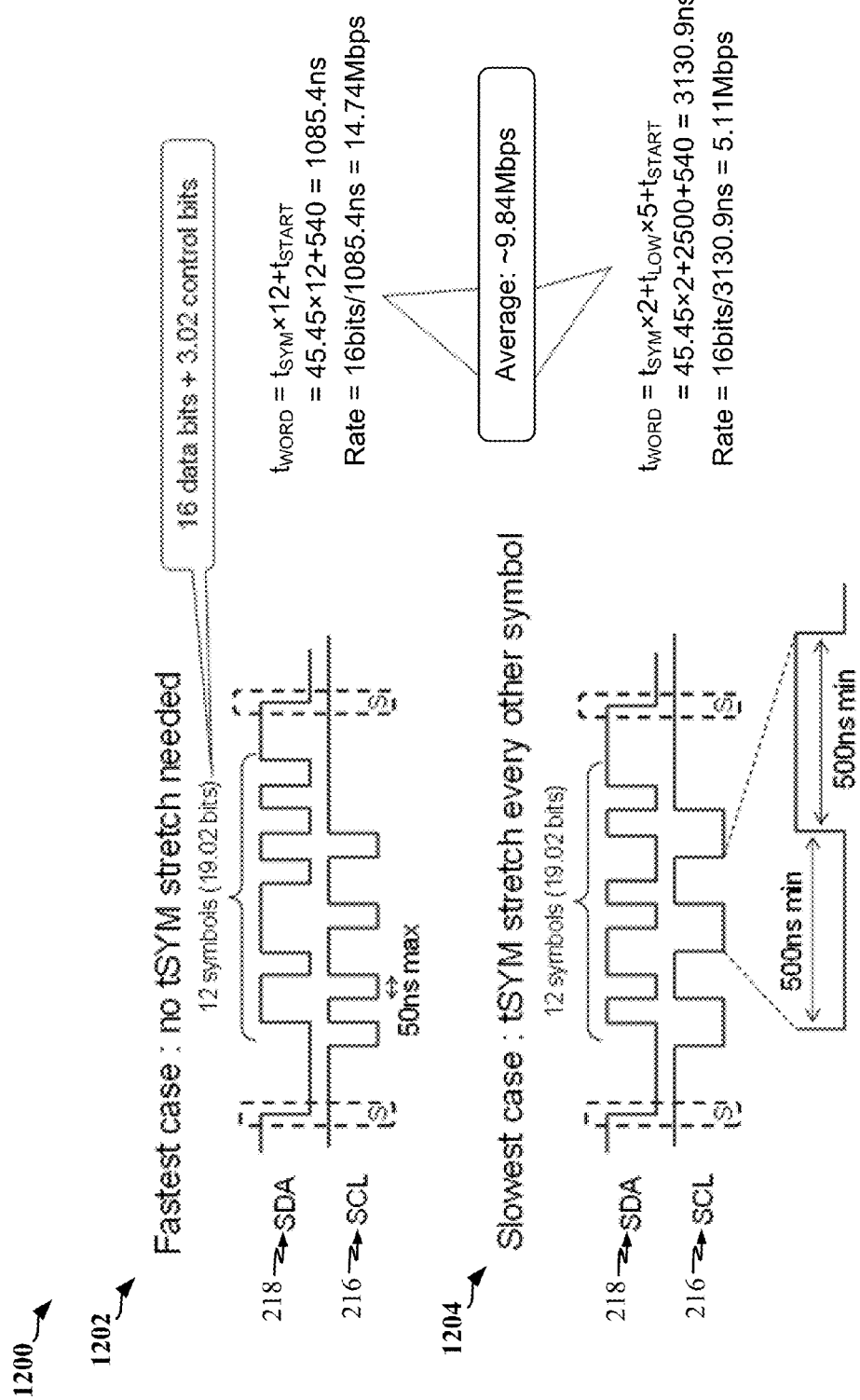
FIG. 12 illustrates best and worst case throughput when symbol periods are stretched.

FIG. 12 includes examples of timing charts 1202, 1204 illustrating calculation of best and worst case data throughput for an approach in which certain symbol periods are selectively stretched. Examples of average throughput may be calculated to provide a comparison of the data rates achievable for different configurations of a communication interface. The different configurations may be applied to address issues associated with maximum $f_{SCL}$ and/or unintended S/P metastability.

One example is illustrated by a first timing chart 1202. In this example, a 12-symbol CCIe configuration can achieve data rates of approximately 23 Mbps when no legacy I2C devices are operated on the same bus, or when all devices connected to the bus are capable of detecting a START condition before each CCIe word at $t_{SYM}$. In this example, $t_{START}=2\times t_{SYM}$, and $t_{SYM}$ is not stretched. A 12-symbol CCIe configuration can achieve data rates of approximately 14 Mbps when all legacy I2C devices operated on the same bus are synchronously designed for use with a reasonably fast clock, and the maximum $f_{SCL}$ and unintended S/P metastability issues are not present. In this example, $t_{START}$ is defined as I2C AC, and $t_{SYM}$ is not stretched.

Another example is illustrated by a second timing chart 1204. In this example, a 12-symbol CCIe configuration can achieve average data rates of 9.8 Mbps when all legacy I2C devices operated on the same bus are synchronously designed and free from the unintended S/P metastability issue, although one or more legacy I2C devices may be affected by the maximum $f_{SCL}$ issue. In this example, $t_{START}$ is defined as I2C AC, and $t_{SYM}$ is stretched. A 20-symbol CCIe configuration can achieve average data rates of 6.2 Mbps when one or more legacy I2C devices operated on the same bus may be susceptible to the maximum $f_{SCL}$ issue and/or an unintended S/P metastability issue. In this example, $t_{START}$ is defined as I2C AC, and $t_{SYM}$ is stretched.

Figure 13:
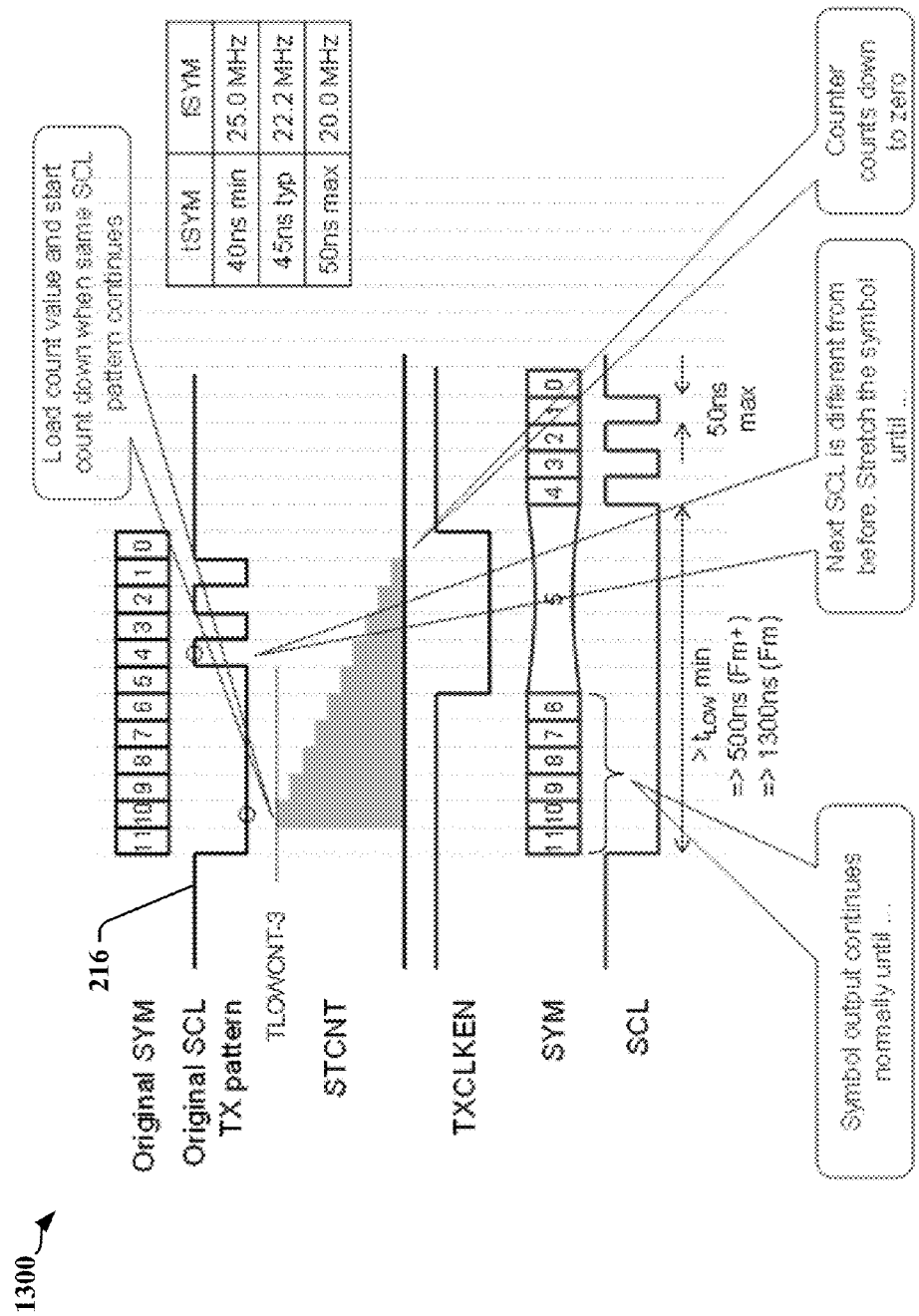
FIG. 13 illustrates a technique for determining when to stretch a symbol.

FIG. 13 illustrates one example of a technique that may be used by a CCIe transmitter to determine when a symbol should be stretched. Here, the SCL signal 216 may be stretched in a low signaling state. When two or more symbols create the same signaling pattern, such as a constant high or low logic state, a countdown value (STCNT) is initiated to ascertain the amount of time by which a particular symbol should be stretched. The countdown value may be decreased at every pre-stretch symbol cycle until it reaches zero. In the example, when the countdown value is reduced to zero, the pulse perceived at the I2C receiver is at least 500 ns long. In this example, symbols 11 to 5 produce the same signaling state on the SCL signal 216 (i.e., logic low), while symbol 4 produces a different signaling state (i.e., logic high). Thus, symbol 5 may be stretched so that the perceived pulse at the I2C device is equal to or greater than 500 ns.

Figure 14:
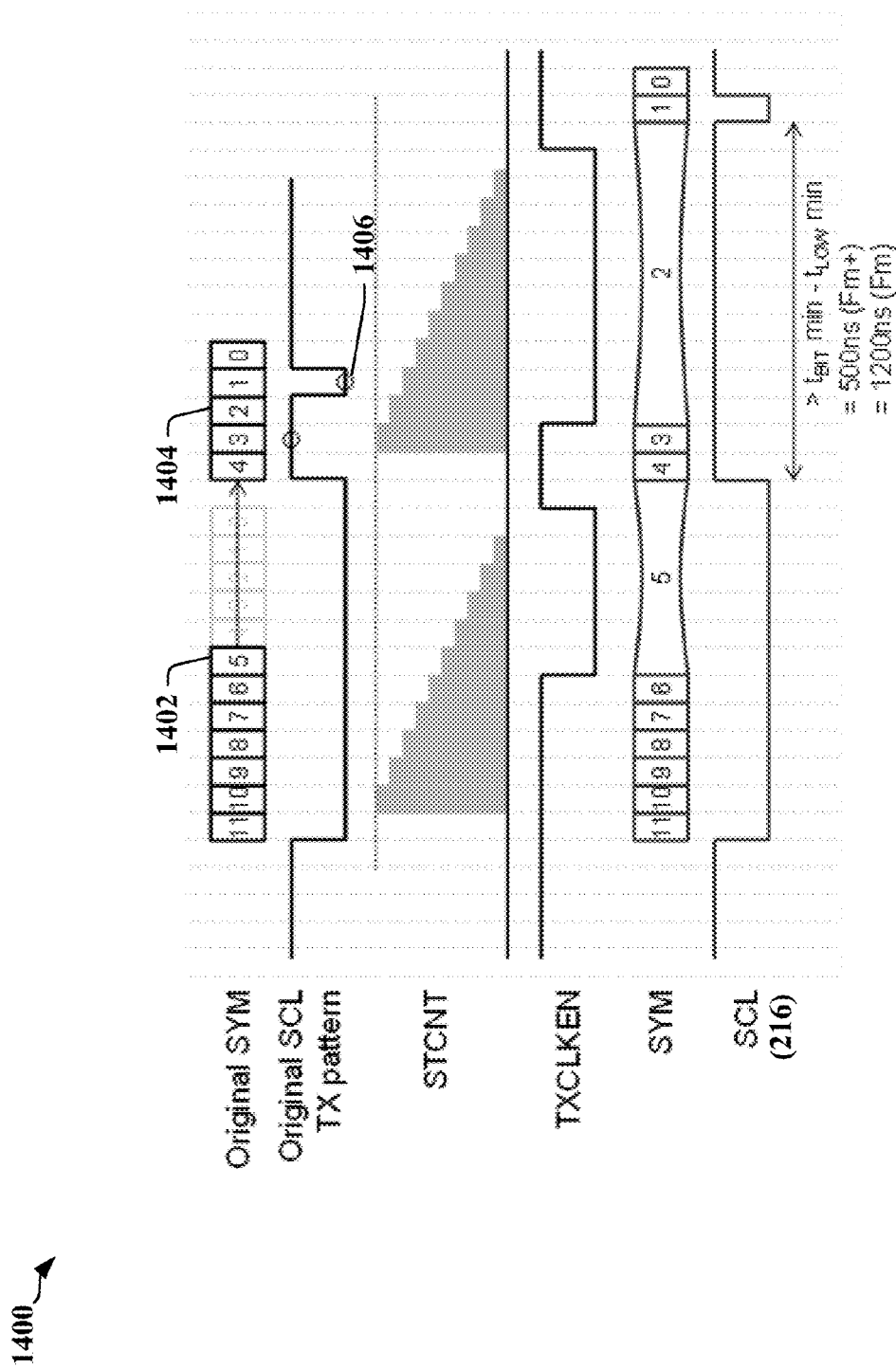
FIG. 14 illustrates another example in which symbol slots are selectively stretched during a transmission by a CCIe device.

FIG. 14 illustrates another example in which symbol slots are selectively stretched during a transmission by the transmitting CCIe device, such that both a first symbol pulse at the fifth symbol slot 1402 and a second, consecutive pulse at the second symbol slot 1404 are stretched. In this example, the second symbol slot 1404 may be blindly stretched when at least two consecutive symbol pulses cause the SCL signal 216 to be in the same state, without consideration as to the length of the subsequent pulse 1406.

Figure 15:
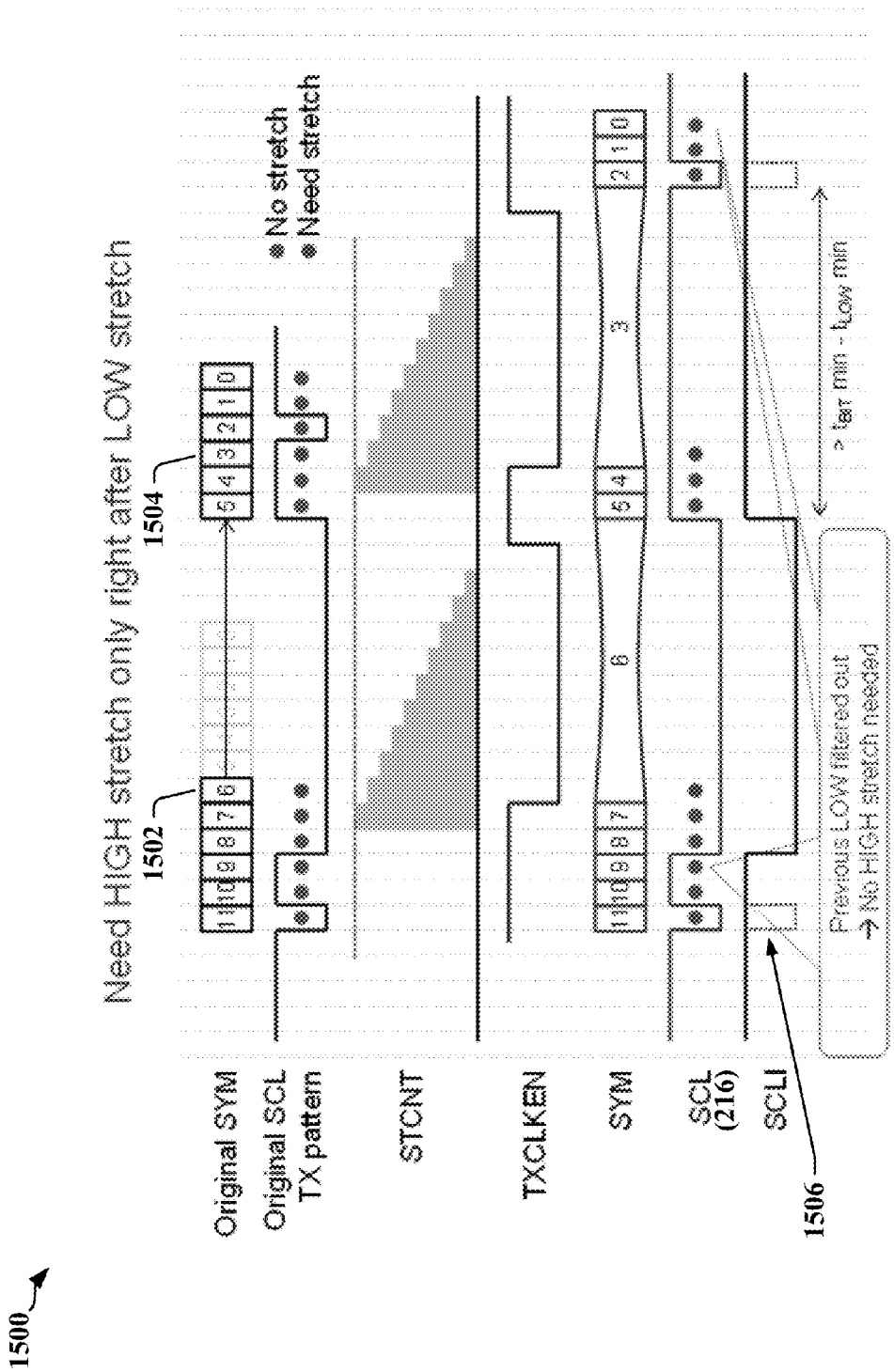
FIG. 15 illustrates yet another example in which symbol slots are selectively stretched during a transmission by a CCIe device.

FIG. 15 illustrates another example in which two symbol slots 1502 and 1504 are stretched during a transmission by the transmitting CCIe device. Here, a HIGH stretch only occurs after a LOW stretch. Accordingly, a HIGH stretch does not occur for symbol 10-9 because there is no LOW stretch preceding those symbols since SCL=0 of symbol 11 is filtered out by I2C devices.

In this example, the sixth symbol slot 1502 is in a low state and is stretched, and the third symbol slot 1504 is also in a high state and stretched. This example also illustrates that even though there is a symbol transition from symbol pulse 11 to symbol pulse 10, there is no need to stretch symbol slot 11 since the pulse is filtered out 1506 by input filters of I2C devices. However, the high to low transition from the ninth symbol slot to the eighth symbol slot is perceived as a pulse by the I2C receiver. Consequently, since there is a low to high transition from the sixth symbol pulse to the fifth symbol pulse, the sixth symbol slot is stretched until the countdown value (STCNT) reaches zero (e.g., until the perceived pulse period is at least 500 ns).

In another example, a look-ahead approach causes two symbols slots to be stretched during a transmission by the transmitting CCIe device. A look-ahead is performed on the transmission pattern and the transmitter decides a duration of stretch for a HIGH period based on future symbol transmissions in subsequent symbol slots. If there is no non-filtered LOW period in the future, one HIGH period stretch can continue for as many symbols as necessary to minimize word time.

Certain metastable conditions may arise during CCIe transmissions. During the twelve CCIe symbol transmissions described herein, signal metastability may occur in the logic devices of legacy I2C devices coupled to a bus shared with CCIe devices. Such metastability may occur, for example, when the states of the SDA signal 218 and the SCL signal 216 change at the same time. A legacy I2C device may determine that transition is a START or STOP condition in some instances and may determine otherwise in other instances. Such detections may become metastable, which may cause logic devices in legacy I2C devices coupled to the shared bus to go into a wrong/unknown state.

Figure 16:
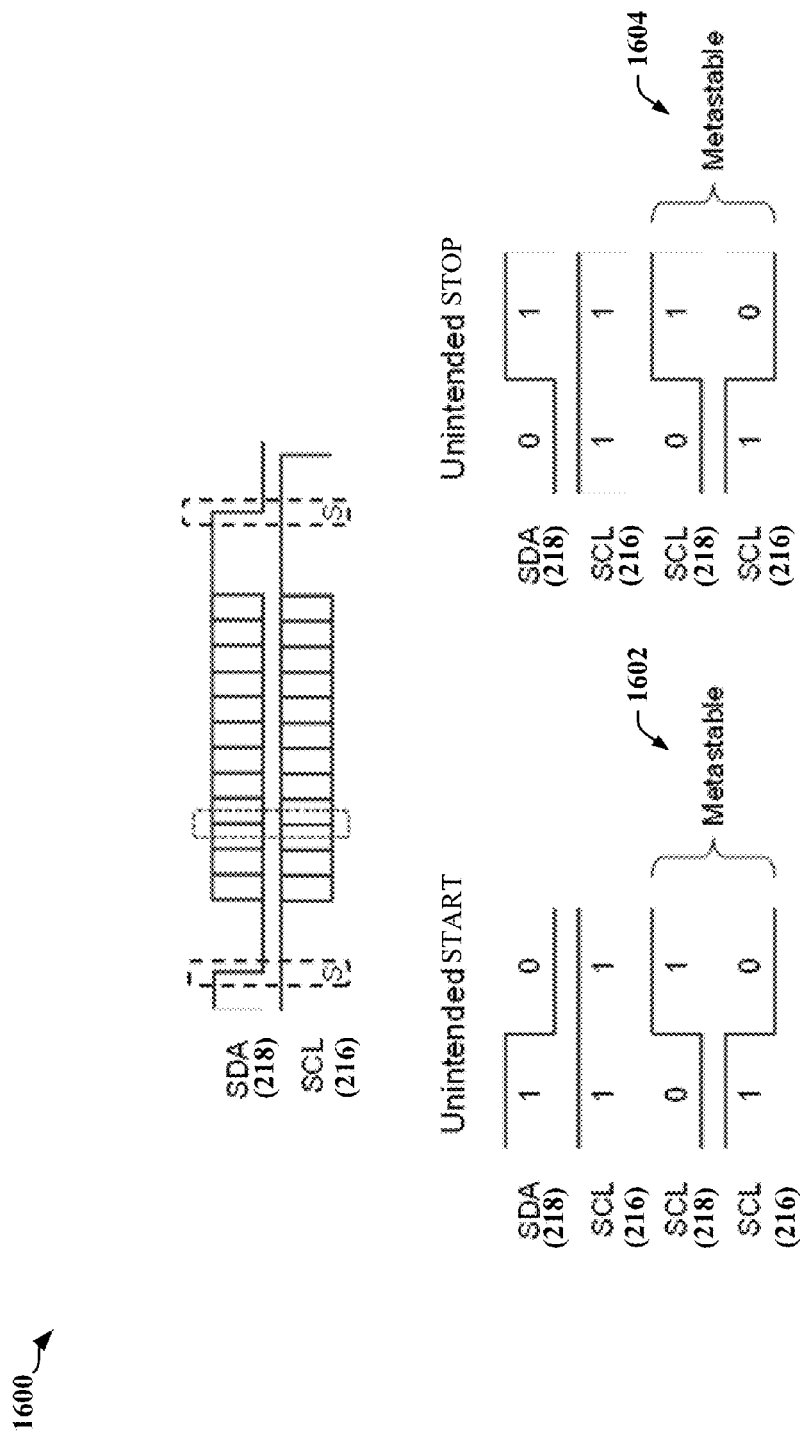
FIG. 16 illustrates the conditions under which a metastable state may occur.

FIG. 16 illustrates the conditions under which a metastable state may occur at one or more I2C devices. A metastable state may include a signaling state when both the data signal (SDA signal 218) and the clock signal (SCL signal 216) change at the same time 1602, 1604.

Figure 17:
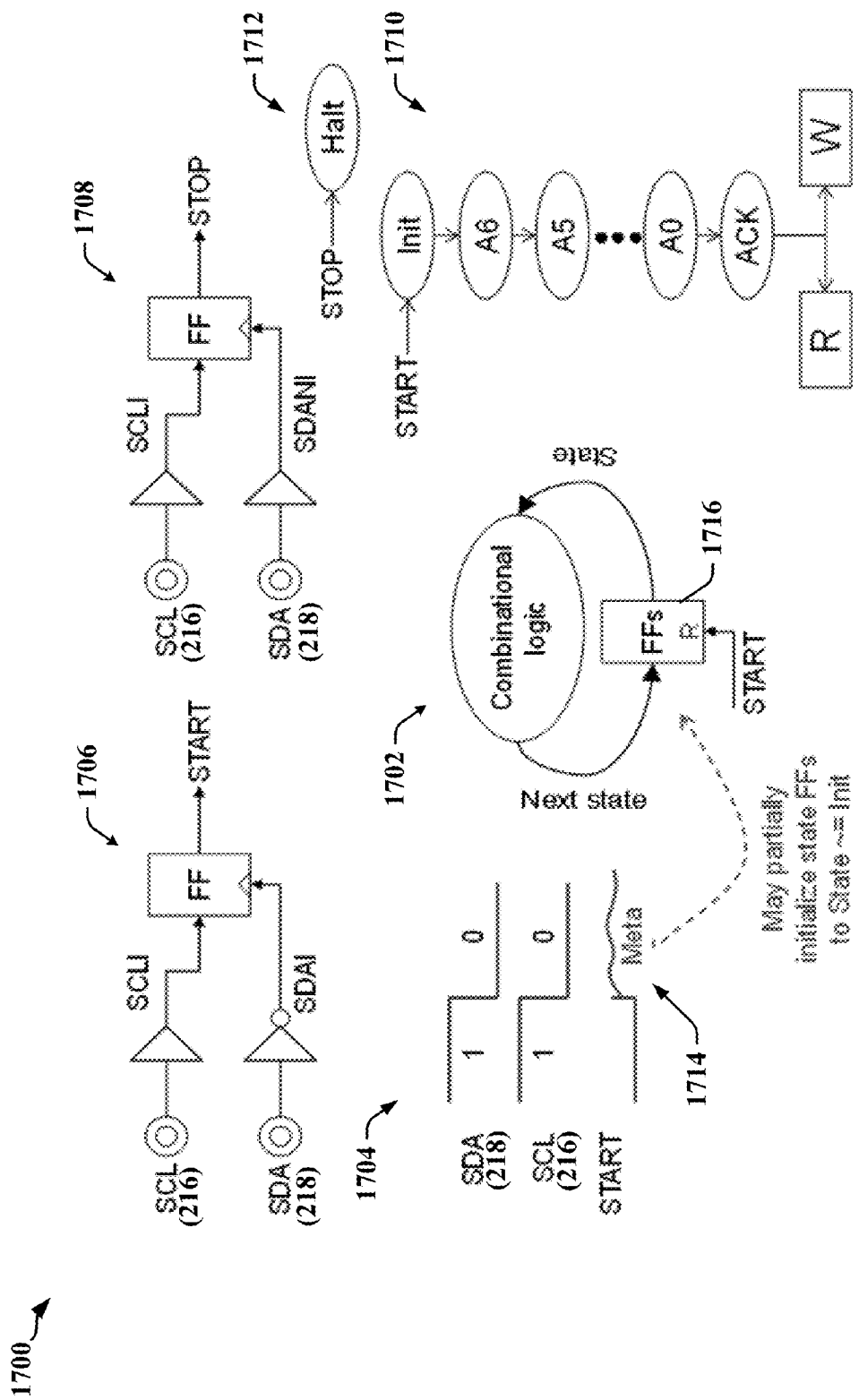
FIG. 17 illustrates the occurrence of a metastable condition when both the SDA line and the SCL line change states at the same time.

FIG. 17 illustrates the potential effects of a metastable state on a state machine 1702 for an I2C device. In the I2C protocol, the state machine 1702 is maintained to track I2C frame and/or word transmission and/or reception. The state machine 1702 is triggered based on transitions in the SCL signal 216 and the SDA signal 218 of the bus and transitions. The state machine may include a flip-flop 1716 that is initialized when a start condition is detected. The start condition may be detected by start detection logic 1706, while a stop condition may be detected by second logic 1708. The state machine transition may be configured in accordance with the state diagram 1710 after a start condition is detected, and the state machine 1702 may be reset or halted when a stop condition is detected (see state diagram 1712). A metastable condition 1714 may occur when both the SDA signal 218 and the SCL signal 216 change state in manner that causes the start detection logic 1706 to respond to an apparent occurrence of a start condition.

Figure 18:
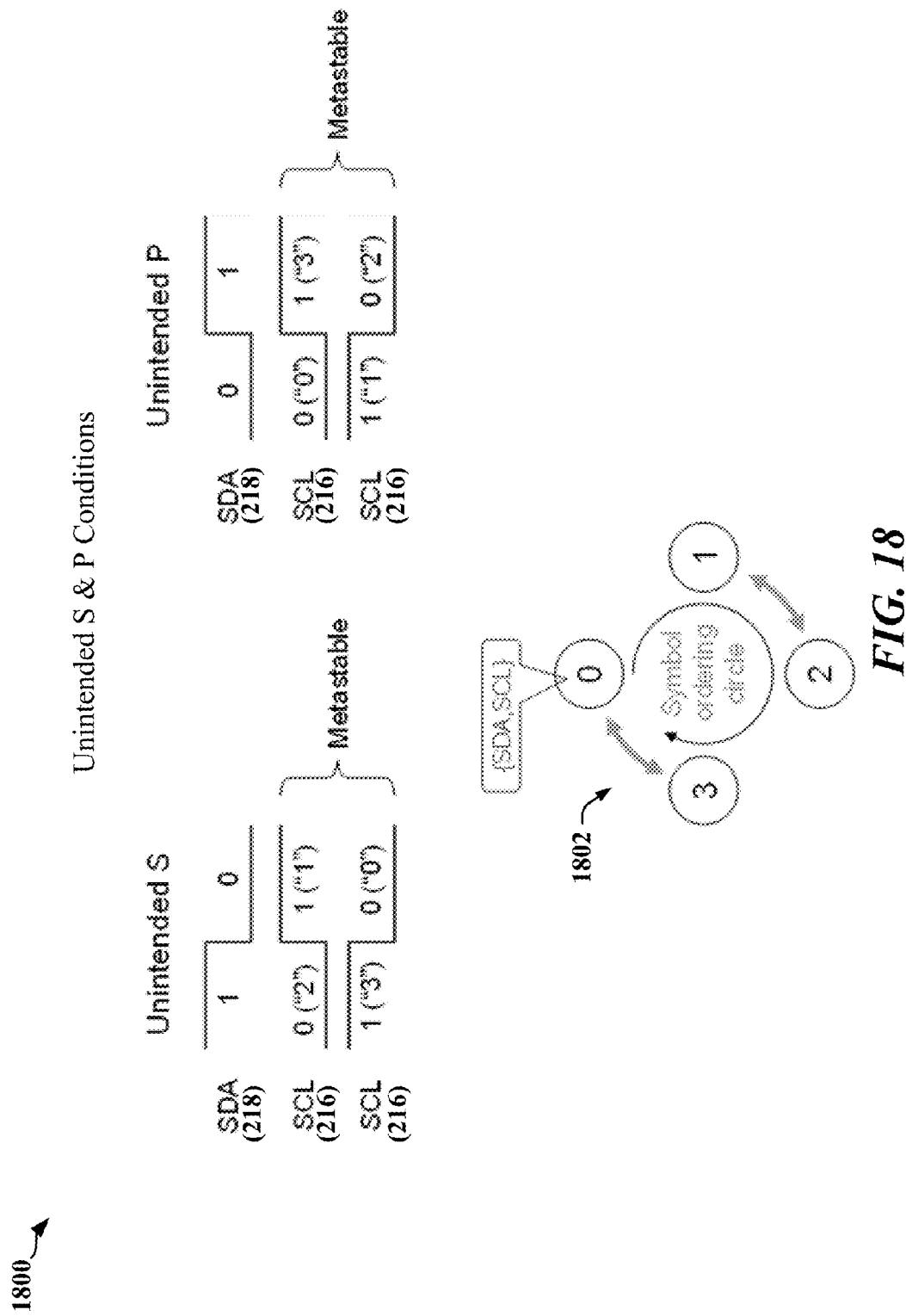
FIG. 18 illustrates the conditions that must be avoided to prevent an unintended START or STOP condition.

FIG. 18 illustrates the conditions that may be avoided to prevent an unintended START or STOP condition. "Symbols" 1802 may be defined by the combination of states between the SDA signal 218 and the SCL signal 216. For example, Symbol "0" is when both the SDA signal 218 and the SCL signal 216 are low (0). Symbol "1" is when the SDA signal 218 is low (0) and the SCL signal 216 is high (1). Symbol "2" is when the SDA signal 218 is high (1) and the SCL signal 216 is low (0). Symbol "3" is when the SDA signal 218 is high (1) and the SCL line is high (1). Here, it can be appreciated that that symbol transitions from symbol "2" to symbol "1" and from symbol "3" to symbol "0" cause a metastable condition for a START indicator. Similarly, symbol transitions from symbol "0" to symbol "3" and from symbol "2" to symbol "1" cause a metastable condition for a STOP indicator.

Figure 19:
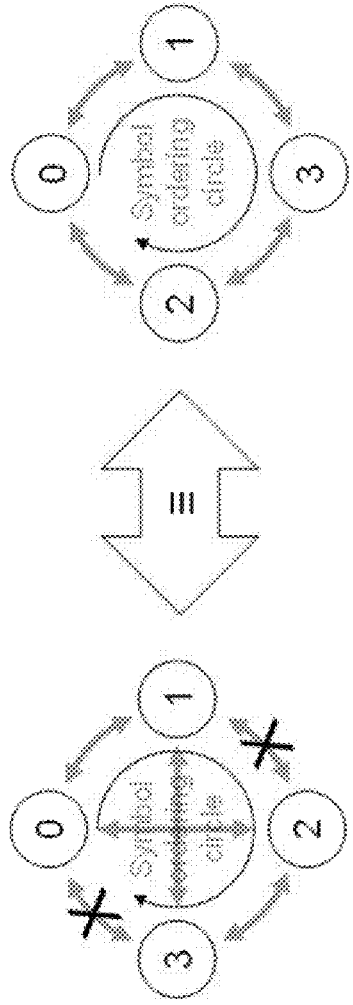
FIG. 19 illustrates elimination of transitions between symbols that can cause metastable conditions.

FIG. 19 illustrates a technique by which certain transitions between symbols that can cause metastable conditions can be eliminated. Under this scheme, data throughput may decrease and 20 bits per word may be sent in order to increase the effective data throughput as well as to keep as much compatibility with the original 12 symbol CCIe systems as possible.

Figure 20:
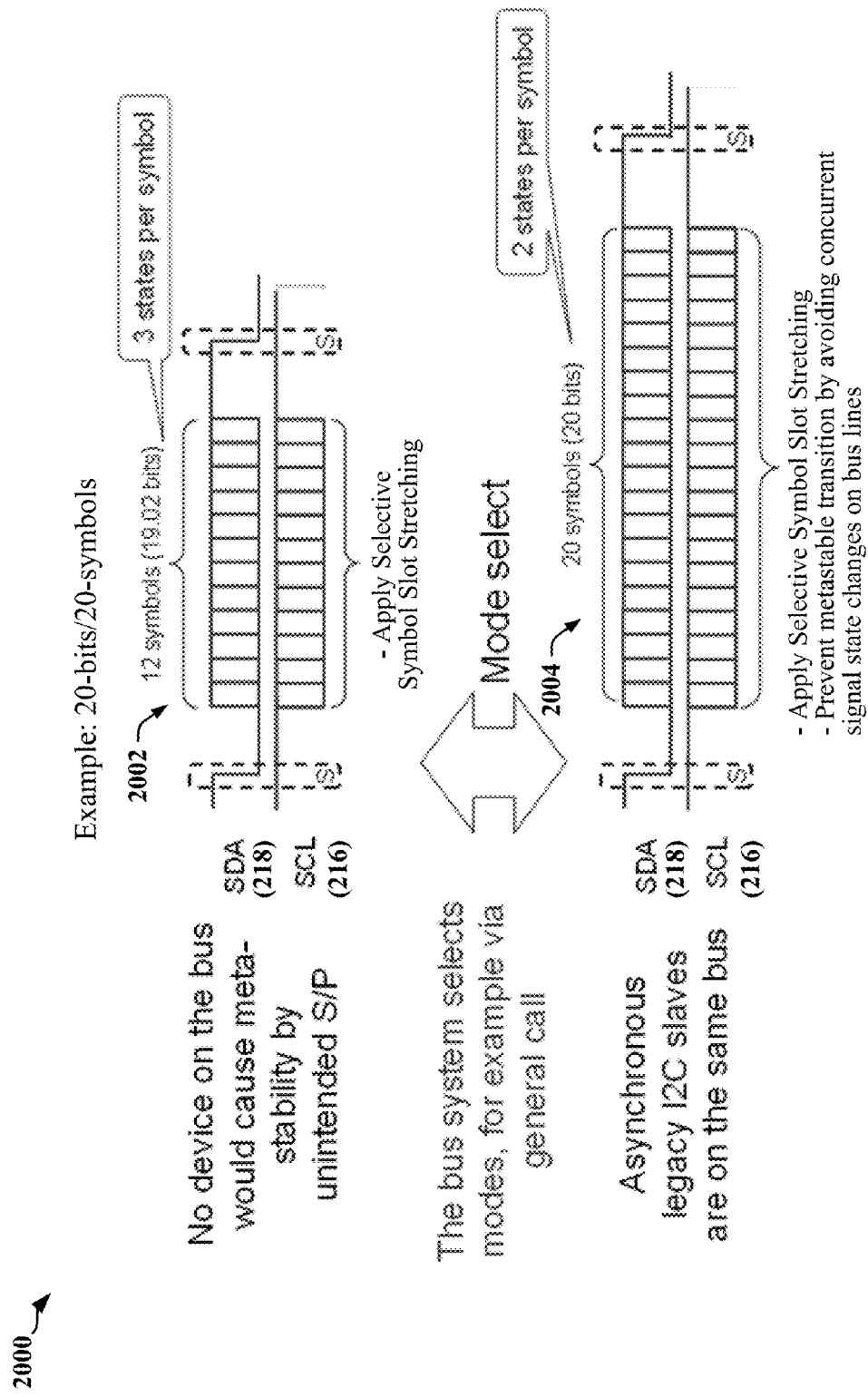
FIG. 20 compares transmission schemes using 12 symbols of 3 states per symbol and 20 symbols of 2 states per symbol.

FIG. 20 illustrates a comparison between a first transmission scheme using 12 symbols of 3 states per symbol and a second transmission scheme using 20 symbols of 2 states per symbol. The first transmission scheme can transmit 19.02 bits within 12 symbols while the second transmission scheme can transmit 20 bits within the 20 symbols.

According to one aspect, a master device coupled to a bus may ascertain whether there are any legacy I2C devices coupled to the bus. If no legacy I2C devices are coupled to the bus, then the CCIe devices need not worry about causing metastable conditions and may transmit 12 symbols of 3 states per symbol.

Even if I2C devices are coupled to the bus, the CCIe devices may still transmit 12 symbols of 3 states per symbol, without symbol slot stretching or attempting to avoid a metastable condition, if all legacy I2C devices on the bus use synchronously designed logic circuits, and/or with a reasonably fast clock (which can avoid the need for selective stretching of symbol slots as the well as the possibility of a metastable condition).

If there are legacy I2C devices coupled to the bus, and all legacy I2C devices on the bus are synchronously designed and free from the possibility of metastability, but some I2C devices are not immune to the state machine changes, then symbol slot stretching may be used. The CCIe devices may still transmit 12 symbols of 3 states per symbol but, due to the stretched symbol slots, may result in an average 9.6 Mbps, as illustrated in FIG. 12.

If there are legacy I2C devices coupled to the bus, and at least one of the legacy I2C devices are asynchronously designed and susceptible to metastability, then both symbol slot stretching and prevention of symbols that cause metastable state transitions is implemented. The CCIe devices may then transmit 20 symbols of 2 states per symbol may result in an average 6.5 Mbps (illustrated in FIG. 21).

Figure 21:
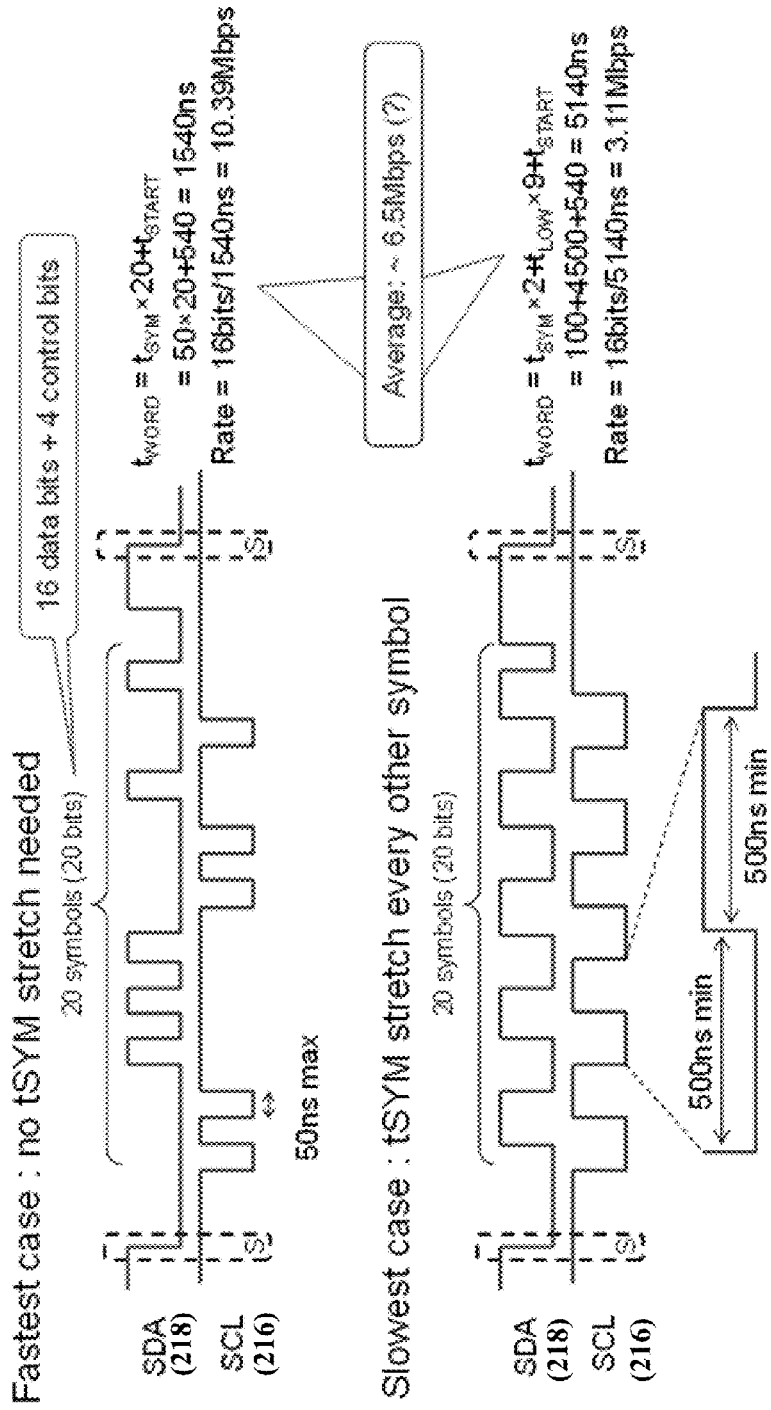
FIG. 21 illustrates certain scenarios for a CCIe transmission using 20 symbols with 2 states per symbol.

FIG. 21 illustrates fastest and slowest rate scenarios for a CCIe transmission, in which 20 symbols (with 2 states per symbol) are used between two START indicators, without including overhead bits.

Various data throughput cases may be possible over the bus. In a first case, a 12 symbol CCIe transmission system can achieve 23 Mbps if no legacy I2C slaves are present on the bus, or if all devices on the same bus can properly detect START before each CCIe word at $t_{SYM}$. In a second case, a 12 symbol CCIe transmission system that does no employ $t_{SYM}$ stretch for 14 Mbps can be used if all legacy I2C devices on the same bus are synchronously designed with reasonably fast clocking that avoids the need for selective stretching of symbol slots as the well as the possibility of a metastable condition. In a third case, a 12 symbol CCIe transmission system can achieve an average of 9.6 Mbps with $t_{SYM}$ stretch if all legacy I2C devices on the same bus are synchronously designed and free from metastability, even if some are not immune to the state machine changes discussed above. In a fourth case, a 20 symbol CCIe transmission system may be used with $t_{SYM}$ stretch is if both metastability and the state machine issue exist.

Certain systems that employ CCIe interfaces may define a CCIe "heartbeat" word which is periodically transmitted by the CCIe master device over the bus to allow synchronization of the slave devices. The master device may send this "heartbeat" CCIe word at a rate that is slow enough for power saving but fast enough such that slaves are not starved of clock cycles. According to one example, the "heartbeat" may be encoded or embedded within a 20-bit ternary number space used to encode data bits for transmission over the two-line control data bus, in general accordance with the CCIe communications interface illustrated in FIG. 3.

Figure 22:
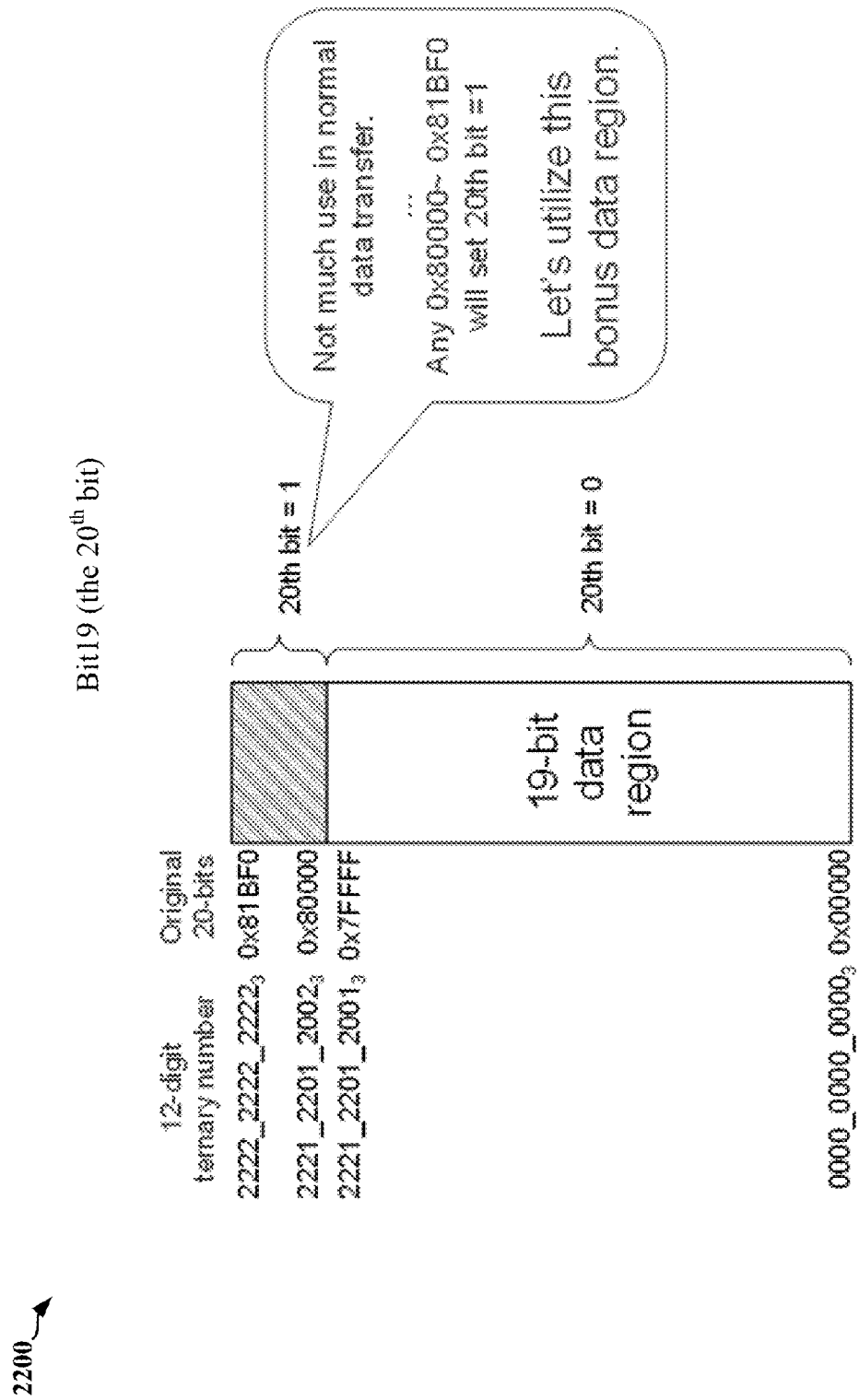
FIG. 22 illustrates certain aspects related to the nineteenth bit of a word transmitted on a CCIe interface.

FIG. 22 is a diagram 2200, illustrating certain aspects related to Bit 19, which is the $20^{th}$ bit transmitted when the bit count starts at the first bit (Bit 0). In other words, as is typical in the computer sciences, counting bit wise begins at zero, and Bit 19 is the $20^{th}$ bit. Here, the Bits 0-18 are represented within the ternary number range of $0000\_0000\_0000_3$ to $2221\_2201\_2001_3$. The ternary numbers in the range of $2221\_2201\_2002_3$ to $2222\_2222\_2222_3$ are unused for data transmission. Consequently, the ternary number range $2221\_2201\_2002_3$ to $2222\_222\_2222_3$ may be used to represent Bit 19 (i.e., $20^{th}$ bit). In other words, $2221\_2201\_2002_3$ ternary is $1000\_0000\_0000\_0000\_0000$ binary (0x80000 hexadecimal) and $2222\_2222\_2222_3$ ternary (0x81BF0) is the largest 12 digit ternary number possible. In one example, sleep only and sleep except commands use the $20^{th}$ bit (bit 19). It is within the number space of this $20^{th}$ bit (Bit 19) that the heartbeat may be transmitted.

FIG. 23 is a table 2300 illustrating one example of a mapping used in a CCIe transmission system. In the mapping, the number space of bit 19 can span the numbers $2221\_2201\_2002_3$ to $2222\_2222\_2222_3$, where this range of numbers may be subdivided into six subdivisions. CCIe is a multi-master control data bus architecture and control of the control data bus can be transferred from one master device to another master device. Consequently, a "master bus request" command is available (within subrange $2222\_1121\_0210_3$ to $2222\_2112\_1121_3$ as well as a "master handover" (within subrange $2222\_2220\_0002_3$ to $2222\_2221\_1210_3$).

FIG. 24 is a table 2400 illustrating a range within the bit 19 number space that may be used to define the heartbeat in a 12-symbol CCIe transmission system.

Figure 25:
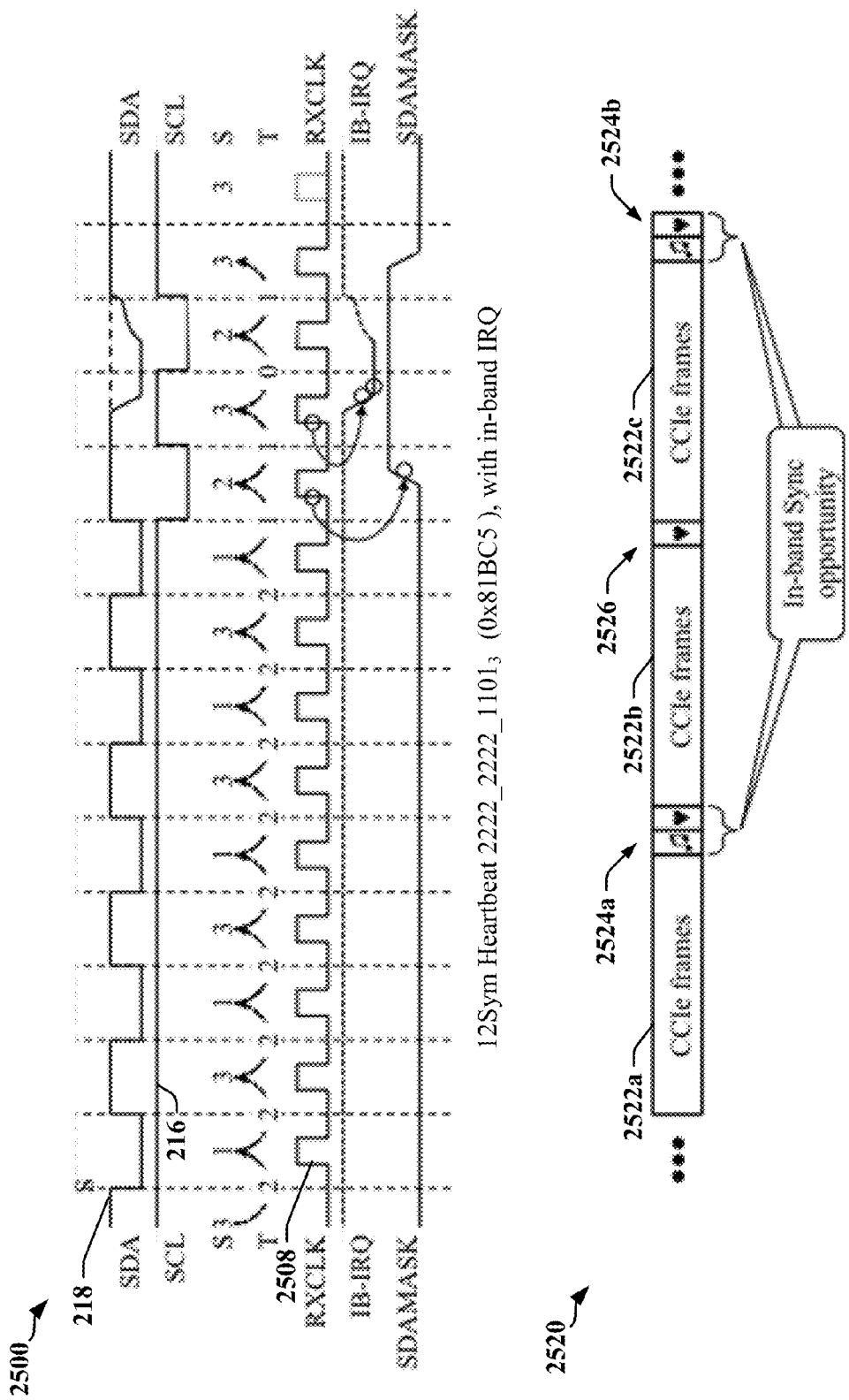
FIG. 25 illustrates one example of how a heartbeat clock may be transmitted over the SDA line and SCL line and synchronization opportunities that may arise during transmission of the heartbeat clock.

In FIG. 25 a timing diagram 2500 illustrates one example of the transmission of a heartbeat clock over the SDA signal 218 and SCL signal 216 in a 12-symbol CCIe transmission system. A receiver clock (RXCLK signal) 2508 may be extracted from state transitions of transmitted symbols over the control data bus. This example illustrates how the heartbeat clock may appear before transmission or encoding and/or after reception and decoding. As can be perceived, a first portion 2502 of the heartbeat clock is transmitted on the SDA line, while a second portion 2504 of the heartbeat clock may be transmitted on the SCL line. In this manner, a space 2506 is created on the SDA line by moving part of the heartbeat clock to the SCL line.

As can be seen from the framing timing diagram 2520, the transmission of a heartbeat clock can provide synchronization opportunities 2524a, 2524b. As is described elsewhere herein, the first word of SYNC pattern is referred to as "SY-" and indicated with a "♪ -" symbol (dash after music note), while the second word of the SYNC pattern is a heartbeat that may be referred to as "-NC" and indicated with a "♥" symbol, or with a "-♪" symbol (dash before music note). The SYNC transmitted after the transmission of certain frames 2522a, 2522c. In the example illustrated, the synchronization opportunities 2524a, 2524b include a SYNC. In some instances, a heartbeat word 2526 is transmitted instead of a SYNC.

Figure 26:
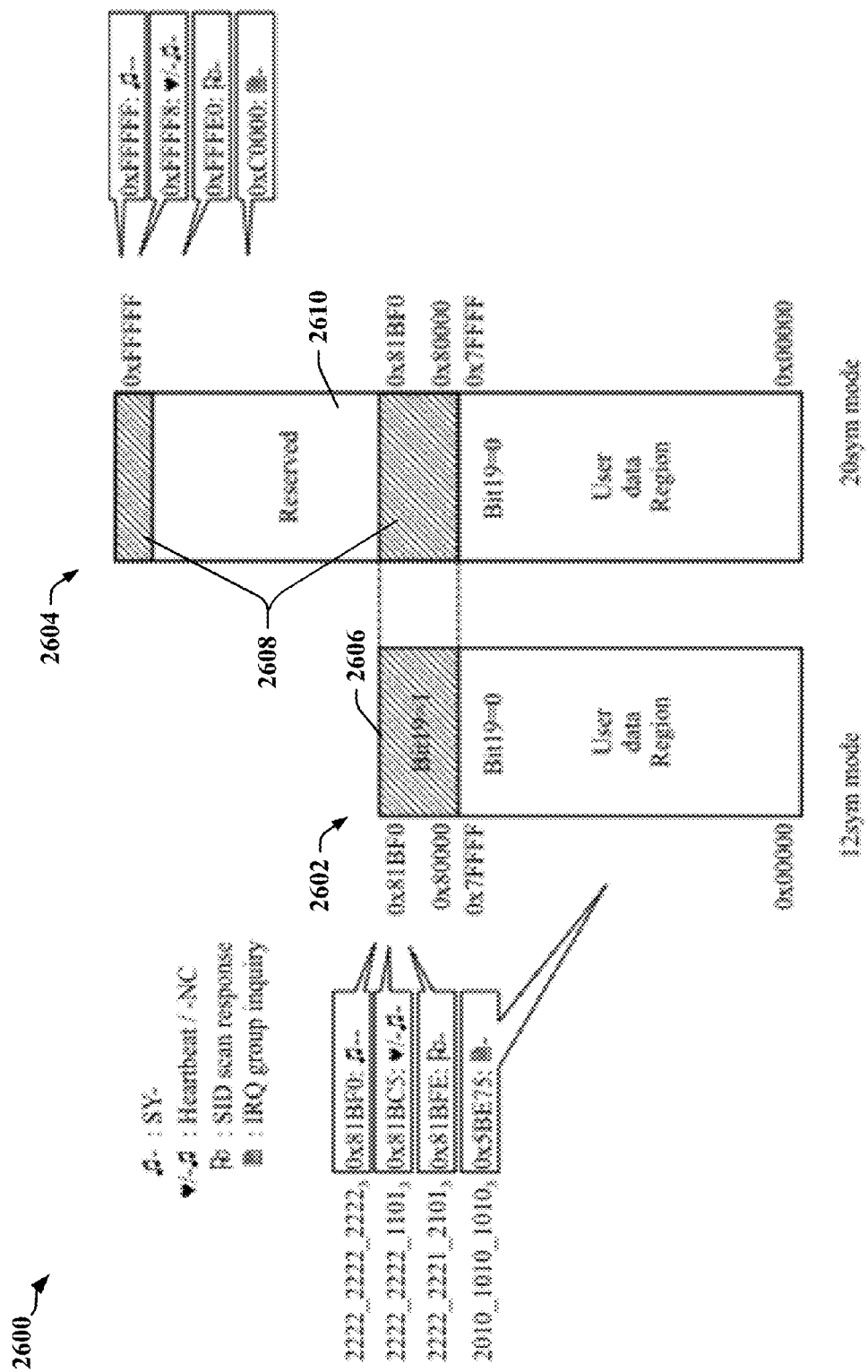
FIG. 26 illustrates certain data ranges available in a 12-symbol and 20-symbol CCIe transmission modes.

FIG. 26 is a drawing 2600 that compares a data range 2602 available in a 12-symbol CCIe transmission mode with a data range 2604 that may be available in a 20-symbol CCIe transmission mode. A subrange 2606, 2608 in each of the two data ranges 2602, 2604 may include words in which the nineteenth bit is set to logic 1, and these subranges 2606, 2608 may provide a capability of transmitting synchronization, heartbeat and control information. In one example, each CCIe transmission mode may have a corresponding set of control and/or synchronization words that are transmitted in the subranges 2606, 2608. In one example, each CCIe transmission mode may provide a word (represented as ♥/-♪) that operates as a SYNC. Other information may be transmitted in the bit 19 subranges 2606, 2608, including information related to slave ID scans and interrupt handling on the CCIe bus.

According to certain aspects disclosed herein, a SYNC transmission may include a "SY-" word and an "-NC" word that corresponds to a heartbeat word. In one example, a device operating in 12-symbol mode may transmit 0x81BF0 as the SY- word and 0x81BC5 as the heartbeat word. When operating in 20-symbol mode, the device may transmit 0xFFFFF as the SY- word and 0xFFFF8 as the heartbeat word. The SYNC may be used to identify the mode of operation of the CCIe transmitter. The SYNC may produce a unique pattern in the signaling states of the SDA signal 218 and SCL signal 216. In one example, the SYNC may include 0x81BF0+0x81BC5 for a 12-symbol CCIe interface and 0xFFFFF+0xFFFF8 for a 20-symbol CCIe interface. These word combinations may be selected to produce a unique pattern that does not occur in any other CCIe data transfer, and which does not occur in normal I2C mode transmission.

The SYNC may be used to distinguish between available or possible transmission modes. For example, a CCIe bus master may transmit the appropriate SYNC to indicate whether CCIe transmissions use 12 symbols or 20 symbols to encode 20-bit data. The CCIe bus master may transmit SYNC patterns periodically to indicate mode of operation, and the period between transmissions may be selected to ensure reliable and efficient synchronization of newly joined devices to the CCIe bus. For example, the newly joined devices may include hot-plugged devices or devices that have completed a power-up and/or are recovering from a power-down/power-up cycle. The newly joined devices may be configured to synchronize to a CCIe word boundary based on detection and identification of a SYNC.

In one example, the master device may determine the frequency of transmission of SYNC patterns and may transmit SYNC patterns at a variable frequency. The master may, for example, transmit SYNC patterns more frequently after a system power-up. Slave devices joining, wakening or powering-up on the CCIe bus may be adapted to seek a SYNC pattern in order to properly monitor, transmit or receive CCIe transmissions. The SYNC transmissions may also be used to reacquire synchronization after a loss of synchronization due to an error condition or component failure, for example.

In some instances, a CCIe slave device may be configured or adapted to determine a CCIe transmission mode concurrently with synchronization. In one example, mode detection may be performed by comparing transitions on the SCL signal 216 and the SDA signal 218. During transmission of a heartbeat word (♥, NC) in the 12-symbol transmission mode, the signaling state of the SCL signal 216 first falls (to logic 0) as the signaling state of the SDA signal 218 rises after the previous symbol. This concurrent toggling of the SDA signal 218 and the SCL signal 216 is not permitted for the 20-symbol CCIe transmission mode, because the 20-symbol transmission mode specifies that only one signal can toggle. The CCIe slave device may detect transmission mode based on timing of edges in the SDA signal 218 and SCL signal 216.

Figure 27:
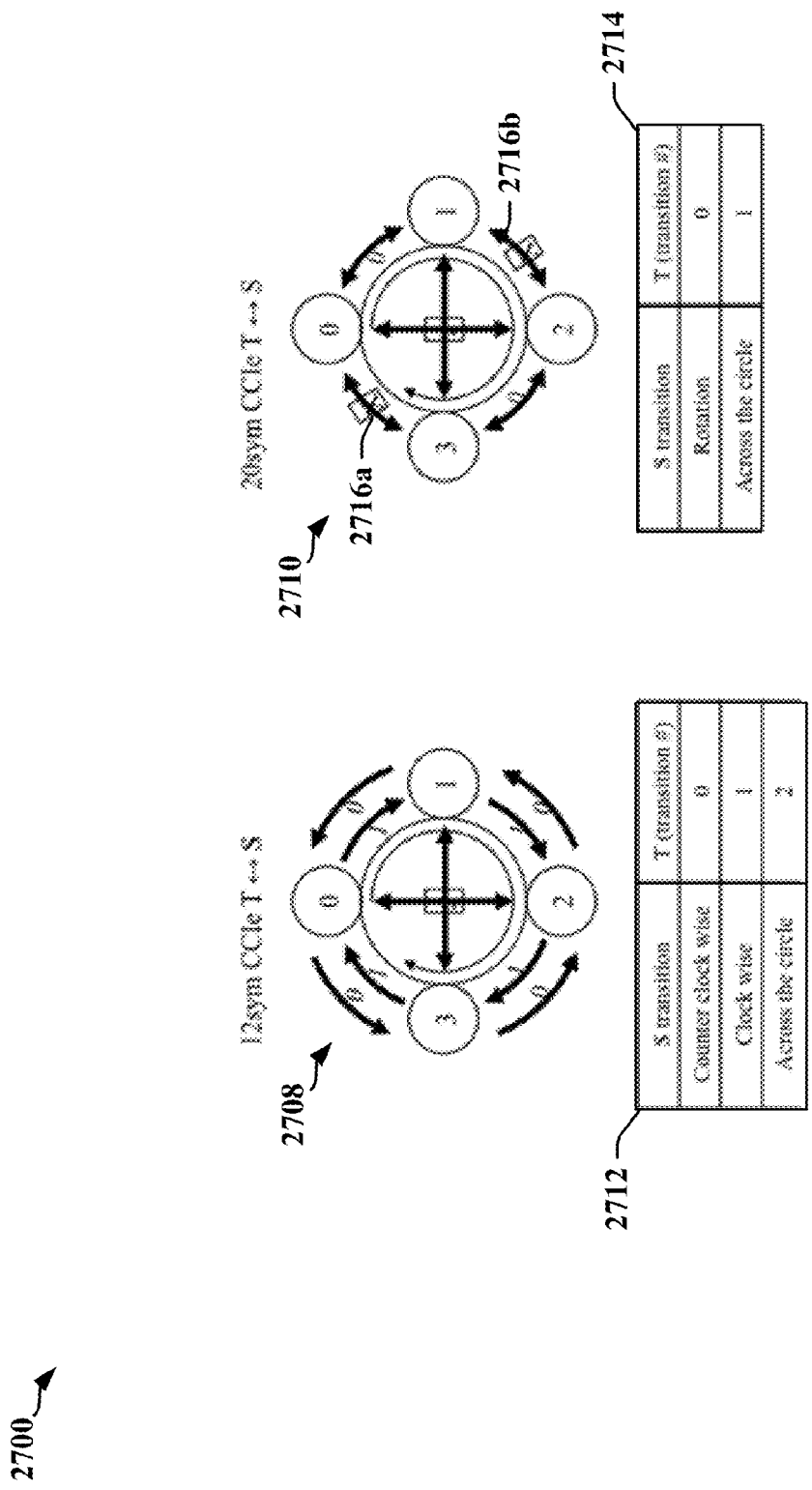
FIG. 27 illustrates examples of transition diagrams for 12-symbol and 20-symbol modes of operation on a CCIe interface.

FIG. 27 provides transition diagrams 2708, 2710 for 12-symbol and 20-symbol mode operations, respectively and corresponding tables of available transitions 2712, 2714. As discussed in relation to FIG. 19, 20-symbol transmission has fewer available transitions at each symbol interval than in 12-symbol transmission because certain transitions 2716*a* or 2716*b* are prohibited to reduce instances of error at the receiver. CCIe devices on the bus can synchronize to CCIe word boundary by SYNC word followed by a Heartbeat word.

In some instances, an in-band interrupt request ("in-band IRQ") may be issued by one or more CCIe devices by signaling an encoded request on the SDA signal 218 and SCL signal 216 between transmissions. In one example, a slave CCIe device can assert an in-band IRQ when the heartbeat word is transmitted. The in-band IRQ may be asserted during transmission of the heartbeat word when a combination SYNC-Heartbeat is transmitted.

In some instances, a SYNC pattern can be used as a slow-running clock during power saving mode.

Figure 28:
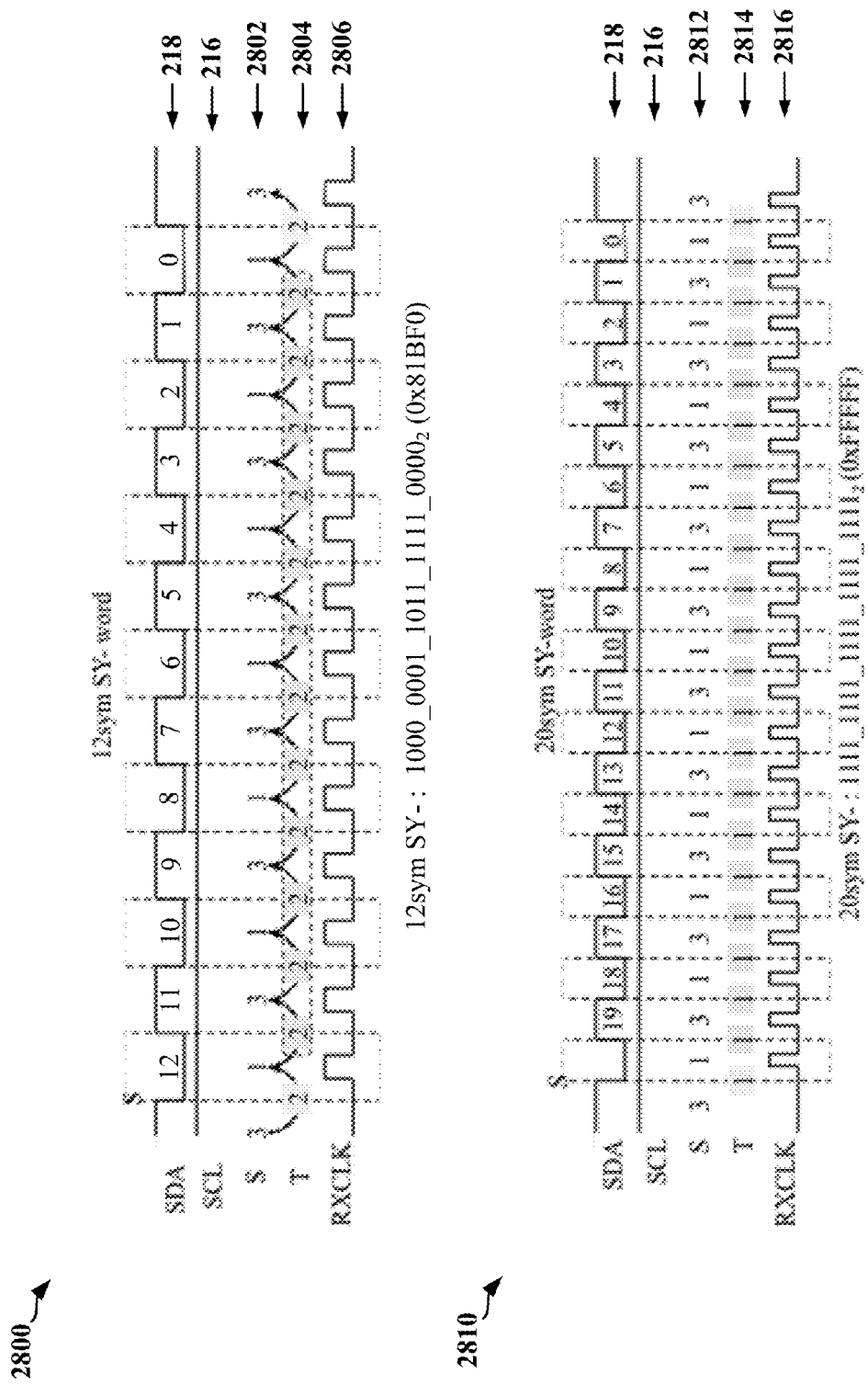
FIG. 28 illustrates the signaling states of the SDA line and SCL line for both 12-symbol and 20-symbol transmission schemes.

FIG. 28 provides timing diagrams 2800, 2810 illustrating the signaling states of the SDA signal 218 and SCL signal 216, the symbols 2802, 2812 transmitted on the CCIe interface and the corresponding transition numbers 2804, 2814 for both 12-symbol and 20-symbol transmission schemes. In both modes, the SDA signal 218 toggles at each symbol interval in the sequence of 12 or 20 symbols, while the SCL signal 216 remains high. For each mode, a receive clock signal (RXCLK signal) 2806, 2816 is generated based on detected transitions between symbols and used to sample the signaling states of the SDA signal 218 and the SCL signal 216 which are driven in accordance with the value of the current symbol 2802, 2812.

A CCIe receiver may be adapted or configured to detect a SY- word transmitted on the CCIe interface. SY- detection is used during connection to the CCIe bus after power-up, a hot-plug event whereby the CCIe device is inserted into an operating environment, and/or after detection or notification of loss of synchronization with transmissions on the CCIe bus.

Figure 29:
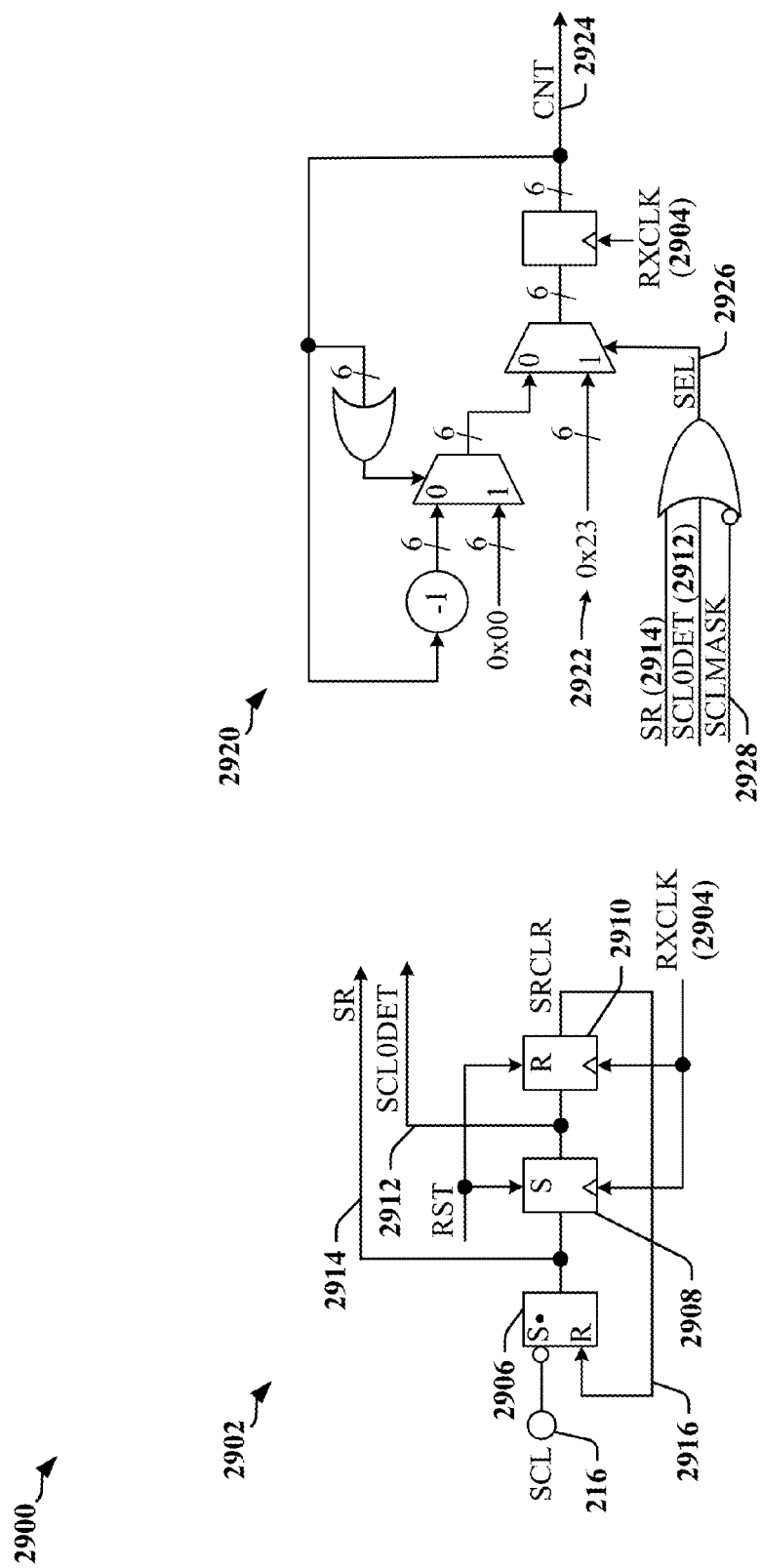
FIG. 29 illustrates circuits that may be used during SYNC detection.

FIG. 29 is a block diagram 2900 illustrating certain circuits that may be configured to detect SYNC transmissions. A first circuit 2902 may be used to detect a logic low signaling state on the wire carrying the SCL signal 216 (i.e., SCL=0). During a SYNC transmission, the SCL signal 216 remains at a high logic state for the duration of a valid SYNC. The detection of a logic low state may be used to terminate a SYNC detection cycle or counter. The first circuit 2902 includes an asynchronous S-R latch 2906 that receives the SCL signal 216 and the flip-flops 2908, 2910 capture two sequential samples of the output (SR signal 2914) of the S-R latch 2906 to produce an SCL low detect (SCL0DET) signal 2912, which remains low provided the SCL signal 216 remains at logic high, and to provide a reset signal 2916 that clears the output (SR signal 2914) of the S-R latch 2906. The flip-flops 2908 and 2910 are clocked using an RXCLK signal 2904 that is recovered from SDA signal 218 alone, because the SCL signal 216 is masked to a CDR circuit.

A second circuit (the down counter 2920) is enabled when a selector signal (SEL signal 2926) is in a low state. The SEL signal 2926 is in the low state when the state of the SCLMASK signal 2928 is active (high), and both the SR signal 2914 and the SCL0DET signal 2912 are low, where the SR signal 2914 and the SCL0DET signal 2912 are generated by the first circuit 2902. The state of the SCL-MASK signal 2928 is set to mask the SCL signal 216 from the CDR, such that the SCL signal 216 is not used for clock generation. In operation, the illustrated down counter 2920 is initialized such that the output (CNT signal 2924) reflects an initialization value 2922 of 0x23. The down counter 2920 is initialized upon detection of a low level on the SCL signal 216 (SCL=0), as indicated the control signals 2912 and 2914, or when the state of the SCLMASK signal 2928 is set to logic 0. When the SEL signal 2926 is low, the output of the down counter 2920 is decremented toward 0.

A CCIe device may set the state of the SCLMASK signal 2928 to logic 1 in order to block or mask the SCL input to the CDR upon detection or notification of loss of synchronization with transmissions on the CCIe bus. SYNC detection logic may then be enabled. During SYNC detection, the SCLMASK signal 2928 may operate to cause the CDR to generate a clock signal from symbol transitions on the SDA signal 218, and without using or considering transitions on the SCL signal 216. The state of the SCLMASK signal 2928 is cleared upon achieving synchronization.

Figure 33:
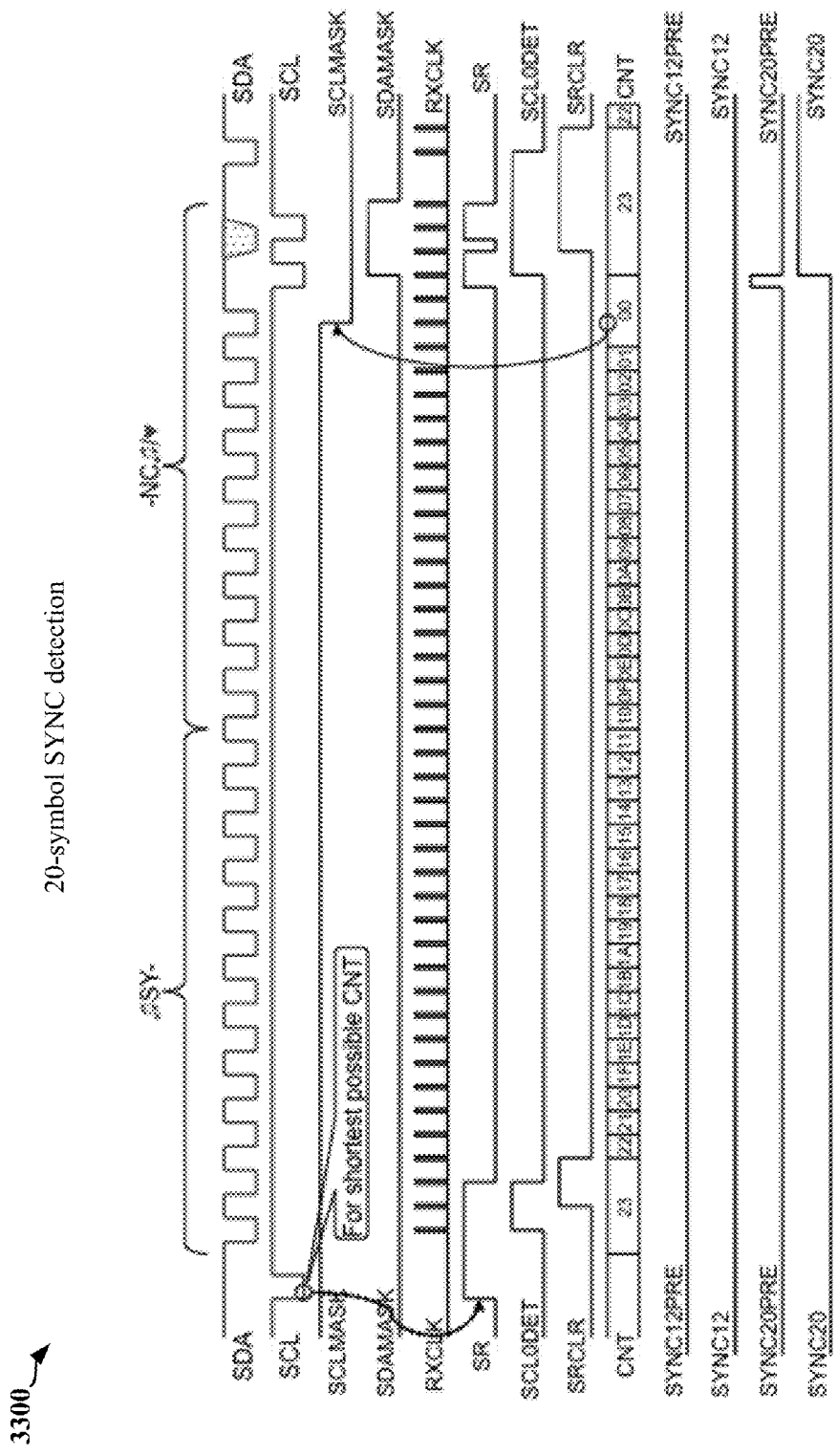
FIG. 33 illustrates timing of signals in logic circuits that may be used to determine a 20-symbol CCIe transmission mode.
Figure 34:
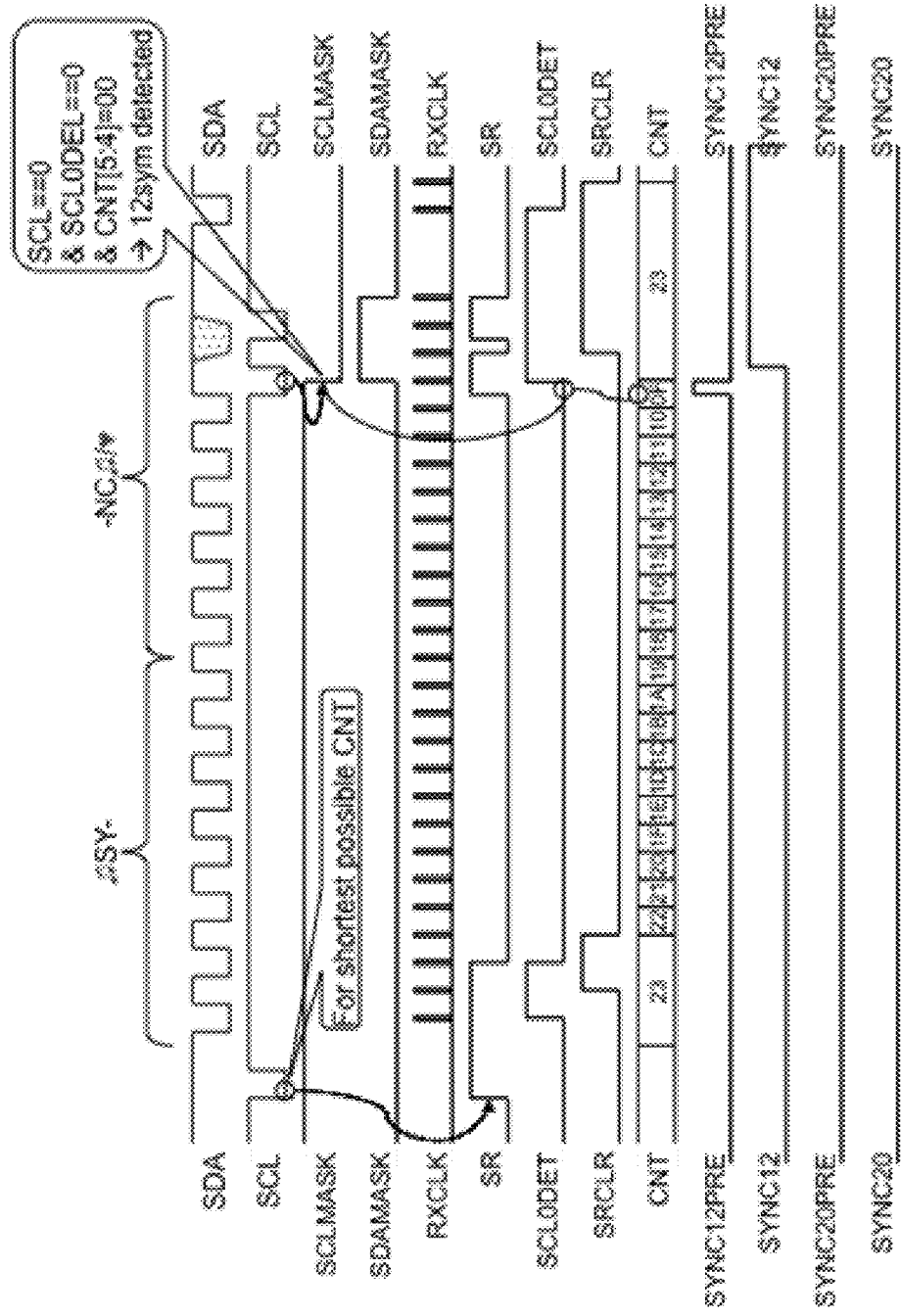
FIG. 34 illustrates timing of signals in logic circuits that may be used to determine a 12-symbol CCIe transmission mode.

The down counter 2920 may count down from a value that reflects the maximum number of symbols in the SYNC transmission for any available mode. In the examples illustrated by FIGS. 33 and 34, the down counter 2920 is initialized to the initial value 2922 of 0x23 (decimal 35). The CNT signal 2924 output by the down counter 2920 may then be decremented at each transition on the SDA signal 218, through the operation of the receiver clock (RXCLK 2904). When transmission of the SYNC word is completed, the SCL signal 216 falls and the count value is examined to determine if a valid number of transitions have been counted. The combination of a high SCL signal 216 and a toggling SDA signal 218 for the duration of the complete word occurs only for a SYNC word, and a count value is valid if it matches the number of symbols in a transmission for a recognized CCIe transmission mode.

The down counter 2920 may be reset to its initial value 2922 when a '0' value is detected on the SCL signal 216. The SCL signal 216 is sampled through the operation of the S-R latch 290, and the flip-flops 2908 and 2910, which are clocked using the RXCLK signal 2904 produced by the CDR. The SCL signal 216 remains high during a SYNC transmission and falls low to the logic '0' value after the SYNC transmission is about to be completed (i.e. two SCL=0 pulses may be required to complete the word). In some instances, synchronization is considered completed at the first detection of the SCL signal 216 at logic 0 (SCL=0), when certain other required conditions are in place. The state of the SCLMASK signal 2928 is reset when synchronization is successfully detected.

Example of a Clock and Data Recovery Circuit with Masking

Figure 30:
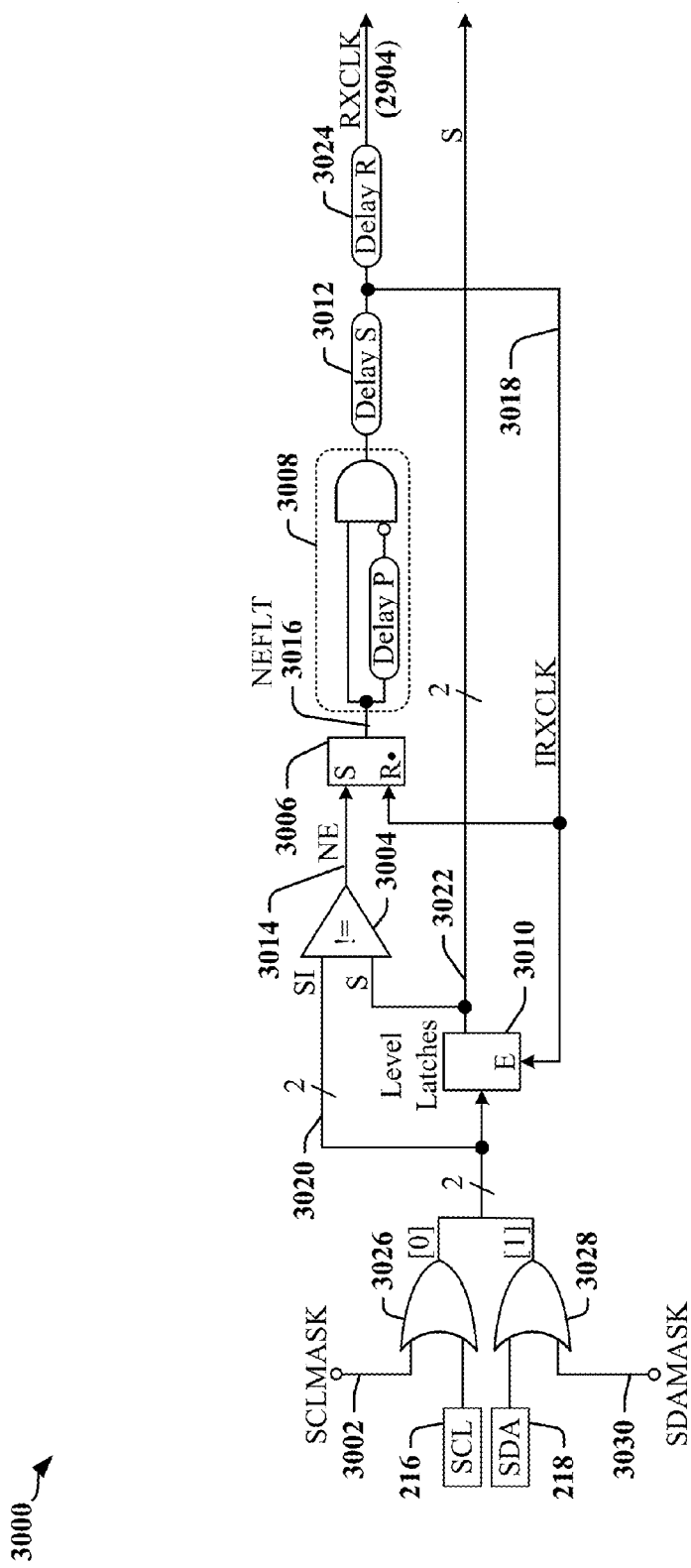
FIG. 30 illustrates a clock and data recovery circuit adapted to permit masking of the SCL and/or SDA signals.

FIG. 30 is a block diagram that illustrates an example of a CDR circuit 3000 that may be employed to recover embedded clock information from a CCIe communications link. The CDR circuit 3000 is adapted to permit masking of the SCL signal 216 and/or the SDA signal 218. In the example, an SCLMASK signal 3002 may be provided to enable blocking of the SCL signal 216 at a first gate 3026, and an SDAMASK signal 3030 may be provided to enable blocking of the SDA signal 218 at a second gate 3028. Other variants of the illustrated CDR circuit 3000 and/or other CDR circuits may be used in some instances.

A sequence of symbols is received in the SCL signal 216 and SDA signal 218. There may be a transition time between symbols during which the state of the corresponding signal is undefined, indeterminate, transient or otherwise unstable. A comparator 3004, set-reset latch 3006, a "Delay S" delay element 3012, and (bused) level latches 3010 may be configured to generate a level-latched signal (S signal) 3022 representative of a delayed instance of the input (SI) signal 3020. The delay between detection of a change in the SI signal 3020 and output of a changed S signal 3022 may be selected by configuring the Delay S delay element 3012.

The comparator 3004 compares the SI signal 3020 with the S signal 3022 and outputs a binary comparison signal (NE signal) 3014. The set-reset latch 3006 may receive the NE signal 3014 from the comparator 3004 and output a signal (NEFLT signal) 3016, which is a filtered version of the NE signal 3014. The operation of the set-reset latch 3006 can be configured to remove any transient instability (spikes) in the NE signal 3014. The NEFLT signal 3016 is provided to a one-shot circuit 3008 that produces a pulse with a preconfigured fixed length in response to a rising edge on the NEFLT signal 3016. The output of the one-shot circuit 3008 may be delayed using the delay element 3012 to provide an internal receive clock (IRXCLK) signal 3018 that is used to capture the current symbol and/or reset the set-reset latch 3006. The "Reset" input of the set-reset latch 3006 may be prioritized such that the NEFLT signal 3016 is reset when the IRXCLK signal 3018 is high, regardless of the state of the NE signal 3014.

In one example, IRXCLK signal 3018 may be delayed using another delay element 3024 to provide the RXCLK signal 2904 (see FIG. 29). In some instances, the IRXCLK signal 3018 may be used by external circuitry to sample the data output of the CDR circuit 3000. The IRXCLK signal 3018, or a derivative signal of the IRXCLK signal 3018 (e.g., the RXCLK signal 2904) may be provided to decoder or deserializer circuits. In some instances, other signals such as the NEFLT signal 3016 may be used to generate a clock signal for external circuitry. The level latches 3010 receive the SI signal 3020 and output the S signal 3022, where the level latches 3010 are triggered or otherwise controlled by the IRXCLK signal 3018. In one example, the S signal 3022 may serve as the symbols output of the CDR circuit 3000. In other examples, additional circuitry may be included in the CDR circuit 3000 to delay, latch and/or otherwise condition the S signal 3022 for use as the symbols output of the CDR circuit 3000.

In operation, the comparator 3004 compares the SI signal 3020 with the S signal 3022, which is output from the level latches 3010. The comparator 3004 drives the NE signal 3014 to a first state (e.g. logic low) when the SI signal 3020 and the S signal 3022 are equal, and to a second state (e.g. logic high) when the SI signal 3020 and the S signal 3022 are not equal. The NE signal 3014 is in the second state when the SI signal 3020 and the S signal 3022 are representative of different symbols. Thus, the second state indicates that a transition is occurring.

Figure 31:
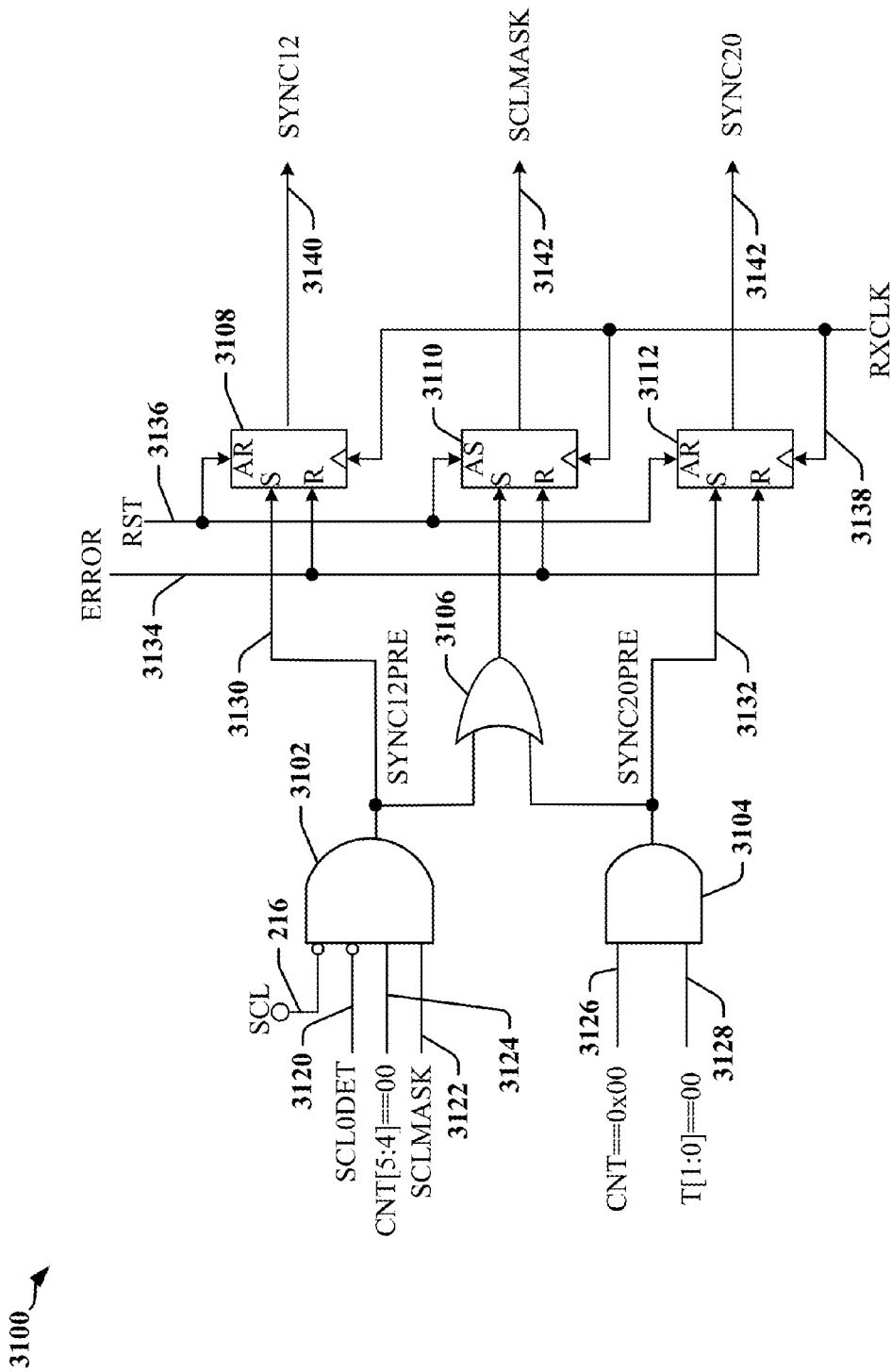
FIG. 31 illustrates logic circuits that may be used to determine a CCIe transmission mode and for generating an SCL masking signal.

FIG. 31 is a block drawing illustrating an example of logic circuitry 3100 that may be used to generate an SCLMASK signal 3142 and to determine a CCIe transmission mode. With continued reference to FIG. 29, the logic circuitry 3100 includes a first gate 3102 configured to produce a SYNC12PRE signal 3130 based on the values of the SCL signal 216, the SCL0DET signal 2912, the SCLMASK signal 2928, and the output of comparison logic configured to produce a result 3124 of a comparison between "00" and the two most significant bits of the CNT signal 2924 output by the down counter 2920 (see FIG. 29). The logic circuitry 3100 also produces a SYNC20PRE signal 3132 based on the output of comparison logic configured to produce a result 3128 of a comparison between 0x00 and all bits of the CNT signal 2924. The logic circuitry 3100 may produce a signal (SYNC12) 3140 that indicates that synchronization has been achieved for a 12-symbol CCIe transmission mode, and another signal (SYNC20) 3142 that indicates that synchronization has been achieved for a 20-symbol CCIe transmission mode. The CCIe transmission mode may be determined based at least in part on a determination of the value of the CNT signal 2924. The logic circuitry 3100 may also generate the SCLMASK signal 3142, which may be provided to the CDR circuit 3000 along with the SDAMASK signal 3030.

Figure 32:
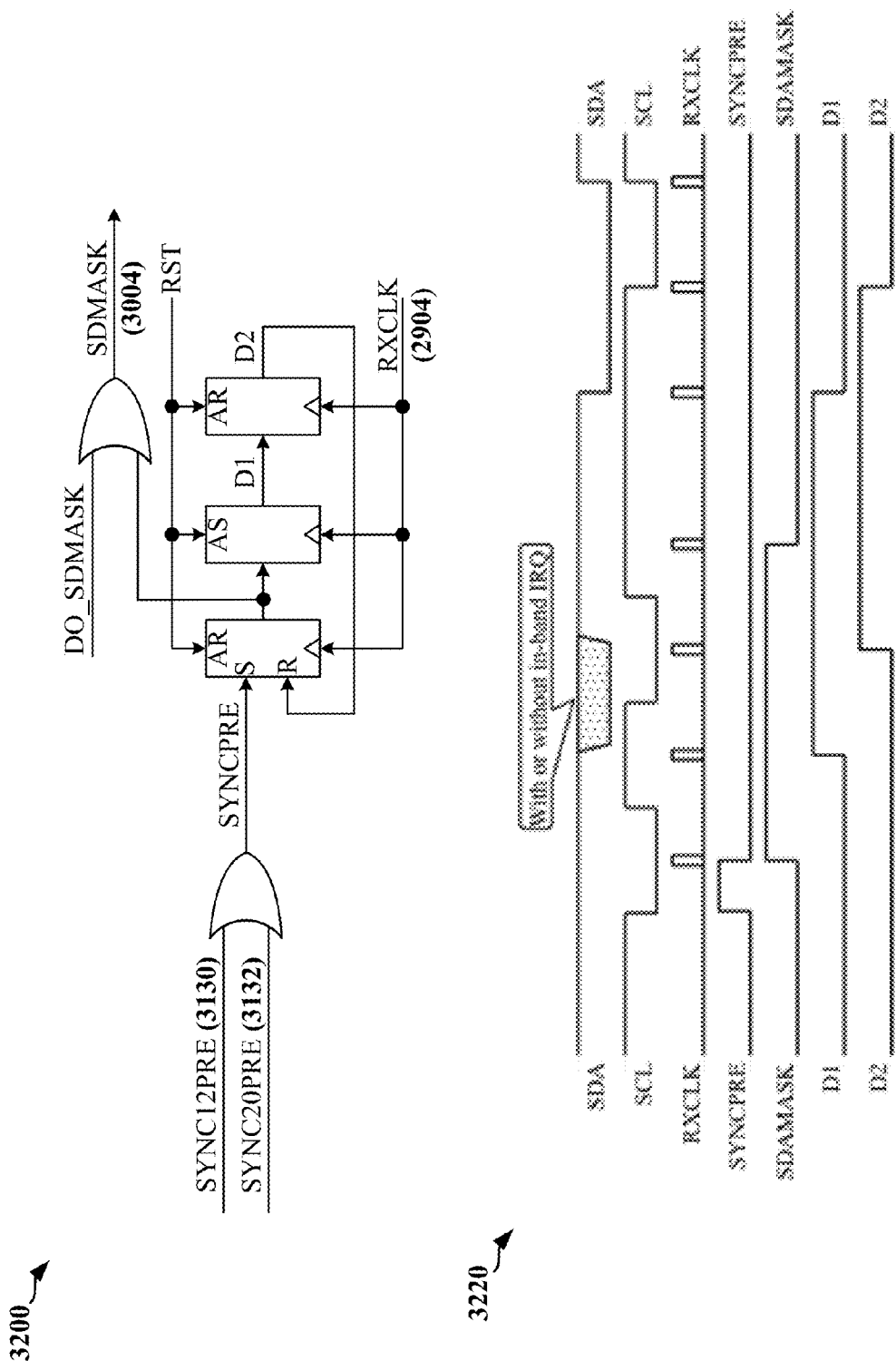
FIG. 32 illustrates logic circuits used for generating an SDA masking signal.

FIG. 32 includes a timing diagram 3220 that illustrates the operation of an example of logic circuitry 3200 used to generate an SDAMASK signal 3206. The SDAMASK signal may be used for in-band IRQ generation, for example.

In some instances, a device configured or adapted for CCIe operation may be capable of operating in a plurality of modes. Moreover, the modes of operation available on a CCIe bus may be determined during operation rather than at a system reset or startup. In one example, a hot-plugged CCIe device may wait for a SYNC pattern corresponding to 12-symbol or 20-symbol CCIe transmission mode. The CCIe device may also be capable of communicating using I2C protocols, but the CCIe device is typically not required to synchronize to the I2C communications timing.

Figure 35:
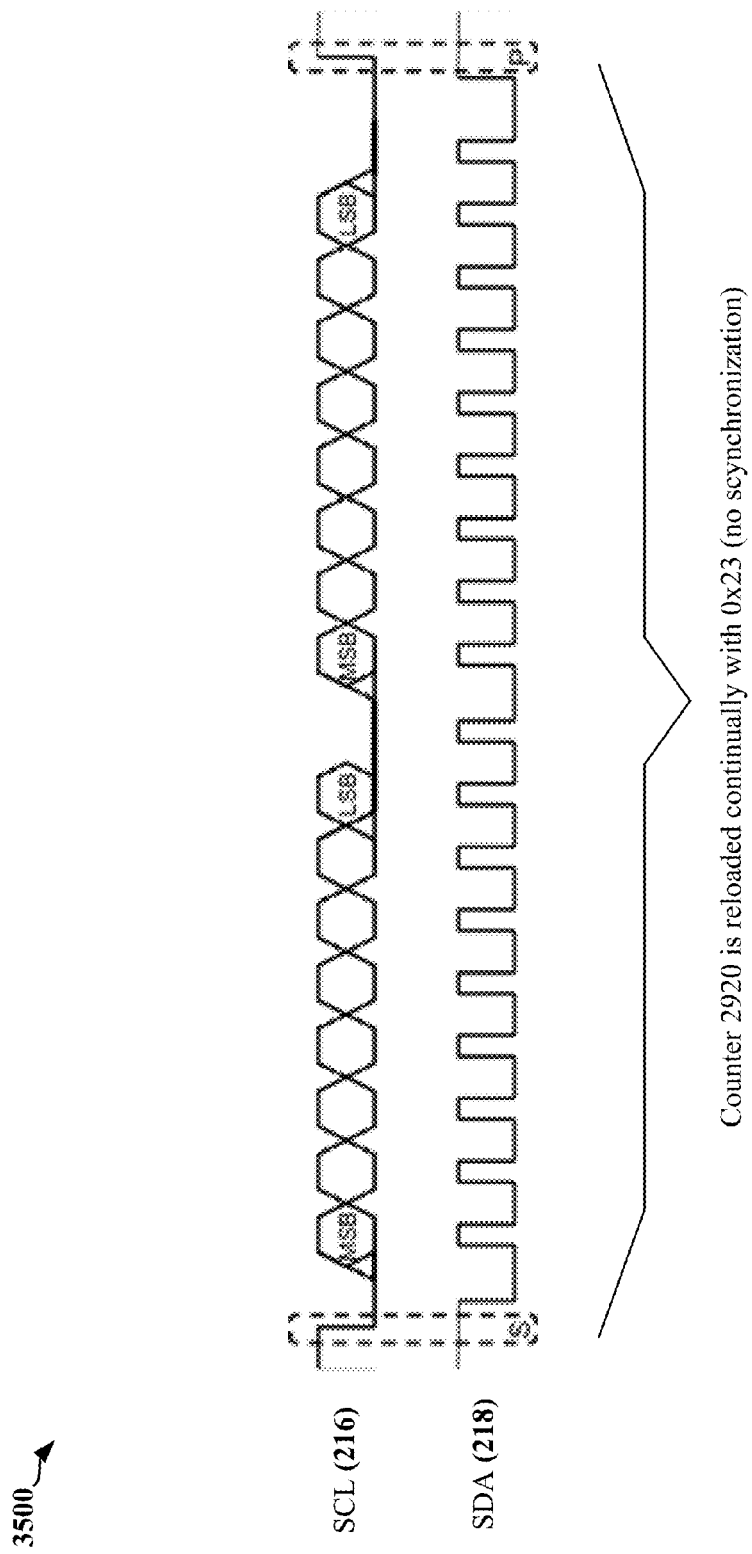
FIG. 35 illustrates the operation of the CCIe SYNC detection logic when communications transmitted over the CCIe interface comply with I2C protocols.

FIG. 35 is a timing diagram illustrating the operation of the SYNC detection logic when communications transmitted over the SCL signal 216 and SDA signal 218 comply with I2C protocols. The SYNC logic does not detect a valid CCIe transmission and the counter may be reset to its maximum value when the SCL signal 216 is at a logic low level.

Frame Synchronization

Figure 36:
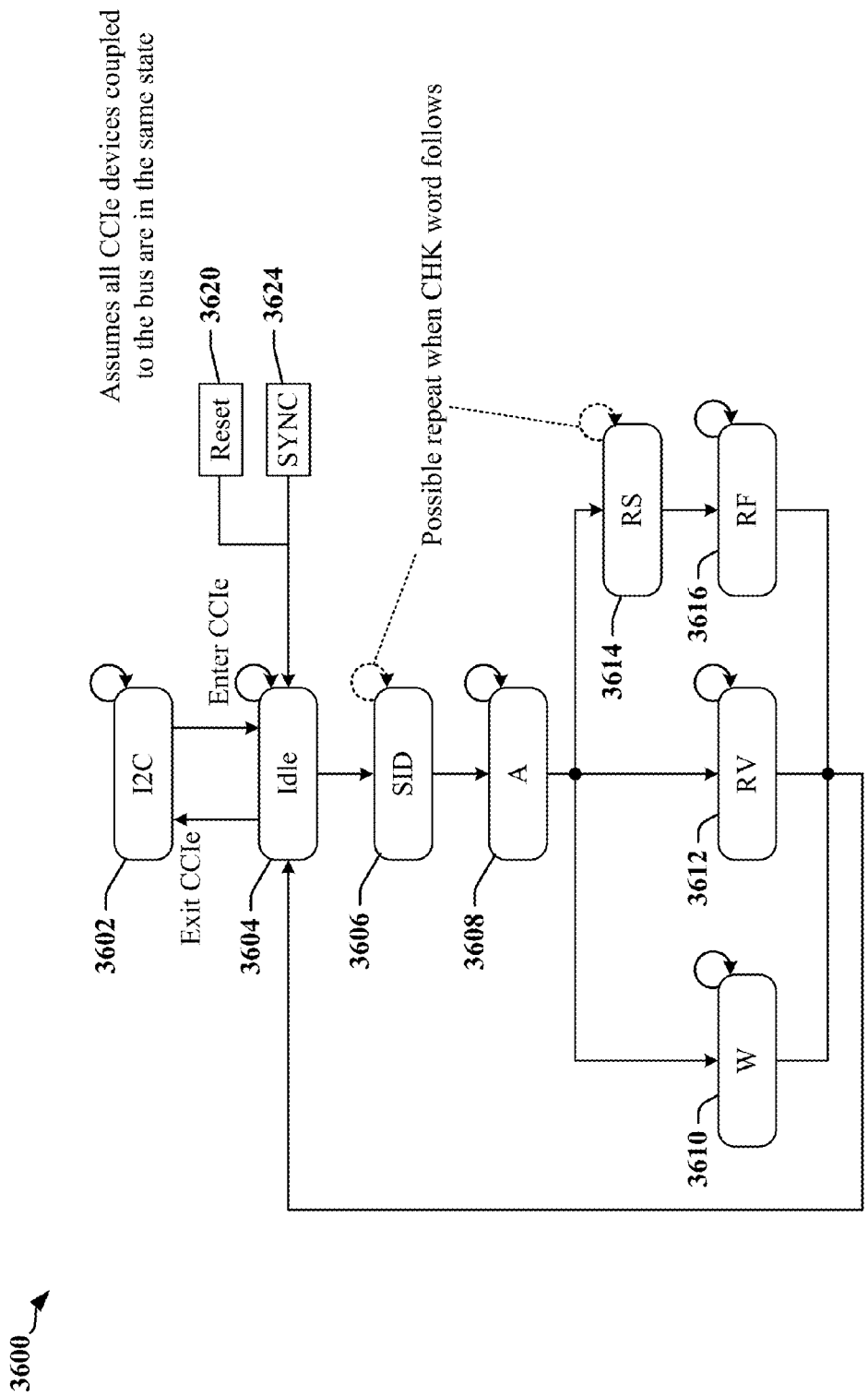
FIG. 36 illustrates a frame synchronization process for CCIe devices that operate in a mixed CCIe and I2C environment.

FIG. 36 is a state diagram 3600 illustrating a frame synchronization process for CCIe devices that operate in a mixed CCIe and I2C environment. Initially, the CCIe devices are in an identical mode of operation and synchronized to the frame. In an idle state 3604, the CCIe devices may transition to a state 3602 that supports an I2C mode of operation. Transitions from I2C mode to a CCIe mode place the CCIe devices into the idle state 3604, from which the CCIe devices may transition to active communication states 3602, 3606. In the initial CCIe active communication state 3606, CCIe communications may commence when the CCIe device detects a slave ID that corresponds to a slave ID used by the device. The slave then enters a state 3608 in which it waits for address information. The read or write is then completed in a write state 3610 or one or more read states 3612, 3614, 3616. Exit from certain active states 3610, 3612, or 3616 may return the device to the idle state 3604.

Figure 37:
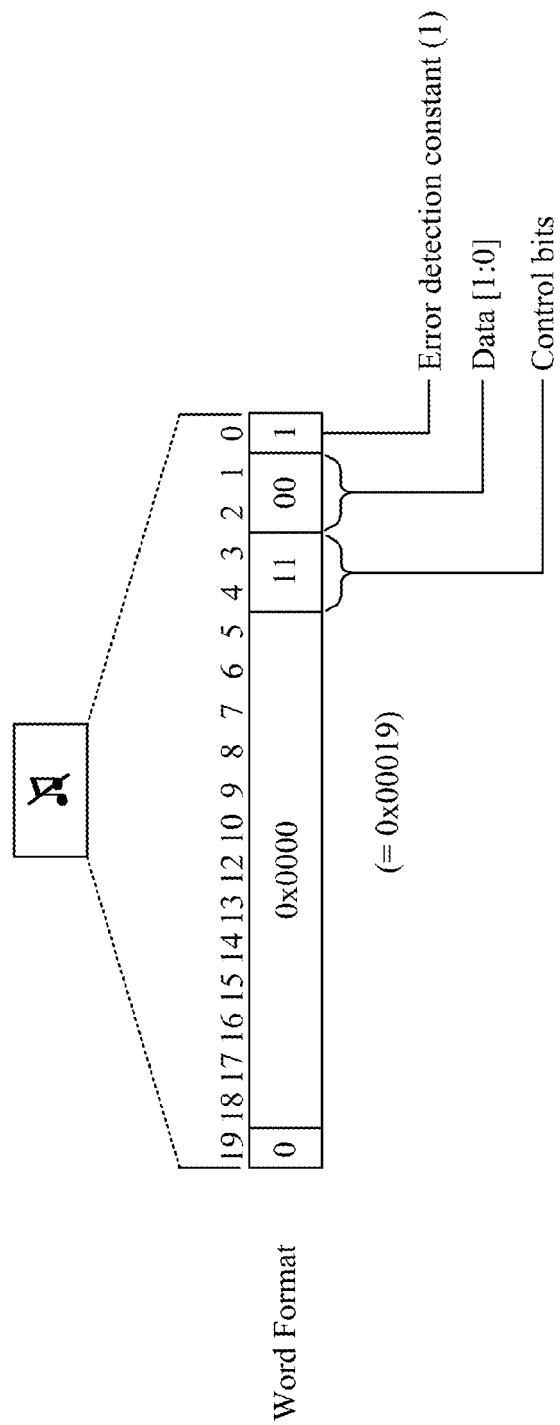
FIG. 37 illustrates a CCIe word that can be transmitted to obtain transition of a CCIe device to an unsynchronized state.

In some instances, it may be desirable to place a CCIe device in an unsynchronized state. In one example, a device may be placed in the unsynchronized state to facilitate or force a change in mode of operation of the serial bus. In one example, a CCIe master may transmit an intentional symbol error to break synchronization. FIG. 37 illustrates a CCIe word, which may be referred to as the UNSYNC code 3700, that can be transmitted by a CCIe master to effect a transition to the unsynchronized state. The frame may have an SID set to 0x0000, and with an error detection bit set to '1' to indicate an error condition. This transmission may be referred to as an UNSYNC code 3700. Upon receiving an UNSYNC code 3700, a slave device may drop to the unsynchronized state and begin looking for a SYNC pattern in the signaling state of the CCIe bus.

Transitions Between Modes of Operation of a Serial Bus

Master and slave devices adapted according to certain aspects disclosed herein may be coupled to and communicate over a serial bus that support multiple modes of operation and/or multiple protocols.

Figure 38:
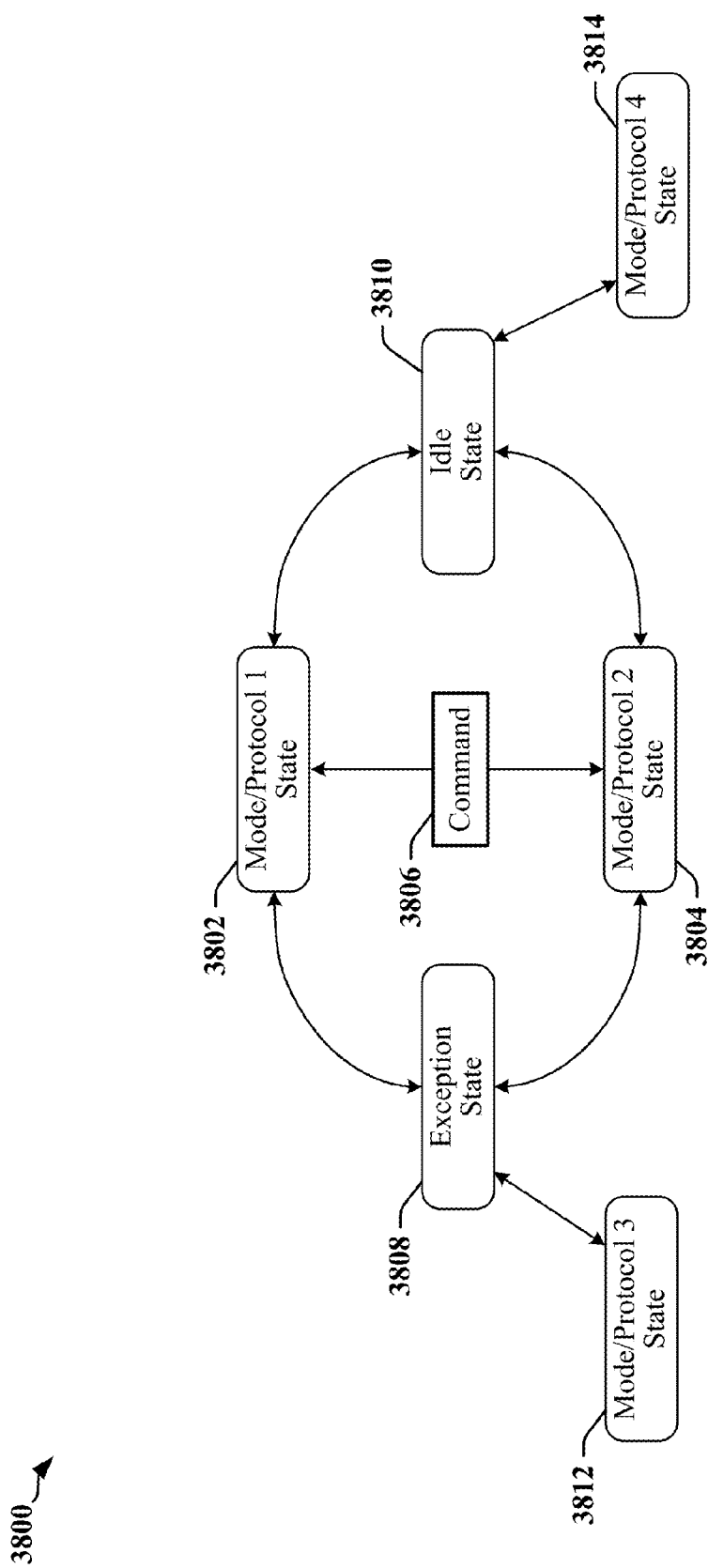
FIG. 38 illustrates a generalized scheme for transitioning between modes of operation of a serial bus and/or between multiple protocols that may be used on the serial bus in accordance with certain aspects disclosed herein.

FIG. 38 is a flow diagram 3800 illustrating a generalized scheme for transitioning between modes of operation of a serial bus and/or between multiple protocols that may be used on the serial bus. Each mode of operation and/or protocol may be associated with a corresponding active state 3802, 3804, 3812, 3814. Modes of operation of the bus may distinguish between signaling schemes, data throughput, transmission formats and the like. Different modes of operation may be defined for a protocol. For example, 12-symbol and 20-symbol modes may be defined for the CCIe protocol.

Different types of transitions may be available between active states 3802, 3804, 3812, 3814. In a first example, the serial bus may enter an idle state 3810 from which a next active state 3802, 3804, 3814 may be initiated. The idle state 3810 may be entered when two or more devices communicating according to a first protocol have completed communication transactions and release the bus. A device wishing to communicate over the bus, such as a master device, may acquire control of the bus during the idle state 3810 through arbitration and/or negotiation, and may begin communications upon winning the arbitration process. A device that acquires control of the bus may initiate communications using a first protocol. Devices that communicate using a second, different protocol may be configured to ignore communications involving the first protocol. For example, I2C devices may ignore CCIe communications on a shared bus.

In a second example, transitions between active states 3802, 3804, 3812 may be accomplished by forcing the bus into an "Exception" state 3808. The Exception state 3808 may exist when slave devices are out of synchronization with a master device. The Exception state 3808 may exist after a reset has been performed for a group of devices coupled to the bus.

In a third example, transitions between active states 3802, 3804 may be performed using a set of commands 3806. For example, a command structure may be provided that permits a CCIe master device to select between 12 symbol and 20 symbol modes of operation. The CCIe master may retain control of the serial bus after the transition has occurred.

Other means for transitioning between active states 3802, 3804, 3812, and/or 3814 are contemplated. In some configurations, a combination of idle state 3810 and commands 3806 may be employed. For example, certain devices coupled the serial bus may be configured to transmit and/or receive data in a common protocol. In the latter example, configuration, reconfiguration, arbitration and/or negotiation may be initiated from the idle state 3810 using I2C protocols.

In some configurations, multiple means for transitioning between active states 3802, 3804, 3812, and/or 3814 may be employed. For a serial bus that supports some combination of I2C, CCI, and/or CCIe protocols, switching between protocols, variants of protocols and signaling schemes may be accomplished using the UNSYNC code 3700 (see FIG. 37) and/or specialized control words, referred to herein as general calls. In one example, the UNSYNC code 3700 may be transmitted to initiate a change between 20-symbol and 12-symbol CCIe transmission modes.

Changes between protocols (e.g. between I2C and CCIe), and/or between 20-symbol and 12-symbol CCIe transmission modes may be initiated by transmission of one or more general calls. General calls may be implemented using predefined code words and/or may be addressed to a reserved SID and/or address. In one example, a CCIe frame may be identified as a general call when SID[15:0]=0x0000. The master device may specify the type of general call using address words. General calls may include payloads transmitted as data words, which can be written to, or read from the slave device.

The use of the UNSYNC code 3700 can minimize hardware in the CCIe slaves through resource sharing, and a more rapid switch between CCIe transmission modes may be accomplished. In contrast, a general call typically requires extra decoding logic and/or mode switch logic, and the general call typically requires extra word cycles to complete.

Figure 39:
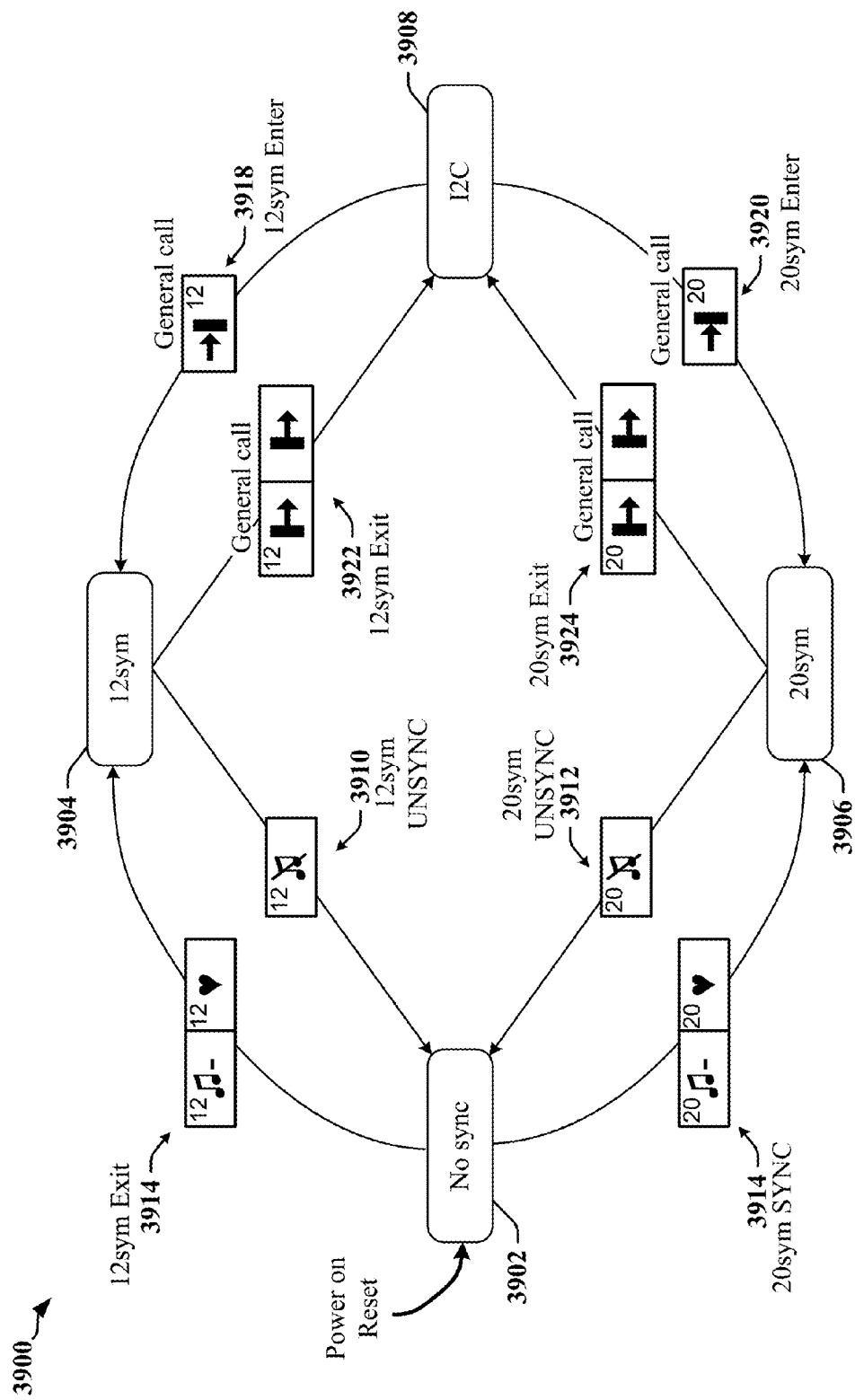
FIG. 39 illustrates mode switching between I2C and CCIe protocols, and between CCIe transmission modes in accordance with certain aspects disclosed herein.

FIG. 39 is a state diagram 3900 that illustrates mode switching between I2C and CCIe modes and between CCIe transmission modes. In one example, a UNSYNC code 3910 may be transmitted during 12-symbol CCIe transmission mode 3904 to cause slave devices to fall back to an unsynchronized mode 3902. An UNSYNC code 3912 may be transmitted during 20-symbol CCIe transmission mode 3906 to cause slave devices to fall back to the unsynchronized mode 3902. The UNSYNC code 3910 effectively causes slave devices to perform a recovery process similar to recovery processes that may be performed when an error is detected. The unsynchronized mode 3902 may be equivalent to a device state assumed or initiated after power-on, reset or hot-plugging.

Transitions to I2C mode 3908 may be initiated from either of the depicted CCIe transmission modes 3904, 3906. Accordingly, transition from the unsynchronized mode 3902 to I2C mode 3908 may include transition to one of the CCIe modes 3904 or 3906, from which a "12sym Exit" general call 3922, or a "20sym Exit" general call 3924 may be issued. Transitions from I2C mode 3908 to a CCIe mode may be made directly through the use of a "12sym Enter" I2C general call 3918, or a "20sym Enter" I2C general call 3920 to enter 20sym CCIe.

Figure 40:
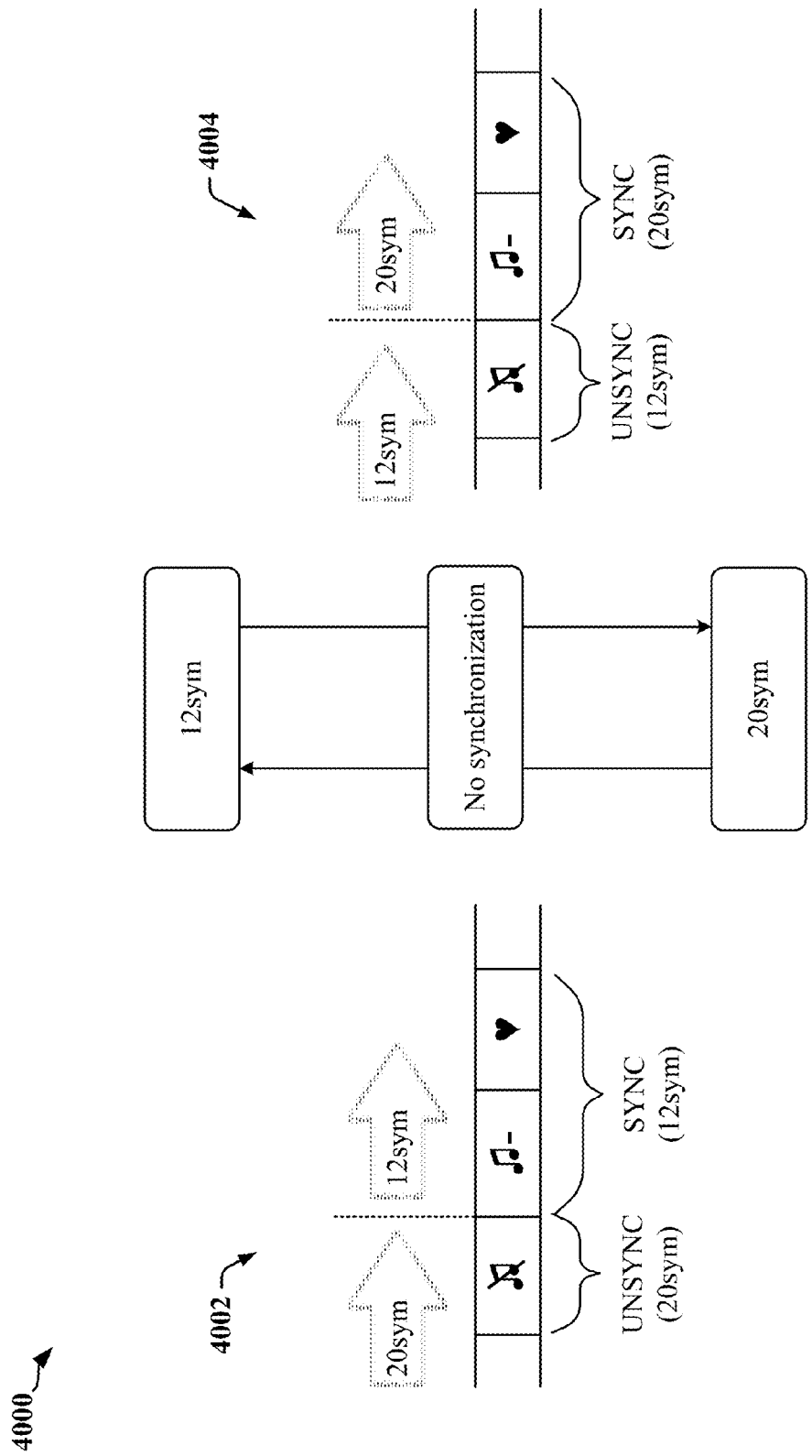
FIG. 40 illustrates a mode switching sequence related to switching between different CCIe transmission modes in accordance with certain aspects disclosed herein.

Transitions between CCIe modes 3904 and 3906 can be accomplished by transitioning through the unsynchronized mode 3902. As illustrated in FIG. 40, transition from the 20-symbol CCIe transmission mode 3906 to the 12-symbol CCIe transmission mode 3904 may involve a process 4002 of transmitting an UNSYNC followed by a 12-symbol SYNC pattern. Transition from the 12-symbol CCIe transmission mode 3904 to the 20-symbol CCIe transmission mode 3906 may involve a process 4004 of transmitting an UNSYNC followed by a 20-symbol SYNC pattern.

Additional Descriptions of Certain Circuits Systems and Methods

Figure 41:
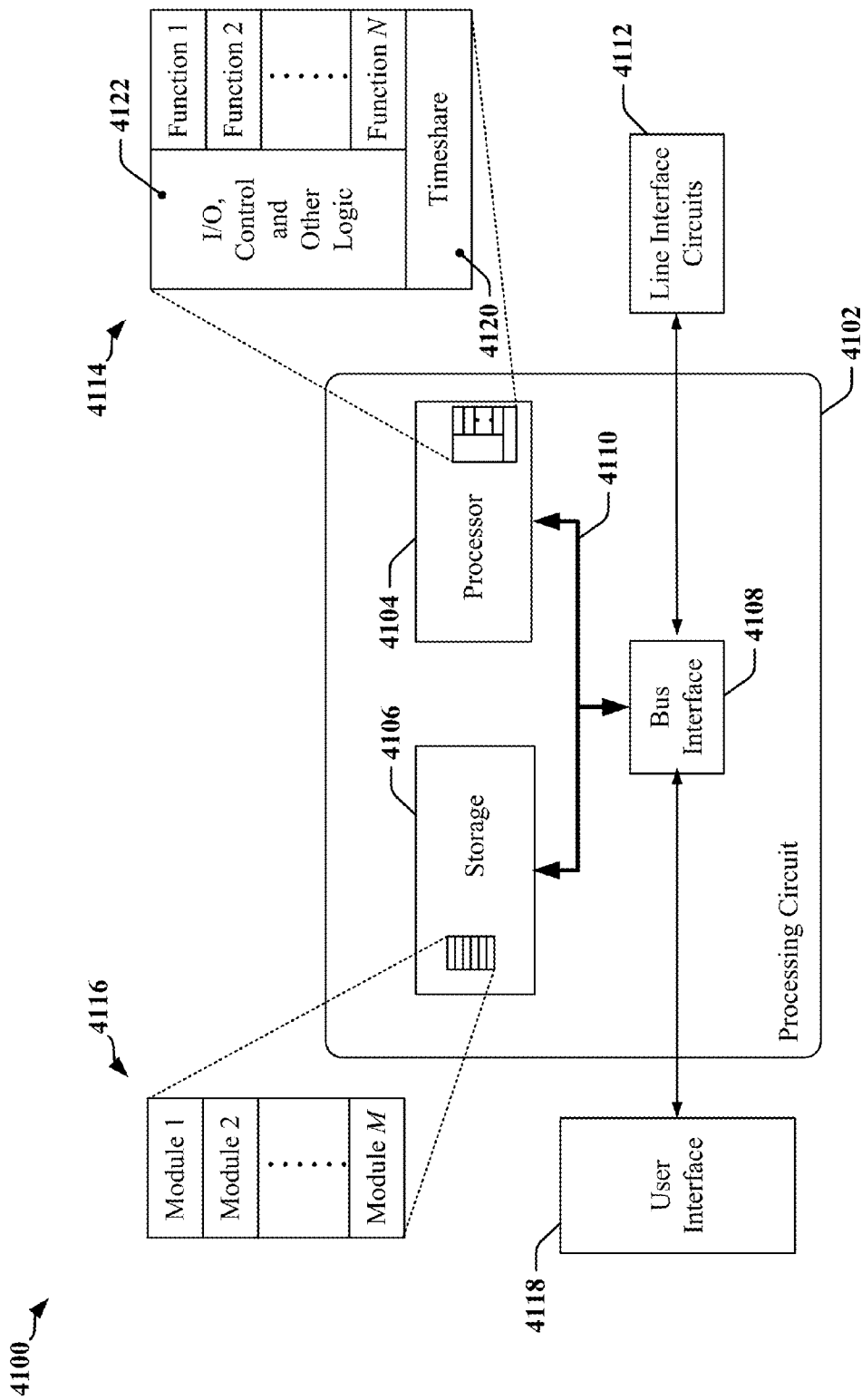
FIG. 41 is a block diagram illustrating an example of an apparatus employing a processing system that may be adapted according to certain aspects disclosed herein

FIG. 41 is a conceptual diagram 4100 illustrating a simplified example of a hardware implementation for an apparatus employing a processing circuit 4102 that may be configured to perform one or more functions disclosed herein. In accordance with various aspects of the disclosure, an element, or any portion of an element, or any combination of elements as disclosed herein may be implemented using the processing circuit 4102. The processing circuit 4102 may include one or more processors 4104 that are controlled by some combination of hardware and software modules. Examples of processors 4104 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 4104 may include specialized processors that perform specific functions, and that may be configured, augmented or controlled by one of the software modules 4116. The one or more processors 4104 may be configured through a combination of software modules 4116 loaded during initialization, and further configured by loading or unloading one or more software modules 4116 during operation.

In the illustrated example, the processing circuit 4102 may be implemented with a bus architecture, represented generally by the bus 4110. The bus 4110 may include any number of interconnecting buses and bridges depending on the specific application of the processing circuit 4102 and the overall design constraints. The bus 4110 links together various circuits including the one or more processors 4104, and storage 4106. Storage 4106 may include memory devices and mass storage devices, and may be referred to herein as computer-readable media and/or processor-readable media. The bus 4110 may also link various other circuits such as timing sources, timers, peripherals, voltage regulators, and power management circuits. A bus interface 4108 may provide an interface between the bus 4110 and one or more transceivers 4112. A transceiver 4112 may be provided for each networking technology supported by the processing circuit. In some instances, multiple networking technologies may share some or all of the circuitry or processing modules found in a transceiver 4112. Each transceiver 4112 provides a means for communicating with various other apparatus over a transmission medium. Depending upon the nature of the apparatus, a user interface 4118 (e.g., keypad, display, speaker, microphone, joystick) may also be provided, and may be communicatively coupled to the bus 4110 directly or through the bus interface 4108.

A processor 4104 may be responsible for managing the bus 4110 and for general processing that may include the execution of software stored in a computer-readable medium that may include the storage 4106. In this respect, the processing circuit 4102, including the processor 4104, may be used to implement any of the methods, functions and techniques disclosed herein. The storage 4106 may be used for storing data that is manipulated by the processor 4104 when executing software, and the software may be configured to implement any one of the methods disclosed herein.

One or more processors 4104 in the processing circuit 4102 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 4106 or in an external computer readable medium. The external computer-readable medium and/or storage 4106 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 4106 may also include, by way of example, a carrier wave, a transmission line, and any other suitable medium for transmitting software and/or instructions that may be accessed and read by a computer. Computer-readable medium and/or the storage 4106 may reside in the processing circuit 4102, in the processor 4104, external to the processing circuit 4102, or be distributed across multiple entities including the processing circuit 4102. The computer-readable medium and/or storage 4106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 4106 may maintain software maintained and/or organized in loadable code segments, modules, applications, programs, etc., which may be referred to herein as software modules 4116. Each of the software modules 4116 may include instructions and data that, when installed or loaded on the processing circuit 4102 and executed by the one or more processors 4104, contribute to a run-time image 4114 that controls the operation of the one or more processors 4104. When executed, certain instructions may cause the processing circuit 4102 to perform functions in accordance with certain methods, algorithms and processes described herein.

Some of the software modules 4116 may be loaded during initialization of the processing circuit 4102, and these software modules 4116 may configure the processing circuit 4102 to enable performance of the various functions disclosed herein. For example, some software modules 4116 may configure internal devices and/or logic circuits 4122 of the processor 4104, and may manage access to external devices such as the transceiver 4112, the bus interface 4108, the user interface 4118, timers, mathematical coprocessors, and so on. The software modules 4116 may include a control program and/or an operating system that interacts with interrupt handlers and device drivers, and that controls access to various resources provided by the processing circuit 4102. The resources may include memory, processing time, access to the transceiver 4112, the user interface 4118, and so on.

One or more processors 4104 of the processing circuit 4102 may be multifunctional, whereby some of the software modules 4116 are loaded and configured to perform different functions or different instances of the same function. The one or more processors 4104 may additionally be adapted to manage background tasks initiated in response to inputs from the user interface 4118, the transceiver 4112, and device drivers, for example. To support the performance of multiple functions, the one or more processors 4104 may be configured to provide a multitasking environment, whereby each of a plurality of functions is implemented as a set of tasks serviced by the one or more processors 4104 as needed or desired. In one example, the multitasking environment may be implemented using a timesharing program 4120 that passes control of a processor 4104 between different tasks, whereby each task returns control of the one or more processors 4104 to the timesharing program 4120 upon completion of any outstanding operations and/or in response to an input such as an interrupt. When a task has control of the one or more processors 4104, the processing circuit is effectively specialized for the purposes addressed by the function associated with the controlling task. The timesharing program 4120 may include an operating system, a main loop that transfers control on a round-robin basis, a function that allocates control of the one or more processors 4104 in accordance with a prioritization of the functions, and/or an interrupt driven main loop that responds to external events by providing control of the one or more processors 4104 to a handling function.

Figure 42:
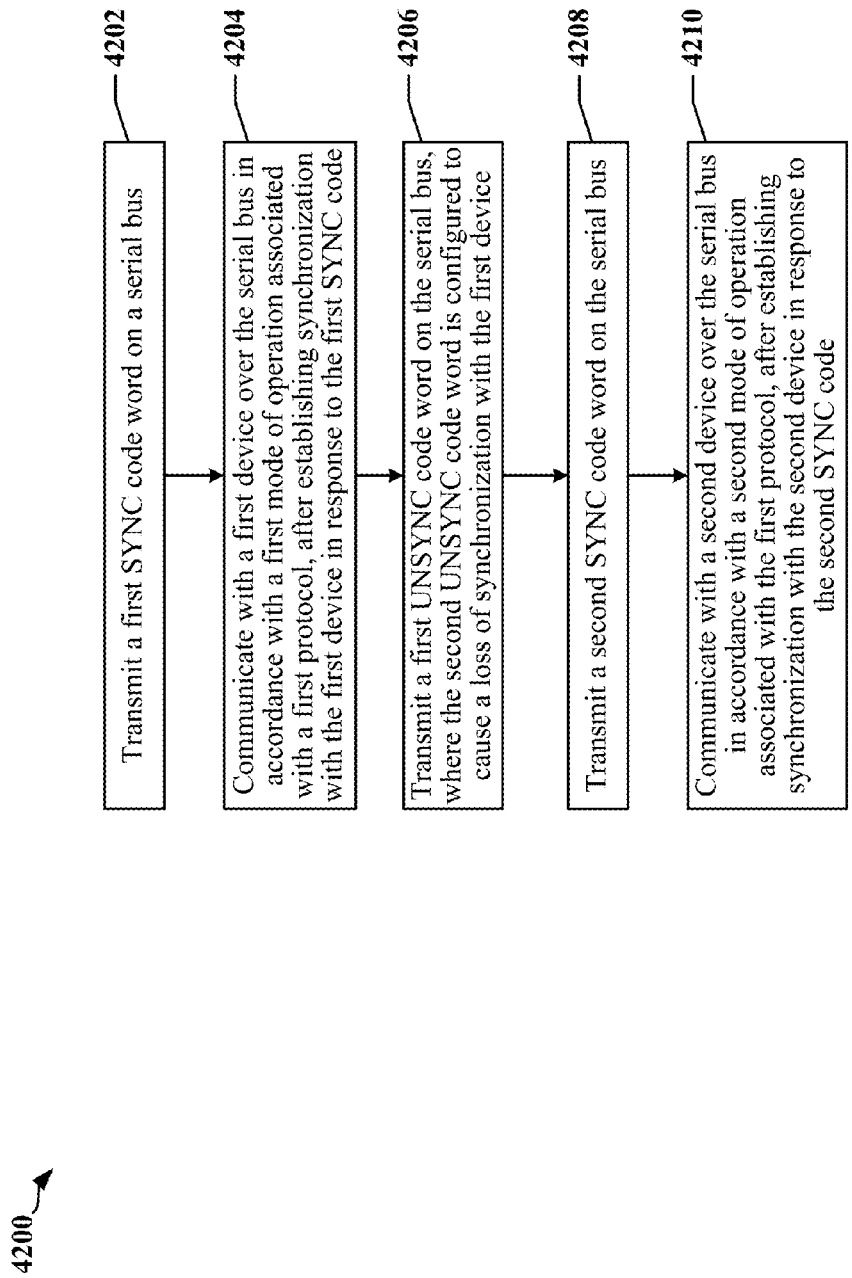
FIG. 42 is a flow chart of a method for communicating on a CCIe bus according to one or more aspects disclosed herein.

FIG. 42 is a flowchart 4200 illustrating a method for data communications on a serial bus. The serial bus may be a CCIe bus and various procedures and functions recited in the method may be performed by a device that includes some combination of the CCIe master device 220 illustrated in FIG. 2, the devices (the transmitter 300 or receiver 320) illustrated in FIG. 3, and/or other devices described herein.

At block 4202, a master device 220 may transmit a first SYNC code on a serial bus. The first SYNC code may include a synchronization word and a heartbeat word, where the heartbeat word can enable one or more slave CCIe devices to generate a clock signal.

At block 4204, the master device 220 may establish synchronization with a first device coupled to the serial bus in response to the first SYNC code. The master device 220 may communicate with the first device over the serial bus in accordance with a first mode of operation associated with a first protocol, after establishing synchronization with the first device.

At block 4206, the master device 220 may transmit a UNSYNC code on the serial bus, where the UNSYNC code is configured to cause a loss of synchronization with the first device. The UNSYNC code may include an indicator of an error condition. Presence of the indicator of the error condition may cause the first device to enter an unsynchronized state.

At block 4208, the master device 220 may transmit a second SYNC code on the serial bus.

At block 4210, the master device 220 may establish synchronization with a second device coupled to the serial bus in response to the second SYNC code. The master device 220 may communicate with the second device over the serial bus in accordance with a second mode of operation associated with the first protocol, after establishing synchronization with the second device.

In one example, the first protocol is a CCIe protocol. The first mode of operation may correspond to a mode of operation in which a data word is encoded in 12 symbols to be transmitted on the serial bus. The first SYNC code may be transmitted by transmitting a sequence of 12 symbols on the serial bus. The sequence of 12 symbols may be configured or selected to cause the SCL wire of the CCIe bus to remain at a logic high signaling state during transmission of the sequence of 12 symbols. The SDA wire may change signaling state at each transition between consecutive symbols of the sequence of 12 symbols.

In another example, the first protocol is a CCIe protocol. The first mode of operation may correspond to a mode of operation in which a data word is encoded in 20 symbols to be transmitted on the serial bus. The first SYNC code may be transmitted using a transceiver to transmit a sequence of 20 symbols on the serial bus. The sequence of 20 symbols may be configured or selected to cause the SCL wire of the CCIe bus to remain at a logic high signaling state during transmission of the sequence of 20 symbols. The SDA wire may change signaling state at each transition between consecutive symbols of the sequence of 20 symbols.

Where the first protocol is a CCIe protocol, communicating with the first device may include transmitting one or more data words to a slave CCIe device in a sequence of symbols.

In some instances, the device may transmit a general call on the serial bus. The general call may cause the serial bus to enter an idle state. The device may communicate with a third device coupled to the serial bus using a second protocol after the serial bus has entered the idle state. The first protocol may be a CCIe protocol, and the second protocol may be an I2C protocol. At least one device connected to the serial bus may be limited to communicating using I2C protocols.

Figure 43:
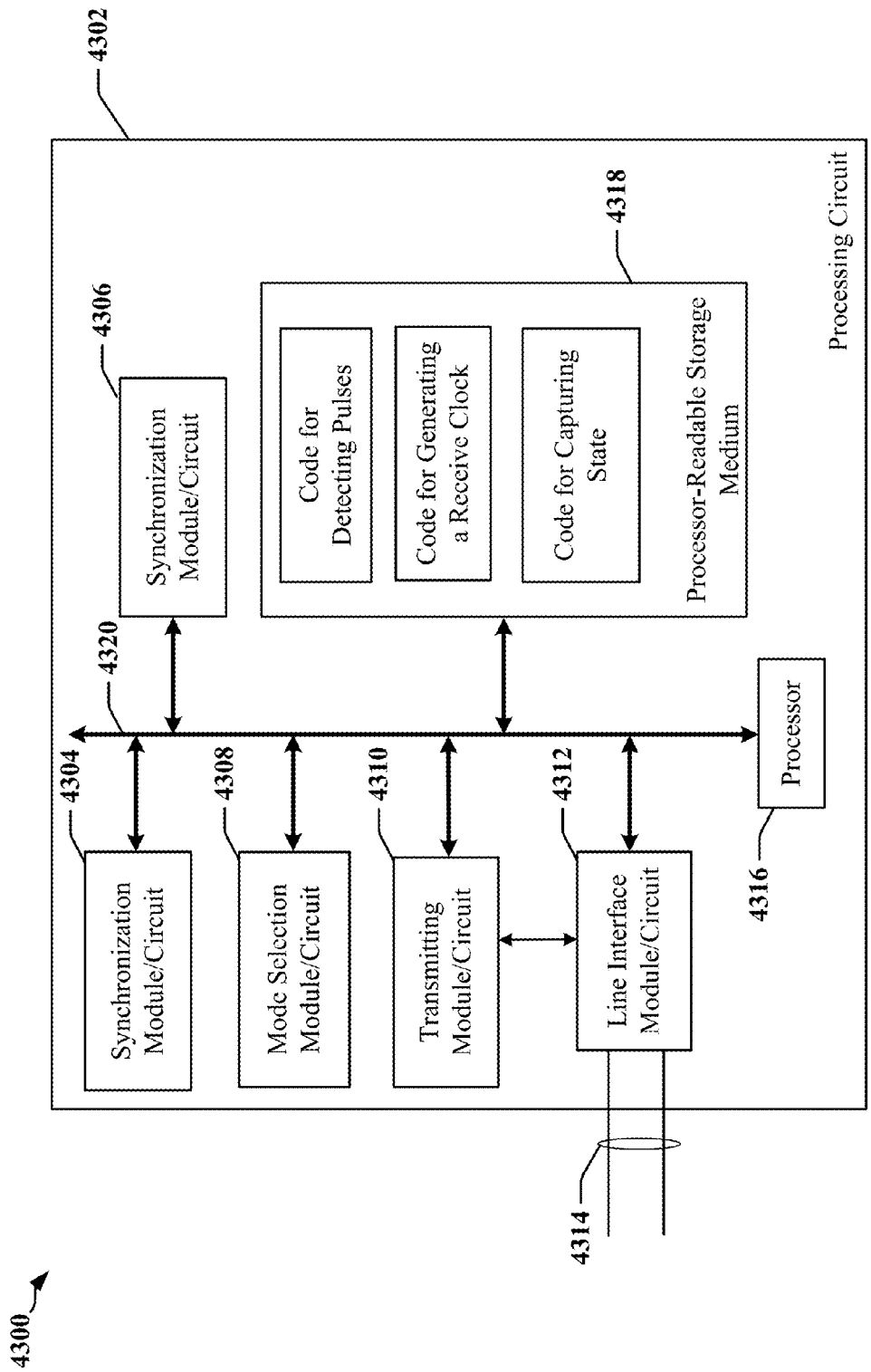
FIG. 43 is a diagram illustrating an example of a hardware implementation for an apparatus for communication over a CCIe bus according to one or more aspects disclosed herein.

FIG. 43 is a diagram illustrating a simplified example of a hardware implementation for an apparatus 4300 employing a processing circuit 4302. The processing circuit typically has a processor 4316 that may include one or more of a microprocessor, microcontroller, digital signal processor, a sequencer and a state machine. The processing circuit 4302 may be implemented with a bus architecture, represented generally by the bus 4320. The bus 4320 may include any number of interconnecting buses and bridges depending on the specific application of the processing circuit 4302 and the overall design constraints. The bus 4320 links together various circuits including one or more processors and/or hardware modules, represented by the processor 4316, the modules or circuits 4304, 4306, 4308, and 4310, line interface circuits 4312 configurable to communicate over connectors or wires 4314 and the computer-readable storage medium 4318. The bus 4320 may also link various other circuits such as timing sources, peripherals, voltage regulators, and power management circuits, which are well known in the art, and therefore, will not be described any further.

The processor 4316 is responsible for general processing, including the execution of software stored on the computer-readable storage medium 4218. The software, when executed by the processor 4316, causes the processing circuit 4302 to perform the various functions described supra for any particular apparatus. The computer-readable storage medium 4318 may also be used for storing data that is manipulated by the processor 4316 when executing software, including data decoded from symbols transmitted over the connectors 4314. The processing circuit 4302 further includes at least one of the modules 4304, 4306, 4308, and 4310. The modules 4304, 4306, 4308, and 4310 may be software modules running in the processor 4316, resident/stored in the computer-readable storage medium 4318, one or more hardware modules coupled to the processor 4316, or some combination thereof. The modules 4304, 4306, 4308, and/or 4310 may include microcontroller instructions, state machine configuration parameters, or some combination thereof.

In one configuration, the apparatus 4300 for wireless communication includes modules and/or circuits 4304 for generating synchronization codes, modules and/or circuits 4306 for generating commands including general calls, modules and/or circuits 4308 for selecting a protocol and mode of operation, modules and/or circuits 4310 for transmitting SYNC, UNSYNC and/or general calls on the serial bus to transition between protocols and/or modes of operation.

In one example, the processing circuit 4302 may execute instructions maintained in the computer-readable storage medium 4318, whereby such execution causes the apparatus 4300 to establish synchronization with a first device coupled to the connectors 4314 in response to the first SYNC code, communicate with the first device over the connectors 4314 in accordance with a first mode of operation associated with a first protocol, after establishing synchronization with the first device, transmit an UNSYNC code on the connectors 4314, where the UNSYNC code is configured to cause a loss of synchronization with the first device, transmit a second SYNC code on the connectors 4314, establish synchronization with a second device coupled to the connectors 4314 in response to the second SYNC code, and communicate with the second device over the connectors 4314 in accordance with a second mode of operation associated with the first protocol, after establishing synchronization with the second device.

The aforementioned means may be implemented, for example, using some combination of a processor or control logic 212, physical layer devices including a transceiver 210 and line drivers/receivers 214a, 214b and storage media or registers 206 and/or 210b.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of data communications, comprising:
    transmitting a first synchronization (SYNC) code on a serial bus comprises of a clock wire and a data wire;
    communicating with a first device over the serial bus in accordance with a first mode of operation associated with a first protocol, after establishing synchronization with the first device in response to the first SYNC code;
    transmitting an unsynchronization (UNSYNC) code on the serial bus, where the UNSYNC code is configured to cause a loss of synchronization with the first device;
    transmitting a second SYNC code on the serial bus; and
    communicating with a second device over the serial bus in accordance with a second mode of operation associated with the first protocol, after establishing synchronization with the second device in response to the second SYNC code,
    wherein in the first mode of operation, a data word is encoded in a sequence of symbols, each symbol defining signaling state of each wire of the serial bus, and
    wherein a transition between each pair of consecutive symbols in the sequence of symbols causes a corresponding transition in signaling state on at least one wire of the serial bus during transmission of the pair of consecutive symbols.

2. The method of claim 1, wherein the first protocol comprises a camera control interface (CCIe) protocol, and wherein the first mode of operation corresponds to a mode of operation in which a data word is encoded in 12 symbols to be transmitted on the serial bus.

3. The method of claim 2, wherein transmitting the first SYNC code comprises:
transmitting a sequence of 12 symbols on the serial bus, where the sequence of 12 symbols is selected to cause a serial clock (SCL) wire of the serial bus to remain at a logic high signaling state during transmission of the sequence of 12 symbols, and further causes a serial data (SDA) wire of the serial bus to change signaling state at each transition between consecutive symbols of the sequence of 12 symbols.

4. The method of claim 1, wherein the first protocol comprises a CCIe protocol, and wherein the second mode of operation corresponds to a mode of operation in which a data word is encoded in 20 symbols to be transmitted on the serial bus.

5. The method of claim 4, wherein transmitting the second SYNC code comprises:
transmitting a sequence of 20 symbols on the serial bus, where the sequence of 20 symbols is selected to cause a serial clock (SCL) wire of the serial bus to remain at a logic high signaling state during transmission of the sequence of 20 symbols, and further causes a serial data (SDA) wire of the serial bus to change signaling state at each transition between consecutive symbols of the sequence of 20 symbols.

6. The method of claim 1, wherein the first protocol comprises a CCIe protocol, and wherein communicating with the first device comprises:
transmitting one or more data words to a slave CCIe device in a sequence of symbols.

7. The method of claim 1, wherein the first SYNC code comprises a synchronization word and a heartbeat word, the heartbeat word enabling one or more slave CCIe devices to generate a clock signal.

8. The method of claim 1, wherein the UNSYNC code includes an indicator of an error condition, and wherein presence of the indicator of the error condition causes the first device to enter an unsynchronized state.

9. The method of claim 1, further comprising:
transmitting a general call on the serial bus, where the general call is selected to cause the serial bus to enter an idle state; and
communicating with a third device coupled to the serial bus using a second protocol after the serial bus has entered the idle state.

10. The method of claim 9, wherein the first protocol comprises a CCIe protocol, and wherein the second protocol comprises an Inter-Integrated Circuit (I2C) protocol.

11. The method of claim 1, wherein at least one device connected to the serial bus is limited to communicating using Inter-Integrated Circuit (I2C) protocols.

12. An apparatus comprising:
a transceiver configured for communicating over a serial bus comprises of a clock wire and a data wire; and
at least one processor configured to:
provide a first synchronization (SYNC) code to the transceiver for transmission on the serial bus;
communicate with a first device over the serial bus in accordance with a first mode of operation associated with a first protocol, after synchronization with the first device is established in response to the first SYNC code;
provide an unsynchronization (UNSYNC) code to the transceiver for transmission on the serial bus, where the UNSYNC code is configured to cause a loss of synchronization with the first device;
provide a second SYNC code to the transceiver for transmission on the serial bus; and
communicate with a second device over the serial bus in accordance with a second mode of operation associated with the first protocol, after synchronization with the second device is established in response to the second SYNC code,
wherein in the first mode of operation, a data word is encoded in a sequence of symbols, each symbol defining signaling state of each wire of the serial bus, and
wherein a transition between each pair of consecutive symbols in the sequence of symbols causes a corresponding transition in signaling state on at least one wire of the serial bus during transmission of the pair of consecutive symbols.

13. The apparatus of claim 12, wherein the first protocol comprises a camera control interface (CCIe) protocol, and wherein the first mode of operation corresponds to a mode of operation in which a data word is encoded in 12 symbols to be transmitted on the serial bus.

14. The apparatus of claim 13, wherein the first SYNC code comprises a sequence of 12 symbols selected to cause a serial clock (SCL) wire of the serial bus to remain at a logic high signaling state during transmission of the sequence of 12 symbols, and further selected to cause a serial data (SDA) wire to change signaling state at each transition between consecutive symbols of the sequence of 12 symbols.

15. The apparatus of claim 12, wherein the first protocol comprises a CCIe protocol, and wherein the second mode of operation corresponds to a mode of operation in which a data word is encoded in 20 symbols to be transmitted on the serial bus.

16. The apparatus of claim 15, wherein the second SYNC code comprises a sequence of 20 symbols selected to cause a serial clock (SCL) wire of the serial bus to remain at a logic high signaling state during transmission of the sequence of 20 symbols, and further selected to cause a serial data (SDA) wire to change signaling state at each transition between consecutive symbols of the sequence of 20 symbols.

17. The apparatus of claim 12, wherein the first protocol comprises a CCIe protocol, and further comprising:
an encoder adapted to encode one or more data words in a sequence of symbols, wherein the sequence of symbols is transmitted by the transceiver to a slave CCIe device over the serial bus.

18. The apparatus of claim 12, wherein the first SYNC code comprises a synchronization word and a heartbeat word, the heartbeat word enabling one or more slave CCIe devices to generate a clock signal.

19. The apparatus of claim 12, wherein the UNSYNC code includes an indicator of an error condition, and wherein presence of the indicator of the error condition causes the first device to enter an unsynchronized state.

20. The apparatus of claim 12, wherein the at least one processor is configured to:
cause a general call to be transmitted on the serial bus, where the general call is selected to cause the serial bus to enter an idle state; and
communicate with a third device coupled to the serial bus using a second protocol after the serial bus has entered the idle state, wherein the first protocol comprises a CCIe protocol, and wherein the second protocol comprises an Inter-Integrated Circuit (I2C) protocol.

21. A computer readable storage medium having instructions stored thereon, wherein the instructions when executed by a processor cause the processor to:
provide a first synchronization (SYNC) code to a transceiver for transmission on a serial bus comprises of a clock wire and a data wire;
communicate with a first device over the serial bus in accordance with a first mode of operation associated with a first protocol, after synchronization with the first device is established in response to the first SYNC code;
provide an unsynchronization (UNSYNC) code to the transceiver for transmission on the serial bus, where the UNSYNC code is configured to cause a loss of synchronization with the first device;
provide a second SYNC code to the transceiver for transmission on the serial bus; and
communicate with a second device over the serial bus in accordance with a second mode of operation associated with the first protocol, after synchronization with the second device is established in response to the second SYNC code,
wherein in the first mode of operation, a data word is encoded in a sequence of symbols, each symbol defining signaling state of each wire of the serial bus, and
wherein a transition between each pair of consecutive symbols in the sequence of symbols causes a corresponding transition in signaling state on at least one wire of the serial bus during transmission of the pair of consecutive symbols.

22. The storage medium of claim 21, wherein the first protocol comprises a camera control interface (CCIe) protocol, and wherein the first mode of operation corresponds to a mode of operation in which a first data word is encoded in 12 symbols to be transmitted on the serial bus, and wherein the second mode of operation corresponds to a mode of operation in which a second data word is encoded in 20 symbols to be transmitted on the serial bus.

23. The storage medium of claim 21, wherein the first SYNC code comprises a sequence of 12 symbols selected to cause a serial clock (SCL) wire of the serial bus to remain at a logic high signaling state during transmission of the sequence of 12 symbols, and further selected to cause a serial data (SDA) wire of the serial bus to change signaling state at each transition between consecutive symbols of the sequence of 12 symbols, and wherein the second SYNC code comprises a sequence of 20 symbols selected to cause the SCL wire of the serial bus to remain at the logic high signaling state during transmission of the sequence of 20 symbols, and further selected to cause the SDA wire to change signaling state at each transition between consecutive symbols of the sequence of 20 symbols.

24. The storage medium of claim 21, wherein the UNSYNC code includes an indicator of an error condition, and wherein presence of the indicator of the error condition causes the first device to enter an unsynchronized state.

25. The storage medium of claim 21, wherein the instructions cause the processor to:
provide a general call to be transmitted on the serial bus, where the general call is selected to cause the serial bus to enter an idle state; and
communicate with a third device coupled to the serial bus using a second protocol after the serial bus has entered the idle state, wherein the first protocol comprises a CCIe protocol, and wherein the second protocol comprises an Inter-Integrated Circuit (I2C) protocol.

26. An apparatus comprising:
a transceiver configured for communicating over a serial bus comprises of a clock wire and a data wire;
means for providing a first synchronization (SYNC) code to the transceiver for transmission on the serial bus;
means for communicating with a first device over the serial bus in accordance with a first mode of operation associated with a first protocol, after synchronization with the first device is established in response to the first SYNC code;
means for providing an unsynchronization (UNSYNC) code to the transceiver for transmission on the serial bus, where the UNSYNC code is configured to cause a loss of synchronization with the first device;
means for providing a second SYNC code to the transceiver for transmission on the serial bus; and
means for communicating with a second device over the serial bus in accordance with a second mode of operation associated with the first protocol, after synchronization with the second device is established in response to the second SYNC code,
wherein in the first mode of operation, a data word is encoded in a sequence of symbols, each symbol defining signaling state of each wire of the serial bus, and
wherein a transition between each pair of consecutive symbols in the sequence of symbols causes a corresponding transition in signaling state on at least one wire of the serial bus during transmission of the pair of consecutive symbols.

27. The apparatus of claim 26, wherein the first protocol comprises a camera control interface (CCIe) protocol, and wherein the first mode of operation corresponds to a mode of operation in which a first data word is encoded in 12 symbols to be transmitted on the serial bus, and wherein the second mode of operation corresponds to a mode of operation in which a second data word is encoded in 20 symbols to be transmitted on the serial bus.

28. The apparatus of claim 26, wherein the first SYNC code comprises a sequence of 12 symbols selected to cause a serial clock (SCL) wire of the serial bus to remain at a logic high signaling state during transmission of the sequence of 12 symbols, and further selected to cause a serial data (SDA) wire of the serial bus to change signaling state at each transition between consecutive symbols of the sequence of 12 symbols, and wherein the second SYNC code comprises a sequence of 20 symbols selected to cause the SCL wire of the serial bus to remain at the logic high signaling state during transmission of the sequence of 20 symbols, and further selected to cause the SDA wire to change signaling state at each transition between consecutive symbols of the sequence of 20 symbols.

29. The apparatus of claim 26, wherein the UNSYNC code includes an indicator of an error condition, and wherein presence of the indicator of the error condition causes the first device to enter an unsynchronized state.

30. The apparatus of claim 26, further comprising:
means for causing a general call to be transmitted on the serial bus, where the general call is selected to cause the serial bus to enter an idle state; and
means for communicating with a third device coupled to the serial bus using a second protocol after the serial bus has entered the idle state, wherein the first protocol comprises a CCIe protocol, and wherein the second protocol comprises an Inter-Integrated Circuit (I2C) protocol.

\* \* \* \* \*